US012761233B2

(12) United States Patent
Buse et al.

(10) Patent No.: US 12,761,233 B2
(45) Date of Patent: Oct. 13, 2026

(54) FLUID CONTAINER MANAGEMENT SYSTEM

(71) Applicant: GEN-PROBE INCORPORATED, San Diego, CA (US)

(72) Inventors: David A. Buse, San Diego, CA (US); Norbert Hagen, Carlsbad, CA (US); David Opalsky, San Diego, CA (US); Martin Busch, Wössingen (DE); Klaus Kunz, Waldbronn (DE)

(73) Assignee: GEN-PROBE INCORPORATED, San Diego, CA (US)

(*) Notice: Subject to any disclaimer, the term of this patent is extended or adjusted under 35 U.S.C. 154(b) by 612 days.

(21) Appl. No.: 18/249,514

(22) PCT Filed: Oct. 21, 2021

(86) PCT No.: PCT/US2021/056039
§ 371 (c)(1),
(2) Date: Apr. 18, 2023

(87) PCT Pub. No.: WO2022/087257
PCT Pub. Date: Apr. 28, 2022

(65) Prior Publication Data
US 2023/0393163 A1 Dec. 7, 2023

Related U.S. Application Data

(60) Provisional application No. 63/094,647, filed on Oct. 21, 2020.

(51) Int. Cl.
*G01N 35/04* (2006.01)
*B65G 29/00* (2006.01)
(Continued)

(52) U.S. Cl.
CPC ............ *G01N 35/04* (2013.01); *B65G 29/00* (2013.01); *B65G 47/84* (2013.01); *G01F 23/268* (2013.01); *G01N 2035/0441* (2013.01)

(58) Field of Classification Search
CPC ........... G01N 35/04; G01N 2035/0441; G01N 2035/0439; G01N 2035/1025;
(Continued)

(56) References Cited

U.S. PATENT DOCUMENTS 1,980,930 A * 11/1934 Reyniers .................. B01L 9/06 211/74
5,053,198 A 10/1991 Quenin
(Continued)

FOREIGN PATENT DOCUMENTS

CN 102427885 A 4/2012
CN 109563457 A 4/2019
(Continued)

OTHER PUBLICATIONS

EPO Communication pursuant to Article 94(3) EPC, European Application No. 21810808.2, Apr. 30, 2025.
(Continued)

*Primary Examiner* — Benjamin R Whatley
*Assistant Examiner* — Curtis A Thompson
(74) *Attorney, Agent, or Firm* — Rothwell, Figg, Ernst & Manbeck, P.C.; Charles B. Cappellari

(57) ABSTRACT

Systems and methods for transferring containers (100) include or employ a container loading interface (200), a container storage module (400), and a container distributor (300) configured to transfer containers from the container loading interface to the container storage module. The container loading interface includes movable support platform (202) that is movable between accessible and a non-accessible positions and a container loading transport (214).
(Continued)

The container storage module includes a housing (402) and a container storage transport (418). The container distributor includes a container gripper (320) configured to grasp a container on the container loading transport and to transfer the container to the container storage transport in the container storage module.

28 Claims, 24 Drawing Sheets

(51) Int. Cl.
*B65G 47/84* (2006.01)
*G01F 23/263* (2022.01)

(58) Field of Classification Search
CPC .... G01N 35/0099; B65G 29/00; B65G 47/84; G01F 23/268
See application file for complete search history.

(56) References Cited

U.S. PATENT DOCUMENTS

| | | | | |
|---|---|---|---|---|
| 5,242,659 | A | 9/1993 | Wurschum | |
| 5,575,978 | A | 11/1996 | Clark et al. | |
| 5,578,268 | A * | 11/1996 | Champseix | B01F 29/321 422/65 |
| 5,855,851 | A | 1/1999 | Matsubara et al. | |
| 5,882,596 | A | 3/1999 | Breeser et al. | |
| 6,177,050 | B1 * | 1/2001 | Bybee | G01N 35/026 422/561 |
| 6,264,419 | B1 | 7/2001 | Schinzel | |
| 7,191,647 | B2 | 3/2007 | Harazin et al. | |
| 7,282,182 | B2 | 10/2007 | Dale et al. | |
| 7,585,678 | B2 | 9/2009 | Sigrist | |
| 7,998,432 | B2 | 8/2011 | Rousseau | |
| 8,008,066 | B2 | 8/2011 | Lair et al. | |
| 8,501,461 | B2 | 8/2013 | Knight et al. | |
| 9,011,771 | B2 | 4/2015 | Hagen et al. | |
| 9,046,507 | B2 | 6/2015 | Knight et al. | |
| 9,400,285 | B2 | 7/2016 | Ochranek et al. | |
| 9,523,699 | B2 | 12/2016 | Talmer et al. | |
| 9,835,639 | B2 | 12/2017 | Oguri et al. | |
| 9,910,054 | B2 | 3/2018 | Johns | |
| 10,343,127 | B2 | 7/2019 | Knight | |
| 10,450,144 | B2 | 10/2019 | Vivet et al. | |
| 10,456,925 | B2 | 10/2019 | Paavilainen et al. | |
| 10,502,751 | B2 | 12/2019 | Jaeggi | |
| 11,759,785 | B2 | 9/2023 | Pham et al. | |
| 2002/0090320 | A1 | 7/2002 | Burow et al. | |
| 2003/0031602 | A1 | 2/2003 | Weselak et al. | |
| 2003/0092186 | A1 * | 5/2003 | Pressman | B01L 3/50825 436/178 |
| 2004/0096362 | A1 * | 5/2004 | Barry | B65G 23/08 422/65 |
| 2009/0029877 | A1 | 1/2009 | Ammann et al. | |
| 2010/0281822 | A1 | 11/2010 | Murray | |
| 2012/0177473 | A1 | 7/2012 | Smith | |
| 2012/0218854 | A1 | 8/2012 | Behringer et al. | |
| 2012/0240518 | A1 | 9/2012 | Pairaud et al. | |
| 2014/0269159 | A1 | 9/2014 | Buse et al. | |
| 2016/0060680 | A1 * | 3/2016 | Buse | G01N 35/04 506/9 |
| 2017/0254827 | A1 | 9/2017 | Walker et al. | |
| 2017/0341873 | A1 | 11/2017 | Vivet et al. | |
| 2018/0282788 | A1 | 10/2018 | Opalsky et al. | |
| 2018/0370670 | A1 | 12/2018 | Sha et al. | |
| 2020/0098960 | A1 | 3/2020 | Minato et al. | |
| 2020/0209268 | A1 | 7/2020 | Tajima | |
| 2022/0357354 | A1 | 11/2022 | Yamashita et al. | |

FOREIGN PATENT DOCUMENTS

| | | | | |
|---|---|---|---|---|
| EP | 3 165 482 | A1 | 5/2017 | |
| JP | H09-89901 | A | 4/1997 | |
| JP | 2008-536106 | A | 9/2008 | |
| JP | 2010-085249 | A | 4/2010 | |
| JP | 2011111279 | A | 6/2011 | |
| JP | 2020-039365 | A | 3/2020 | |
| JP | 2020-526758 | A | 8/2020 | |
| WO | 95/08774 | A2 | 3/1995 | |
| WO | 2006/097813 | A1 | 9/2006 | |
| WO | 2014153193 | A2 | 9/2014 | |
| WO | 2020/043388 | A1 | 3/2020 | |
| WO | WO-2020098960 | A1 * | 5/2020 | G01N 35/025 |

OTHER PUBLICATIONS

IPA Examination Report No. 1, Australian Application No. 2021365165, Aug. 18, 2025.
JPO Official Action, Japanese Patent Application No. 2023-521853, Jul. 3, 2024.
CNIPA First Office Action, Chinese Application No. 202180069946.1, Oct. 15, 2025.
CNIPA Search Report, Chinese Application No. 202180069946.1, Oct. 14, 2025.
International Search Report and Written Opinion with Transmittal dated Apr. 25, 2022 in International Application No. PCT/US2021/056039 (31 pages).
CIPO Exam Report, Canadian Application No. 3,177,256, Feb. 7, 2024.
Penultimate Office action received for Japanese Patent Application No. 2024-172130, mailed on Apr. 2, 2026, 04 pages including English translation.
Office Action received for U.S. Appl. No. 18/659,789, mailed on Jun. 1, 2026, 17 pages.

* cited by examiner

FLUID CONTAINER MANAGEMENT SYSTEM

CROSS-REFERENCE TO RELATED APPLICATIONS

This application is a National Stage of International Application No. PCT/US2021/056039, filed Oct. 21, 2021, which claims the benefit of U.S. Provisional Application No. 63/094,647, filed Oct. 21, 2020, the respective disclosures of which are incorporated herein by reference.

FIELD OF THE DISCLOSURE

This disclosure relates to a system that facilitates manual introduction of fluid containers to a processing instrument, storage of the containers, transfer of a controlled amount of the contents of each container, monitoring the amount of fluid contained within each container, and discarding each container once it is empty or there is no further use for the container.

BACKGROUND

Automated sample processing systems frequently require the replenishment of process fluids, such as reagents, and/or require that different process fluids be provided to the system so as to enable the system to perform different processes. In an automated system, stopping operation of the system can negatively impact efficiency and throughput. However, due to the enclosed nature of many such processing systems and the number of moving components within the system, providing additional containers of process fluids to the system, while the system is operating and without halting operation of the system, is a challenge.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Examples described herein include a system for transferring a container that includes grooves formed on opposed sides of the container. The system may include a container loading interface, a container storage module, and a container distributor configured to transfer containers from the container loading interface to the container storage module. The container loading interface may include a movable support platform that may be movable between an accessible position and a non-accessible position and a container loading transport supported on the movable support platform. The container loading transport may include a plurality of container pockets, each container pocket being configured to receive a container inserted vertically into the container pocket when the moveable support platform may be in the accessible position and to permit a container to be removed laterally from the container pocket, wherein the container loading transport may be configured to sequentially transport the container pockets to a container transfer position with respect to a transfer opening formed in the movable support platform when the moveable support platform may be in the non-accessible position. The container storage module may include a housing with a container ingress/egress opening formed in a side of the housing, a movable barrier configured for movement between a first position blocking the container ingress/egress opening and a second position permitting a container to be moved laterally through the container ingress/egress opening, and a container storage transport disposed within the housing and including a plurality of container holding stations. Each container holding station may include spring tabs configured to resiliently engage the grooves of a container held in the container holding station to retain the container in the container holding station and to deflect outwardly to permit the container to be laterally inserted into or laterally removed from the container holding station. The container distributor may include a container gripper configured to grasp a container carried in one of the container pockets of the container loading transport located at the container transfer position by engaging the grooves of the container, a gripper advance system configured to move the container gripper to laterally remove the container from the container pocket of the container loading transport in which the container may be held, and a distributor moving system configured to move the container gripper and the container held thereby from the container transfer position to the ingress/egress opening of the container storage module. The gripper advance system may be configured to move the container gripper to insert the container held thereby through the ingress/egress opening and into a container holding station of the container storage transport, and the gripper may be configured to release the container in the container holding station by disengaging the grooves of the container.

In some examples, the movable support platform of the container loading interface may include a drawer that may be movable between the non-accessible position, in which the movable support platform may be retracted into an instrument, and the accessible position, in which the movable support platform may be extended from the instrument.

In some examples, the container loading transport may include a loading carousel supported on the movable support platform for rotation about a loading carousel axis, and the container pockets are arranged circumferentially around the loading carousel axis.

In some examples, the loading interface may additionally or alternatively include a home sensor for detecting a home rotational position of the loading carousel.

In some examples, each container pocket may include retention clips configured to engage the grooves formed on the container for removably retaining the container within the container pocket.

In some examples, the container pockets are disposed on the outer periphery of the loading carousel and are open at the outer periphery of the loading carousel to permit a container to be withdrawn from the pocket in a lateral direction with respect to the loading carousel axis.

In some examples, each container pocket may include a relief formed on opposed sides of the open peripheral end of the container pocket to provide clearance for a gripping mechanism to open to engage or disengage the grooves of a container held within the container pocket.

In some examples, each container pocket may include a container positioning cleat configured to engage a notch formed in a container positioned within the container pocket.

In some examples, the container loading interface may include a scanner configured to scan machine-readable information on each container carried on the container loading transport.

In some examples, the he scanner may include a barcode scanner.

In some examples, the container loading interface may additionally or alternatively include a loading transport motor coupled to the loading carousel to effect powered rotation of the loading carousel about the loading carousel axis.

In some examples, the loading transport motor may be coupled to the loading carousel by a drive belt.

In some examples, the container storage module may additionally or alternatively include a pusher pin extending from the movable barrier the container distributor may include a door actuator arm configured to engage the pusher pin, and the door actuator arm may be movable by the distributor moving system to move the movable barrier of the container storage module from the first position to the second position.

In some examples, the container storage transport may include a storage carousel supported within the housing for rotation about a storage carousel axis, and the container holding stations may be arranged circumferentially around the storage carousel axis.

In some examples, the container storage transport may include a home sensor for detecting a home rotational position of the storage carousel.

In some examples, the storage carousel may additionally or alternatively include an upper clip ring including multiple pairs of opposed, facing spring tabs and a lower clip ring including multiple pairs of opposed, facing spring tabs, and each pair of spring tabs of the upper clip ring may be aligned with a corresponding pair of spring tabs of the lower clip ring to define each holding station.

In some examples, each spring tab may include a knuckle bent inwardly into the corresponding holding station, and each knuckle may seat into one of the grooves of the container disposed in the holding station.

In some examples, the upper clip ring may be spaced apart from the lower clip ring so that each pair of spring tabs of the upper clip ring may be spaced apart from the corresponding pair of spring tabs of the lower clip ring.

In some examples, the container storage module may additionally or alternatively include a storage transport motor coupled to the storage carousel to effect powered rotation of the storage carousel about the storage carousel axis.

In some examples, the storage transport motor may be coupled to the storage carousel by a spur gear mounted to the carousel and engaged with a spur gear mounted on an output shaft of the storage transport motor.

In some examples, the container gripper additionally or alternatively may include: a gripper element mounting bracket, a first gripper element mounted to the gripper element mounting bracket for pivoting movement about a first gripper axis of rotation and including a first hook located at a radially-spaced position with respect to the first gripper axis of rotation and configured to seat in one of the grooves of the container, and a second gripper element mounted to the gripper element mounting bracket for pivoting movement about a second gripper axis of rotation that may be parallel to the first gripper axis of rotation and including a second hook located at a radially-spaced position with respect to the second gripper axis of rotation and configured to seat in the opposite groove of the container. In some examples, the first hook and the second hook are bent toward each other, and the first gripper element and the second gripper element are coupled to one another for coordinated pivoting movement toward each other or away from each other about the respective first and second gripper axes of rotation. In some examples, the container gripper may be configured to grasp a container by pivoting the first and second gripper elements toward each other until the respective first and second hooks are seated within one of the grooves of the container.

In some examples, the first gripper element and the second gripper element may be coupled to one another for coordinated pivoting movement by a first gripper element coupling gear attached to the first gripper element and arranged coaxially with the first gripper axis of rotation and a second gripper element coupling gear attached to the second gripper element and arranged coaxially with the second gripper axis of rotation, and the first gripper element coupling gear and the second gripper element coupling gear are inter-engaged so that rotation of either the first gripper element or the second gripper element results in a corresponding, coordinated rotation of the other gripper element in an opposite rotational direction.

In some examples, the container gripper may additionally or alternatively include a gripper motor with a gripper actuator gear, a gripper drive gear mounted coaxially with the first gripper axis of rotation and configured for rotation independently of the first gripper element, wherein the gripper actuator gear may be engaged with the gripper drive gear, and a drive pin extending from the first gripper element at a position spaced from the first gripper axis of rotation, wherein the drive pin extends into an opening formed in the gripper drive gear.

In some examples, the container gripper may additionally or alternatively include a spring connected to at least one of the first gripper element and the second gripper element, and the opening formed in the gripper drive gear may include an arcuate slot In some examples, the gripper advance system may additionally or alternatively include a linear track, a linear bearing coupled to the linear track, wherein the container gripper may be supported on the linear bearing, a gripper advance motor, and a drive belt coupled to the gripper advance motor and fixed to the linear bearing.

In some examples, the distributor moving system may include a distributor head frame mounted so as to be rotatable about a distributor axis of rotation, wherein the container gripper may be supported on the distributor head frame, a fixed sun gear arranged coaxially with the distributor axis, a distributor motor fixed to the distributor head frame and including a drive gear that operatively engages the fixed sun gear.

In some examples, the distributor moving system may additionally or alternatively include a distributor head frame mounted so as to be rotatable about a distributor axis of rotation, a fixed sun gear arranged coaxially with the distributor axis, and a distributor motor fixed to the distributor head frame and including a drive gear that operatively engages the fixed sun gear. In some examples, the gripper advance system may additionally or alternatively include a linear track supported on the distributor head frame and oriented radially with respect to the distributor axis, a linear bearing coupled to the linear track, wherein the container gripper may be supported on the linear bearing, a gripper advance motor mounted to the distributor head frame, and a drive belt operatively coupled to the gripper advance motor and attached to the linear bearing.

In some examples, the container storage module may additionally or alternatively include at least one thermal control component for maintaining a desired temperature within the housing, and the at least one thermal component may include one or more of a thermoelectric module, a heat sink, and a fan.

Examples described herein include a method for transferring a container that includes grooves formed on opposed sides of the container. The method may include the steps of moving a movable support platform from a non-accessible position to an accessible position to provide user access to a container loading transport supported on the movable support platform and including a plurality of container pockets, vertically inserting a container into each of one or more of the container pockets, moving the movable support platform from the accessible position to the non-accessible position, sequentially transporting the container pockets with the container loading transport to a container transfer position at a transfer opening formed in the movable support platform, grasping a container carried in one of the container pockets of the container loading transport located at the container transfer position by engaging the grooves of the container with a container gripper, moving the container gripper with a gripper advance system to laterally remove the container from the container pocket of the container loading transport in which the container may be held, moving the container gripper and the container held thereby with a distributor moving system from the container transfer position to an ingress/egress opening of a housing of a container storage module, engaging a pusher pin extending from a movable barrier of the container storage module with an actuator arm and moving the actuator arm with the distributor moving system to move the movable barrier of the container storage module from a first position blocking the container ingress/egress opening to a second position permitting a container to be moved laterally through the container ingress/egress opening, moving the container gripper with the gripper advance system to insert the container held by the gripper through the ingress/egress opening and into one of a plurality of container holding stations of a container storage transport disposed within the housing, wherein each container holding station may include spring tabs configured to resiliently engage the grooves of a container held in the container holding station to retain the container in the container holding station and to deflect outwardly to permit the container to be laterally inserted into or laterally removed from the container holding station, and releasing the container in the container holding station by disengaging the gripper from grooves of the container.

In some examples, moving a movable support platform may include moving a drawer that may be movable between the non-accessible position, in which the movable support platform may be retracted into an instrument, and the accessible position, in which the movable support platform may be extended from the instrument.

In some examples, the container loading transport may include a loading carousel supported on the movable support platform for rotation about a loading carousel axis, the container pockets may be arranged circumferentially around the loading carousel axis and may be open at their upper ends, and sequentially transporting the container pockets may include rotating the carousel about the carousel axis.

In some examples, the container pockets may additionally or alternatively be open at the outer periphery of the loading carousel, and grasping the container carried in one of the container pockets may include inserting the container gripper through the open outer periphery to engage the grooves of the container, and laterally removing the container from the container pocket may include moving the container with the container gripper through the open outer periphery.

In some examples, the method may additionally or alternatively include scanning machine-readable information on each container carried on the container loading transport with a scanner.

In some examples, the scanner may include a barcode scanner.

In some examples, the method may additionally or alternatively include monitoring a position of each container held in a pocket of the container loading transport with a home sensor for detecting a home position of the container loading transport.

In some examples, the method may additionally or alternatively include the automated steps of a) moving the container with the container storage transport to a level-sensing location within the housing, b) moving a movable grounding element with respect to the container until the grounding element may be in close proximity to or in contact with a portion of the container, c) lowering a conductive probe, or a conductive tip removably attached to the probe, through a container access opening in the housing and into the container, d) detecting a signal or a change of signal when the probe or conductive tip contacts the surface of a fluid within the container, wherein the signal or the change of signal may be based on electrical capacitance between the probe or conductive tip and the movable grounding element that may be in close proximity to or in contact with a portion of the container, and e) recording a vertical probe position at which the signal or the change of signal may be detected.

In some examples, the method may additionally or alternatively include the automated step off) contacting the container at the level-sensing location with a container positioner to force the container into a repeatable, vertical level-sensing position.

In some examples, the method may additionally or alternatively include the automates steps of g) contacting a container positioning ramp located adjacent to the container storage transport with a lower portion of the container positioned at the level-sensing location, and h) contacting a top portion of the container positioned at the level-sensing location and pushing the container down so that the bottom portion of the container maintains contact with the container positioning ramp.

In some examples, steps b) and h) are performed simultaneously.

In some examples, the method may additionally or alternatively include the step of i) during step b), automatically moving a shutter plate attached to the housing from a first position covering the container access opening to a second position exposing the container access opening.

Examples described herein include a mechanism for grasping and transferring a container, wherein the container may include parallel, vertically-oriented grooves formed on opposed sides of the container. The mechanism may include a chassis configured for rotation about a vertically-oriented chassis axis of rotation and a gripper carriage supported on the chassis for rotation therewith and configured for movement in a radial direction with respect to the chassis axis of rotation. The gripper carriage may include a container gripper comprising a first gripper element mounted to the gripper carriage for pivoting movement about a first gripper axis of rotation that may be parallel to the chassis axis of rotation and includes a first hook located at a radially-spaced position with respect to the first gripper axis of rotation and a second gripper element mounted to the gripper carriage for pivoting movement about a second gripper axis of rotation that may be parallel to the first gripper axis of rotation and including a second hook located at a radially-spaced position with respect to the second gripper axis of rotation. The first hook and the second hook may be bent toward each other, and the first gripper element and the second gripper element are coupled to one another for coordinated pivoting movement toward each other or away from each other about the respective first and second gripper axes of rotation. The container gripper may be configured to grasp a container by pivoting the first and second gripper elements toward each other until the respective first and second hooks each engage one of the vertically-oriented grooves of the container.

In some examples, the first gripper element and the second gripper element may be coupled to one another for coordinated pivoting movement by a first gripper element coupling gear attached to the first gripper element and arranged coaxially with the first gripper axis of rotation and a second gripper element coupling gear attached to the second gripper element and arranged coaxially with the second gripper axis of rotation. The first gripper element coupling gear and the second gripper element coupling gear are inter-engaged so that rotation of either the first gripper element or the second gripper element results in a corresponding, coordinated rotation of the other gripper element in an opposite rotational direction.

In some examples, the mechanism may additionally or alternatively include a gripper motor with a gripper actuator gear, a gripper drive gear mounted coaxially with the first gripper axis of rotation and configured for rotation independently of the first gripper element, wherein the gripper actuator gear may be engaged with the gripper drive gear, and a drive pin extending from the first gripper element at a position spaced from the first gripper axis of rotation, wherein the drive pin extends into an opening formed in the gripper drive gear.

In some examples, the mechanism may additionally or alternatively include a spring connected to at least one of the first gripper element and the second gripper element, and the opening formed in the gripper drive gear may include an arcuate slot.

In some examples, the mechanism may additionally or alternatively include a linear track, a linear bearing coupled to the linear track, wherein the gripper carriage may be supported on the linear bearing, a gripper advance motor, and a drive belt coupled to the gripper advance motor and attached to the linear bearing so that movement of the drive belt by the gripper advance motor moves the gripper carriage in the radial direction.

In some examples, the mechanism may additionally or alternatively include a fixed sun gear arranged coaxially with the chassis axis of rotation and a motor fixed to the chassis and including a drive gear that operatively engages the fixed sun gear so that rotation of the drive gear by the motor causes rotation of the chassis about the chassis axis of rotation.

Examples described herein include a mechanism for performing capacitive level sensing of fluid within a fluid container supported on a movable carrier. The mechanism may include a conductive probe configured for capacitive level sensing by detecting a signal or change of signal when the probe, or a conductive tip removably attached to the probe, contacts the surface of the fluid within the container, wherein the signal or change of signal is based on electrical capacitance between the probe or conductive tip and a grounded, conductive structure adjacent to or contacting the container, a probe position sensor for monitoring a vertical position of the probe and recording the vertical probe position at which the signal or detectable change of signal may be detected, and a movable grounding element, configured for selective movement relative to a container positioned by the movable carrier at a level-sensing location with respect to the probe until the grounding element may be in close proximity to or in contact with a portion of the container.

In some examples, a portion of the movable grounding element may be shaped to conform with the portion of the container.

In some examples, the mechanism may additionally or alternatively include a motor, a threaded rod operatively coupled to the motor, and a bracket operatively coupled to the threaded rod, wherein the movable grounding element may be attached to the bracket.

In some examples, the movable carrier may be contained within a housing having a top wall over the carrier, and a container access opening is formed through the top wall above the level-sensing location and is configured to permit the probe, or conductive tip removably attached to the probe, to enter a container located at the level-sensing location. The mechanism may additionally or alternatively include a shutter plate attached to the top wall and movable between a first position covering the container access opening and a second position exposing the container access opening. The shutter plate may be operatively coupled to the motor to effect powered movement of the shutter plate from the first position to the second position as the motor moves the movable grounding element into close proximity to or in contact with the portion of the container.

In some examples, the shutter plate may include a sector gear that may be pivotably mounted to the top wall and may include gear teeth along an arcuate edge thereof that engage a gear driven by the motor.

In some examples, the mechanism may additionally or alternatively include a container positioner configured to contact the container positioned at the level-sensing location and force the container into a repeatable, vertical level-sensing position.

In some examples, the container positioner may include a container positioning ramp configured to be contacted by a bottom portion of the container positioned at the level-sensing location and a container hold down arm configured to contact a top portion of the container positioned at the level-sensing location and push the container down so that the bottom portion of the container maintains contact with the container positioning ramp.

In some examples, the movable carrier may include a carousel rotatable about a vertically-oriented carousel axis of rotation and including a plurality of container holding stations disposed at angularly spaced positions about the carousel axis of rotation. Each container holding station may include spring tabs extending laterally with respect to the carousel axis of rotation and configured to resiliently engage the grooves of a container held in the container holding station to retain the container in the container holding station such that the container may be able to slide in a vertical direction between the spring tabs of the container holding station. The container positioning ramp may be disposed beneath a portion of the carousel and may be configured to be contacted by the bottom portion of the container held in a container holding station as the carousel moves the container into the level-sensing location, contact between the container and the container positioning ramp may slide the container within the container holding station to a position with the bottom of the container contacting the container positioning ramp, and the container hold down arm may be configured to contact the top portion of the container to slide the container within the container holding station down so that the bottom portion of the container maintains contact with the container positioning ramp.

In some examples, the container hold down arm may be coupled to the a movable grounding element so that when the movable grounding element moves into close proximity to or in contact with the portion of the container, the container hold down arm may be moved into contact with the top portion of the container to push the container down so that the bottom portion of the container maintains contact with the container positioning ramp.

In some examples, the container positioning ramp may include a sloped first end, a level center portion, and a sloped second end, and wherein the container may be positioned on the level center portion when the container may be positioned at the level-sensing location.

In some examples, the container positioning ramp may be shaped to conform to a portion of a path traversed by a container moved by the movable carrier through the level-sensing location.

In some examples, the mechanism may additionally or alternatively include a first roller at the beginning of the sloped first end to guide the bottom portion of a container onto the sloped first end.

In some examples, the mechanism may additionally or alternatively include a second roller at the beginning of the sloped second end to guide the bottom portion of a container onto the sloped second end.

In some examples, the movable carrier may be contained within a housing having a top wall over the carrier, and a container access opening is formed through the top wall above the level-sensing location and is configured to permit the probe, or conductive tip removably attached to the probe, to enter a container located at the level-sensing location through the container access opening. The mechanism may additionally or alternatively include a motor, a threaded rod operatively coupled to the motor, a follower block threadably coupled to the threaded rod, a bracket extending from the follower block, a shutter plate attached to the top wall and movable between a first position covering the container access opening and a second position exposing the container access opening, a container positioning ramp configured to be contacted by a bottom portion of the container positioned at the level-sensing location, and a container hold down arm configured for movement between a first position not contacting a container positioned at the level-sensing location and a second position contacting a top portion of the container positioned at the level-sensing location to push the container down so that the bottom portion of the container maintains contact with the container positioning ramp. The movable grounding element may be attached to the bracket, such that rotation of the threaded rod by the motor in a first direction causes the grounding element to move into close proximity or contact with the portion of the container, and rotation of the threaded rod by the motor in a second direction causes the grounding element to move away from close proximity or contact with the portion of the container. The shutter plate may be operatively coupled to the motor to effect powered movement of the shutter plate from the first position to the second position as the motor moves the movable grounding element into close proximity or contact with the portion of the container and to effect powered movement of the shutter plate from the second position to the first position as the motor moves the movable grounding element away from close proximity or contact with the portion of the container. The follower block may contact the container hold down arm to move the container hold down arm from its first position to its second position as the motor moves the movable grounding element into close proximity or contact with the portion of the container and moves the shutter plate from its first position to its second position.

In some examples, the shutter plate may include a sector gear that may be pivotably mounted to the top wall and may include gear teeth along an arcuate edge thereof that engage a gear driven by the motor coaxially with the threaded rod.

In some examples, the container hold down arm may be configured for pivoting movement between its first position and its second position, and wherein the mechanism may additionally or alternatively include a spring coupled to the container hold down arm to bias the container hold down arm in its first position.

Examples described herein include a method for performing capacitive level sensing of fluid within a container supported on a movable carrier. The method may include the automated steps of a) moving the container with the movable carrier to a level-sensing location, b) moving a movable grounding element with respect to the container until the grounding element may be in close proximity to or in contact with a portion of the container, c) lowering a conductive probe, or a conductive tip removably attached to the probe, into the container, d) detecting a signal or a change of signal when the probe or conductive tip contacts the surface of a fluid within the container, wherein the signal or the change of signal may be based on electrical capacitance between the probe or conductive tip and the movable grounding element that may be in close proximity to or in contact with a portion of the container, and e) recording a vertical probe position at which the signal or the change of signal may be detected.

In some examples, the method may additionally or alternatively include the automated step of f) contacting the container at the level-sensing location with a container positioner to force the container into a repeatable, vertical level-sensing position.

In some examples, step f) may include the automated steps of g) contacting a container positioning ramp located adjacent to the movable carrier with a bottom portion of the container positioned at the level-sensing location, and h) contacting a top portion of the container positioned at the level-sensing location and pushing the container down so that the bottom portion of the container maintains contact with the container positioning ramp.

In some examples, steps b) and h) are performed simultaneously.

In some examples, the container positioning ramp may include a sloped first end, a level center portion, and a sloped second end, and the container is positioned on the level center portion when the container is positioned at the level-sensing location.

In some examples, the container positioning ramp may additionally or alternatively include a first roller at the beginning of the sloped first end to guide the bottom portion of a container onto the sloped first end.

In some examples, the container positioning ramp may additionally or alternatively include a second roller at the beginning of the sloped second end to guide the bottom portion of a container onto the sloped second end.

In some examples, the movable carrier may include a carousel that is rotatable about a vertically-oriented carousel axis of rotation and includes a plurality of container holding stations disposed at angularly spaced positions about the carousel axis of rotation. Each container holding station may include spring tabs extending laterally with respect to the carousel axis of rotation and are configured to resiliently engage the grooves of a container held in the container holding station to retain the container in the container holding station such that the container may be able to slide in a vertical direction between the spring tabs of the container holding station. Contacting the bottom portion of the container with the container positioning ramp may slide the container within the container holding station to the repeatable, vertical level-sensing position, and contacting the top portion of the container with the container hold down arm slides the container within the container holding station down so that the bottom portion of the container maintains contact with the container positioning ramp.

In some examples, the carrier may be contained within a housing having a top wall over the carrier, and a container access opening is formed through the top wall above the level-sensing location and is configured to permit the probe, or conductive tip removably attached to the probe, to enter a container located at the level-sensing location. And the method may additionally or alternatively include performing the step of i) during step b), automatically moving a shutter plate attached to the top wall from a first position covering the container access opening to a second position exposing the container access opening.

In some examples, a portion of the movable grounding element may be shaped to conform with the portion of the container.

In some examples, the container positioning ramp may be shaped to conform to a portion of a path traversed by a container moved by the movable carrier through the level-sensing location.

Examples described herein include a mechanism for providing selective access to one of a plurality of containers within a substantially enclosed housing. The mechanism may include a movable carrier within the housing and configured to hold and carry the plurality of containers, a container access opening formed in a top wall of the housing at a position on a path traversed by the plurality of containers carried on the movable carrier so that movement of the carrier sequentially places each of the plurality of containers beneath the container access opening, and a shutter plate pivotably attached to the top wall of the housing and pivotable between a first position covering the container access opening to thereby prevent access through the container access opening to the container located beneath the container access opening and a second position exposing the container access opening to thereby allow access through the container access opening to the container located beneath the container access opening.

In some examples, the mechanism may additionally or alternatively include a motor operatively coupled to the shutter plate to effect powered movement of the shutter plate from the first position to the second position.

In some examples, the shutter plate may include a sector gear mounted for pivoting movement between the first positon and the second position and including gear teeth along an arcuate edge thereof that engage a gear driven by the motor.

In some examples, the mechanism may additionally or alternatively include a container hold down arm configured for movement between a first position not contacting a container positioned beneath the container access opening and a second position contacting a top portion of a container positioned beneath the container access opening to hold the container in a fixed vertical position. The motor may be coupled to the container hold down arm to move the container hold down arm from its first position to its second position as the motor moves the shutter plate from its first position to its second position.

In some examples, the mechanism may additionally or alternatively include a threaded rod operatively coupled to the motor, wherein the gear driven by the motor may be coaxially arranged with the threaded rod and a follower block threadably coupled to the threaded rod. The container hold down arm may be configured for pivoting movement between its first position and its second position, and the container hold down arm contacts the follower block so that as the gear driven by the motor rotates the sector gear to move the shutter plate from its first position to its second position, the threaded rod moves the follower block to move the container hold down arm from its first position to its second position.

In some examples, the mechanism may additionally or alternatively include a spring coupled to the container hold down arm to bias the container hold down arm in its first position.

Examples described herein include a method for providing selective access to one of a plurality of containers within a substantially enclosed housing. The method may include the automated steps of a) carrying the plurality of containers within the housing on a movable carrier, b) sequentially placing each of the plurality of containers carried on the movable carrier beneath a container access opening formed in a top wall of the housing, and c) automatically pivoting a shutter plate pivotably attached to the top wall of the housing from a first position covering the container access opening to a second position exposing the container access opening.

In some examples, the method may additionally or alternatively include the step of d) during step c) automatically contacting a top portion of the container positioned beneath the container access opening to hold the container at a fixed, vertical position.

In some examples, step d) may include contacting the top portion of the container positioned beneath the container access opening with a container hold down arm.

Examples described herein include a system for disposing of spent containers comprising a retainer cage disposed over a waste opening. The retainer cage may include opposed, vertically-oriented first and second sides, an upper retainer bar and a lower retainer bar extending laterally from the first side of the retainer cage toward the second side, and a container gripper. The upper and lower retainer bars are vertically spaced from one another and extend across a portion of the width of the retainer cage so as to leave a gap between the second side and terminal ends of the retainer bars. The gap between the upper and lower retainer bars and the second side may be configured to permit a container to be inserted through the gap. The container gripper is configured to hold the container, insert the container through the gap to a position between the first and second sides and to move to a position whereby the gripper may be positioned between the vertically-spaced upper and lower retainer bars and the container may be located behind the upper and lower retainer bars.

In some examples, the container includes grooves formed on opposed sides of the container, and the container gripper may include a gripper element mounting bracket, a first gripper element mounted to the gripper element mounting bracket for pivoting movement about a first gripper axis of rotation and including a first hook located at a radially-spaced position with respect to the first gripper axis of rotation and configured to seat in one of the grooves of the container, and a second gripper element mounted to the gripper element mounting bracket for pivoting movement about a second gripper axis of rotation that may be parallel to the first gripper axis of rotation and including a second hook located at a radially-spaced position with respect to the second gripper axis of rotation and configured to seat in the opposite groove of the container. The first hook and the second hook may be bent toward each other. The first gripper element and the second gripper element may be coupled to one another for coordinated pivoting movement toward each other or away from each other about the respective first and second gripper axes of rotation. The container gripper may be configured to grasp a container by pivoting the first and second gripper elements toward each other until the respective first and second hooks are seated within one of the grooves of the container. The first and second gripper elements fit between the vertically-spaced upper and lower retainer bars when grasping the container.

In some examples, the first gripper element and the second gripper element are coupled to one another for coordinated pivoting movement by a first gripper element coupling gear attached to the first gripper element and arranged coaxially with the first gripper axis of rotation and a second gripper element coupling gear attached to the second gripper element and arranged coaxially with the second gripper axis of rotation. The first gripper element coupling gear and the second gripper element coupling gear may be inter-engaged so that rotation of either the first gripper element or the second gripper element results in a corresponding, coordinated rotation of the other gripper element in an opposite rotational direction.

In some examples, the container gripper may additionally or alternatively include a gripper motor with a gripper actuator gear, a gripper drive gear mounted coaxially with the first gripper axis of rotation and configured for rotation independently of the first gripper element, wherein the gripper actuator gear may be engaged with the gripper drive gear, and a drive pin extending from the first gripper element at a position spaced from the first gripper axis of rotation, wherein the drive pin extends into an opening formed in the gripper drive gear.

In some examples, the container gripper may additionally or alternatively include a spring connected to at least one of the first gripper element and the second gripper element, and wherein the opening formed in the gripper drive gear may include an arcuate slot In some examples, the system may additionally or alternatively include a gripper advance system comprising a linear track, a linear bearing coupled to the linear track, wherein the container gripper may be supported on the linear bearing, a gripper advance motor, and a drive belt coupled to the gripper advance motor and fixed to the linear bearing.

In some examples, the gripper may additionally or alternatively include a chassis configured for rotation about a vertically-oriented chassis axis of rotation. The gripper mounting bracket may be supported on the chassis for rotation therewith, the first gripper axis of rotation may be parallel to the chassis axis of rotation, and the second gripper axis of rotation may be parallel to chassis axis of rotation.

Examples described herein include a method for disposing of spent containers. The method may include moving the spent container horizontally into a retainer cage disposed over a waste opening with a container gripper holding a spent container. The retainer cage may include opposed, vertically-oriented first and second sides and upper and lower retainer bars extending laterally from the first side of the retainer cage toward the second side. The upper and lower retainer bars may be vertically spaced from one another and may extend across a portion of the width of the retainer cage so as to leave a gap between terminal ends of the upper and lower retainer bars and the second side through which the container gripper moves the spent container horizontally into the retainer cage. The container gripper and the spent container held thereby are moved horizontally within the retainer cage until the container gripper extends through a gap between the vertically-spaced upper and lower retainer bars and the spent container may be disposed behind the upper and lower retainer bars, and the spent container is released from the container gripper so that the spent container falls through the waste opening over which the retainer cage may be disposed.

In some examples, the method may additionally or alternatively include a step of moving the container gripper horizontally from the gap between the vertically-spaced upper and lower retainer bars.

In some examples, the container includes grooves formed on opposed sides of the container, and the container gripper may include a gripper element mounting bracket, a first gripper element mounted to the gripper element mounting bracket for pivoting movement about a first gripper axis of rotation and including a first hook located at a radially-spaced position with respect to the first gripper axis of rotation and configured to seat in one of the grooves of the container, and a second gripper element mounted to the gripper element mounting bracket for pivoting movement about a second gripper axis of rotation that is parallel to the first gripper axis of rotation and includes a second hook located at a radially-spaced position with respect to the second gripper axis of rotation and is configured to seat in the opposite groove of the container. The first hook and the second hook may be bent toward each other, and the first gripper element and the second gripper element are coupled to one another for coordinated pivoting movement toward each other or away from each other about the respective first and second gripper axes of rotation. The container gripper may be configured to grasp a container by pivoting the first and second gripper elements toward each other until the respective first and second hooks are seated within one of the grooves of the container. The first and second gripper elements fit between the vertically-spaced upper and lower retainer bars when grasping the container.

In some examples, the first gripper element and the second gripper element may be coupled to one another for coordinated pivoting movement by a first gripper element coupling gear attached to the first gripper element and arranged coaxially with the first gripper axis of rotation, and a second gripper element coupling gear attached to the second gripper element and arranged coaxially with the second gripper axis of rotation. The first gripper element coupling gear and the second gripper element coupling gear may be inter-engaged so that rotation of either the first gripper element or the second gripper element results in a corresponding, coordinated rotation of the other gripper element in an opposite rotational direction.

In some examples, the container gripper may be actuated to hold the spent container or release the spent container by a gripper motor with a gripper actuator gear, a gripper drive gear mounted coaxially with the first gripper axis of rotation and configured for rotation independently of the first gripper element, wherein the gripper actuator gear may be engaged with the gripper drive gear, and a drive pin extending from the first gripper element at a position spaced from the first gripper axis of rotation, wherein the drive pin extends into an opening formed in the gripper drive gear.

In some examples, the container gripper may additionally or alternatively include a spring connected to at least one of the first gripper element and the second gripper element, and the opening formed in the gripper drive gear may include an arcuate slot In some examples, the spent container may be moved horizontally into the retainer cage with a gripper advance system that may include a linear track, a linear bearing coupled to the linear track, wherein the container gripper may be supported on the linear bearing, a gripper advance motor, and a drive belt coupled to the gripper advance motor and fixed to the linear bearing.

In some examples, the gripper and the spent container held thereby may be moved horizontally within the retainer cage by a chassis configured for rotation about a vertically-oriented chassis axis of rotation. The gripper mounting bracket may be supported on the chassis for rotation therewith, the first gripper axis of rotation may be parallel to the chassis axis of rotation, and the second gripper axis of rotation may be parallel to chassis axis of rotation.

Examples described herein include a mechanism for positioning a fluid container supported on a movable carrier at a predetermined location. The mechanism may include a container positioning ramp located adjacent to a portion of the moveable carrier and configured to be contacted by a bottom portion of a container supported on the movable carrier when the movable carrier moves the container to the predetermined location and a container hold down arm configured for selective movement relative to the container positioned at the predetermined location. The container hold down arm may be configured to contact a top portion of the container positioned at the predetermined location and push the container down so that the bottom portion of the container maintains contact with the container positioning ramp.

In some examples, the container positioning ramp may include a sloped first end, a level center portion, and a sloped second end, and the container is positioned on the level center portion when the container is positioned at the level-sensing location.

In some examples, the mechanism may additionally or alternatively include a roller at the beginning of the sloped first end to guide the bottom portion of a container onto the sloped first end.

In some examples, the mechanism may additionally or alternatively include a motor, a threaded rod operatively coupled to the motor, and a follower block threadably coupled to the threaded rod. The follower block may contact the container hold down arm to move the container hold down arm from its first position to its second position as the motor moves the follower block.

In some examples, the movable carrier may be contained within a housing having a top wall over the carrier, and a container access opening is formed through the top wall above the predetermined location and is configured to permit a fluid transfer probe, or tip removably attached to the fluid transfer probe, to enter a container located beneath the container access opening. The mechanism may additionally or alternatively include a shutter plate attached to the top wall and movable between a first position covering the container access opening and a second position exposing the container access opening. The shutter plate may be operatively coupled to the motor to effect powered movement of the shutter plate from the first position to the second position as the motor moves the follower block to move the container hold down arm from its first position to its second position.

In some examples, the movable carrier may include a carousel that is rotatable about a vertically-oriented carousel axis of rotation and including a plurality of container holding stations disposed at angularly spaced positions about the carousel axis of rotation. Each container holding station may include spring tabs extending laterally with respect to the carousel axis of rotation and configured to resiliently engage the grooves of a container held in the container holding station to retain the container in the container holding station such that the container may be able to slide in a vertical direction between the spring tabs of the container holding station. The container positioning ramp may be disposed beneath a portion of the carousel and may be configured to be contacted by the bottom portion of the container held in a container holding station as the carousel moves the container into the predetermined location.

Contact between the container and the container positioning ramp may slide the container within the container holding station to a position with the bottom of the container contacting the container positioning ramp. The container hold down arm may be configured to contact the top portion of the container to slide the container within the container holding station down so that the bottom portion of the container maintains contact with the container positioning ramp.

Examples described herein include a mechanism for holding and moving a plurality of containers, each container including vertically-oriented grooves formed on opposed sides of the container. The mechanism may include a carousel configured to be rotatable about a vertical-oriented axis of rotation, and the carousel may include a plurality of container-holding pockets arranged circumferentially around an outer periphery of the carousel. Each container-holding pocket may be open at the outer periphery of the carousel to permit a container to be withdrawn out of the pocket in a radial direction with respect to the axis of rotation, and each container-holding pocket may include retention clips configured to engage the grooves formed on the container to removably retain the container within the container pocket.

In some examples, each container-holding pocket may include a relief formed on opposed sides of the open peripheral end of the container pocket to provide clearance for a gripping mechanism to open to engage or disengage the grooves of a container held within the container-holding pocket.

In some examples, the mechanism may additionally or alternatively include a scanner configured to scan machine-readable information on each container carried in a container-holding pocket on the carousel.

In some examples, the scanner may include a barcode scanner.

In some examples, the mechanism may additionally or alternatively include a machine-readable tag disposed on a wall of each container pocket, and the scanner may be configured to detect the machine-readable tag when the container pocket is empty.

In some examples, the mechanism may additionally or alternatively include a motor coupled to the carousel to effect powered rotation of the carousel about the carousel axis.

In some examples, each container-holding pocket may include a container positioning cleat configured to engage a notch formed in a container positioned within the container holding pocket.

In some examples, the mechanism may additionally or alternatively include a home sensor for detecting a home rotational position of the carousel.

Examples described herein include a method for holding and transporting a plurality of containers, each container including vertically-oriented grooves formed on opposed sides of the container. The method may include transporting the containers in container-holding pockets formed about the periphery of a carousel that is rotatable about a vertical-oriented axis of rotation, removably retaining each container in an associated container-holding pocket with retention clips engaged with the grooves formed on the container, and laterally removing each container from its associated container-holding pocket through an open outer peripheral side of the container-holding pocket.

In some examples, each container-holding pocket may include a relief formed on opposed sides of the open outer peripheral side of the container pocket, and laterally removing each container from its associated container-holding pocket may include engaging the grooves of the container with a container gripper that accesses the grooves of the container through the reliefs.

In some examples, the method may additionally or alternatively include scanning machine-readable information on each container carried in a container-holding pocket on the carousel with a scanner.

In some examples, the scanner may include a barcode scanner.

In some examples, the method may additionally or alternatively include scanning a machine-readable tag disposed on a wall of a container pocket with the scanner when the container pocket is empty.

In some examples, a motor may additionally or alternatively be coupled to the carousel to effect powered rotation of the carousel about the carousel axis.

In some examples, the method may additionally or alternatively include engaging a notch formed in each container with a container positioning cleat that extends into the container-holding pocket.

Examples described herein include a carrier for a plurality of containers, each container including grooves formed on opposed sides of the container. The carrier may include a carousel that is rotatable about a vertically-oriented carousel axis of rotation and includes a plurality of container holding stations disposed at angularly spaced positions about the carousel axis of rotation. Each container holding station may include spring tabs extending laterally with respect to the carousel axis of rotation and that are configured to resiliently engage the grooves of a container held in the container holding station to retain the container in the container holding station, such that the container may be able to slide in a vertical direction between the spring tabs of the container holding station. The carrier may include a container positioning ramp disposed beneath a portion of the carousel and configured to be contacted by a bottom portion of a container held in a container holding station as the carousel moves the container holding station over the container positioning ramp. Contact between the container and the container positioning ramp may slide the container within the container holding station to a position with the bottom of the container contacting the container positioning ramp. The carrier may include a container hold down arm configured for selective movement relative to the container contacting the container positioning ramp, and the container hold down arm may be configured to contact a top portion of the container to slide the container within the container holding station down so that the bottom portion of the container maintains contact with the container positioning ramp.

In some examples, the carousel may include an upper clip ring including multiple pairs of opposed, facing spring tabs and a lower clip ring including multiple pairs of opposed, facing spring tabs, and each pair of spring tabs of the upper clip ring may be aligned with a corresponding pair of spring tabs of the lower clip ring to define each container holding station.

In some examples, the upper clip ring may be spaced apart from the lower clip ring so that each pair of spring tabs of the upper clip ring may be spaced apart from the corresponding pair of spring tabs of the lower clip ring.

In some examples, each spring tab may include a knuckle bent inwardly toward the opposed, facing spring tab of each pair of spring tabs, and each knuckle may seat into one of the grooves of the container disposed in the holding station.

In some examples, the carrier may additionally or alternatively include a motor, a threaded rod operatively coupled to the motor, and a follower block threadably coupled to the threaded rod. The follower block may contact the container hold down arm to move the container hold down arm from a first position not contacting the top of the container to a second position contacting the top of the container as the motor moves the follower block.

In some examples, the container hold down arm may be pivotably mounted within a mounting yoke, a first end of the hold down arm may be contacted by the follower block, and a second end of the hold down arm may contact the container when the first end is contacted by the follower block to pivot the hold down arm.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
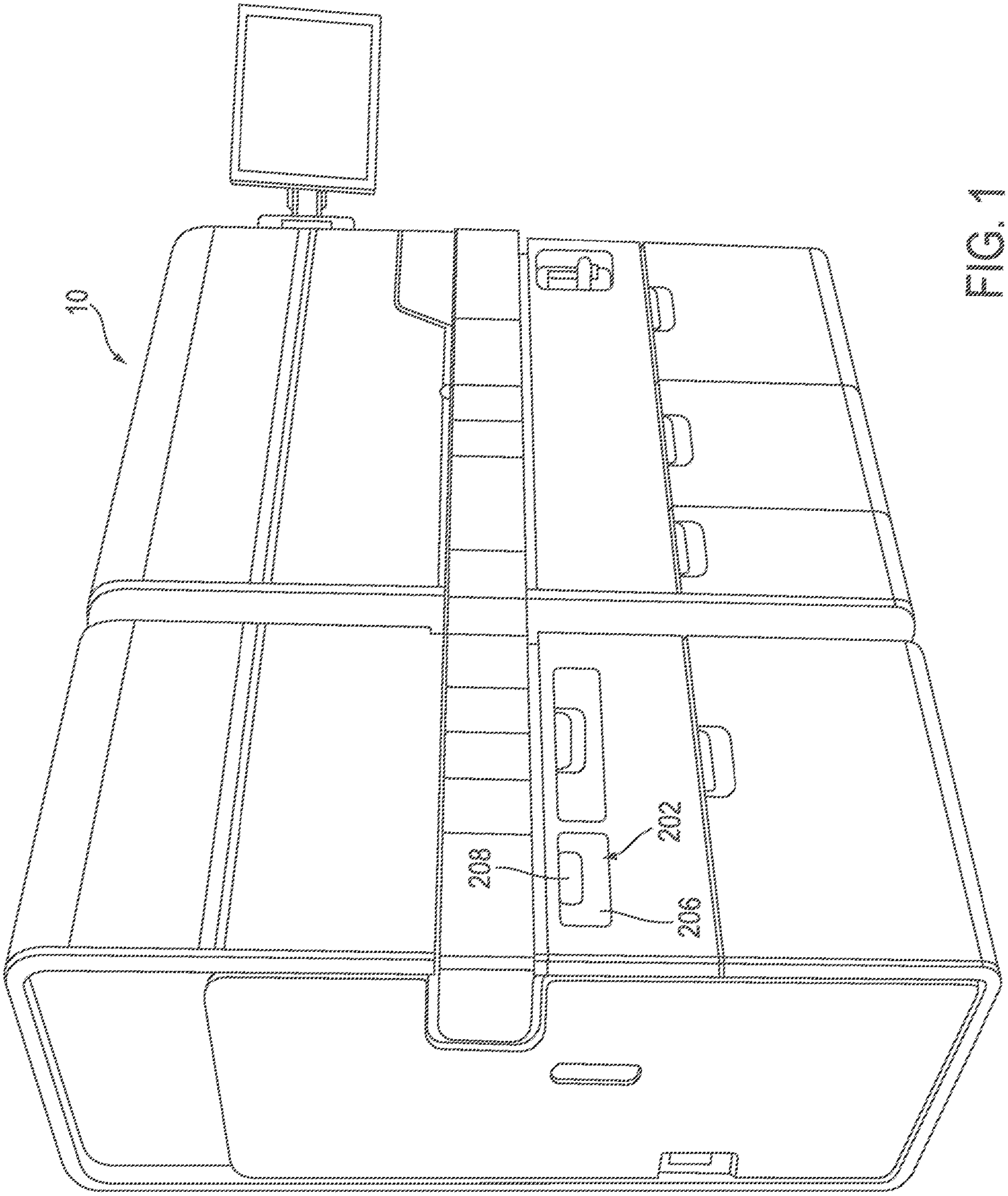
FIG. 1 is a perspective view of an instrument in which a fluid container management system described herein may be employed.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, patent applications, published patent applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Definitions

Unless otherwise indicated or the context suggests otherwise, as used herein, "a" or "an" means "at least one" or "one or more."

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Unless otherwise stated, any specific dimensions mentioned in this description are merely representative of an exemplary implementation of a device embodying aspects of the disclosure and are not intended to be limiting.

To the extent used herein, the term "adjacent" refers to being near or adjoining. Adjacent objects can be spaced apart from one another or can be in actual or direct contact with one another. In some instances, adjacent objects can be coupled to one another or can be formed integrally with one another.

To the extent used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

To the extent used herein, a "molecular assay" refers to a procedure for specifically detecting and/or quantifying a target molecule, such as a target nucleic acid. A sample containing or suspected of containing the target molecule is contacted with one or more reagents, including at least one reagent specific for the target molecule, and subjected to conditions permissive for generating a detectable signal informative of whether the target molecule is present. For example, where the molecular assay is Polymerase Chain Reaction (PCR), the reagents include primers specific for the target and the generation of a detectable signal can be accomplished at least in part by providing a labeled probe that hybridizes to the amplicon produced by the primers in the presence of the target. Alternatively, the reagents can include an intercalating dye for detecting the formation of double-stranded nucleic acids.

To the extent used herein, a "reagent" refers to any substance or combination thereof that participates in a molecular assay, other than sample material and products of the assay. Exemplary reagents include nucleotides, enzymes, amplification oligomers, probes, and salts.

To the extent used herein, an "assay" refers to a procedure for detecting and/or quantifying a target molecule, or analyte, in a sample. A sample containing or suspected of containing the target molecule is contacted with one or more reagents and subjected to conditions permissive for generating a detectable signal informative of whether the target molecule is present in the sample or the amount of the target molecule in the sample.

As used herein, a "sample" refers to any substance suspected of containing an organism, virus or cell of interest or, alternatively, an analyte derived from an organism, virus or cell of interest, or any substance suspected of containing an analyte of interest. The substance may be, for example, an unprocessed clinical specimen, such as a blood or genitourinary tract specimen, a buffered medium containing the specimen, a medium containing the specimen and lytic agents for releasing an analyte belonging to an organism, virus or cell, or a medium containing an analyte derived from an organism, virus or cell which has been isolated and/or purified ("extracted") in a receptacle or on a material or device. For this reason, the term "sample" will be understood to mean a specimen in its raw form or to any stage of processing to release, isolate and purify ("extract") an analyte derived from the organism, virus or cell. Thus, references to a "sample" may refer to a substance suspected of containing an analyte derived from an organism, virus or cell at different stages of processing and is not limited to the initial form of the substance.

"Nucleic acid" and "polynucleotide" refer to a multimeric compound comprising nucleosides or nucleoside analogs which have nitrogenous heterocyclic bases or base analogs linked together to form a polynucleotide, including conventional RNA, DNA, mixed RNA-DNA, and polymers that are analogs thereof. A nucleic acid "backbone" can be made up of a variety of linkages, including one or more of sugar-phosphodiester linkages, peptide-nucleic acid bonds ("peptide nucleic acids" or PNA; International Publication No. WO 95/32305), phosphorothioate linkages, methylphosphonate linkages, or combinations thereof. Sugar moieties of a nucleic acid can be ribose, deoxyribose, or similar compounds with substitutions, e.g., 2' methoxy or 2' halide substitutions. Nitrogenous bases can be conventional bases (A, G, C, T, U), analogs thereof (e.g., inosine or others; see *The Biochemistry of the Nucleic Acids* 5-36, Adams et al., ed., $11^{th}$ ed., 1992), derivatives of purines or pyrimidines (e.g., $N^4$-methyl guanine, $N^6$-methyladenine, deaza- or aza-purines, deaza- or aza-pyrimidines, pyrimidine bases with substituent groups at the 5 or 6 position (e.g., 5-methylcytosine), purine bases with a substituent at the 2, 6, or 8 positions, 2-amino-6-methylaminopurine, $O^6$-methylguanine, 4-thio-pyrimidines, 4-amino-pyrimidines, 4-dimethylhydrazine-pyrimidines, and $O^4$-alkyl-pyrimidines; U.S. Pat. No. 5,378,825 and International Publication No. WO 93/13121). Nucleic acids can include one or more "abasic" residues where the backbone includes no nitrogenous base for position(s) of the polymer (U.S. Pat. No. 5,585,481). A nucleic acid can comprise only conventional RNA or DNA sugars, bases and linkages, or can include both conventional components and substitutions (e.g., conventional bases with 2' methoxy linkages, or polymers containing both conventional bases and one or more base analogs). Nucleic acid includes "locked nucleic acid" (LNA), an analogue containing one or more LNA nucleotide monomers with a bicyclic furanose unit locked in an RNA mimicking sugar conformation, which enhance hybridization affinity toward complementary RNA and DNA sequences (Vester and Wengel, 2004, *Biochemistry* 43(42):13233-41). Embodiments of oligomers that can affect stability of a hybridization complex include PNA oligomers, oligomers that include 2'-methoxy or 2'-fluoro substituted RNA, or oligomers that affect the overall charge, charge density, or steric associations of a hybridization complex, including oligomers that contain charged linkages (e.g., phosphorothioates) or neutral groups (e.g., methylphosphonates). Methylated cytosines such as 5-methylcytosines can be used in conjunction with any of the foregoing backbones/sugars/linkages including RNA or DNA backbones (or mixtures thereof) unless otherwise indicated. RNA and DNA equivalents have different sugar moieties (i.e., ribose versus deoxyribose) and can differ by the presence of uracil in RNA and thymine in DNA. The differences between RNA and DNA equivalents do not contribute to differences in homology because the equivalents have the same degree of complementarity to a particular sequence. It is understood that when referring to ranges for the length of an oligonucleotide, amplicon, or other nucleic acid, that the range is inclusive of all whole numbers (e.g., 19-25 contiguous nucleotides in length includes 19, 20, 21, 22, 23, 24, and 25).

"Nucleic acid amplification" or simply "amplification" refers to any in vitro procedure that produces multiple copies of a target nucleic acid sequence, or its complementary sequence, or fragments thereof (i.e., an amplified sequence containing less than the complete target nucleic acid). Amplification methods include, for example, replicase-mediated amplification, polymerase chain reaction (PCR), ligase chain reaction (LCR), strand-displacement amplification (SDA), helicase-dependent amplification (HDA), transcription-mediated amplification (TMA), and nucleic acid sequence-based amplification (NASBA). TMA and NASBA are both forms of transcription-based amplification. Replicase-mediated amplification uses self-replicating RNA molecules, and a replicase such as QB-replicase (see, e.g., U.S. Pat. No. 4,786,600). PCR uses a DNA polymerase, pairs of primers, and thermal cycling to synthesize multiple copies of two complementary strands of dsDNA or from a cDNA (see, e.g., U.S. Pat. Nos. 4,683,195, 4,683,202, and 4,800,159). LCR uses four or more different oligonucleotides to amplify a target and its complementary strand by using multiple cycles of hybridization, ligation, and denaturation (see, e.g., U.S. Pat. Nos. 5,427,930 and 5,516,663). SDA uses a primer that contains a recognition site for a restriction endonuclease and an endonuclease that nicks one strand of a hemimodified DNA duplex that includes the target sequence, whereby amplification occurs in a series of primer extension and strand displacement steps (see, e.g., U.S. Pat. Nos. 5,422,252, 5,547,861, and 5,648,211). HDA uses a helicase to separate the two strands of a DNA duplex generating single-stranded templates, followed by hybridization of sequence-specific primers hybridize to the templates and extension by DNA polymerase to amplify the target sequence (see, e.g., U.S. Pat. No. 7,282,328). Transcription-based amplification uses a DNA polymerase, an RNA polymerase, deoxyribonucleoside triphosphates, ribonucleoside triphosphates, a promoter-containing oligonucleotide, and optionally can include other oligonucleotides, to ultimately produce multiple RNA transcripts from a nucleic acid template. Examples of transcription-based amplification are described in U.S. Pat. Nos. 4,868,105, 5,124,990, 5,130,238, 5,399,491, 5,409,818, and 5,554,516; and in International Publication Nos. WO 88/01302, WO 88/10315 and WO 95/03430. Amplification may be either linear or exponential.

In cyclic amplification methods that detect amplicons in real-time, the term "threshold cycle" (Ct) is a measure of the emergence time of a signal associated with amplification of target, and may, for example, be approximately 10× standard deviation of the normalized reporter signal. Once an amplification reaches the "threshold cycle," generally there is considered to be a positive amplification product of a sequence to which the probe binds. Binding of the probe generally provides substantial information about the identity of the product (e.g., that it is an amplicon from a particular target sequence or a member of a certain class of alleles of a gene in the case of one or more allele-specific probe(s)). The amplification product can additionally be further characterized through methods known to one of skill in the art, such as gel electrophoresis, nucleic acid sequencing, and other such analytical procedures.

An "oligomer" or "oligonucleotide" refers to a nucleic acid of generally less than 1,000 nucleotides (nt), including those in a size range having a lower limit of about 2 to 5 nt and an upper limit of about 500 to 900 nt. Some particular embodiments are oligomers in a size range with a lower limit of about 5 to 15, 16, 17, 18, 19, or 20 nt and an upper limit of about 50 to 600 nt, and other particular embodiments are in a size range with a lower limit of about 10 to 20 nt and an upper limit of about 22 to 100 nt. Oligomers can be purified from naturally occurring sources, but can be synthesized by using any well-known enzymatic or chemical method. Oligomers can be referred to by a functional name (e.g., capture probe, primer or promoter primer) but those skilled in the art will understand that such terms refer to oligomers. Oligomers can form secondary and tertiary structures by self-hybridizing or by hybridizing to other polynucleotides. Such structures can include, but are not limited to, duplexes, hairpins, cruciforms, bends, and triplexes. Oligomers may be generated in any manner, including chemical synthesis, DNA replication, reverse transcription, PCR, or a combination thereof. In some embodiments, oligomers that form invasive cleavage structures are generated in a reaction (e.g., by extension of a primer in an enzymatic extension reaction).

By "amplicon" or "amplification product" is meant a nucleic acid molecule generated in a nucleic acid amplification reaction and which is derived from a target nucleic acid. An amplicon or amplification product contains a target nucleic acid sequence that can be of the same or opposite sense as the target nucleic acid. In some embodiments, an amplicon has a length of about 100-2000 nucleotides, about 100-1500 nucleotides, about 100-1000 nucleotides, about 100-800 nucleotides, about 100-700 nucleotides, about 100-600 nucleotides, or about 100-500 nucleotides.

An "amplification oligonucleotide" or "amplification oligomer" refers to an oligonucleotide that hybridizes to a target nucleic acid, or its complement, and participates in a nucleic acid amplification reaction, e.g., serving as a primer and/or promoter-primer. Particular amplification oligomers contain at least 10 contiguous bases, and optionally at least 11, 12, 13, 14, 15, 16, 17, 18, 19, or 20 contiguous bases, that are complementary to a region of the target nucleic acid sequence or its complementary strand. The contiguous bases can be at least 80%, at least 90%, or completely complementary to the target sequence to which the amplification oligomer binds. In some embodiments, an amplification oligomer comprises an intervening linker or non-complementary sequence between two segments of complementary sequence, e.g., wherein the two complementary segments of the oligomer collectively comprise at least 10 complementary bases, and optionally at least 11, 12, 13, 14, 15, 16, 17, 18, 19, or 20 complementary bases. One skilled in the art will understand that the recited ranges include all whole and rational numbers within the range (e.g., 92% or 98.377%). Particular amplification oligomers are 10 to 60 bases long and optionally can include modified nucleotides.

A "primer" refers to an oligomer that hybridizes to a template nucleic acid and has a 3' end that is extended by polymerization. A primer can be optionally modified, e.g., by including a 5' region that is non-complementary to the target sequence. Such modification can include functional additions, such as tags, promoters, or other sequences that may be used or useful for manipulating or amplifying the primer or target oligonucleotide. Examples of primers incorporating tags, or tags and promoter sequences, are described in U.S. Pat. No. 9,284,549. A primer modified with a 5' promoter sequence can be referred to as a "promoter-primer." A person of ordinary skill in the art of molecular biology or biochemistry will understand that an oligomer that can function as a primer can be modified to include a 5' promoter sequence and then function as a promoter-primer, and, similarly, any promoter-primer can serve as a primer with or without its 5' promoter sequence.

"Detection oligomer" or "detection probe" as used herein refers to an oligomer that interacts with a target nucleic acid to form a detectable complex. A probe's target sequence generally refers to the specific sequence within a larger sequence (e.g., gene, amplicon, locus, etc.) to which the probe specifically hybridizes. A detection oligomer can include target-specific sequences and a non-target-complementary sequence. Such non-target-complementary sequences can include sequences which will confer a desired secondary or tertiary structure, such as a flap or hairpin structure, which can be used to facilitate detection and/or amplification (e.g., U.S. Pat. Nos. 5,118,801, 5,312,728, 6,835,542, 6,849,412, 5,846,717, 5,985,557, 5,994,069, 6,001,567, 6,913,881, 6,090,543, and 7,482,127; International Publication Nos. WO 97/27214 and WO 98/42873; Lyamichev et al., Nat. Biotech., 17:292 (1999); and Hall et al., PNAS, USA, 97:8272 (2000)). Probes of a defined sequence can be produced by techniques known to those of ordinary skill in the art, such as by chemical synthesis, and by in vitro or in vivo expression from recombinant nucleic acid molecules.

"Label" or "detectable label" as used herein refers to a moiety or compound that is detected or leads to a detectable signal. The label may be joined directly or indirectly to a probe or it may be, for example, an intercalating dye (e.g., SYBR® Green). Direct joining can use covalent bonds or non-covalent interactions (e.g., hydrogen bonding, hydrophobic or ionic interactions, and chelate or coordination complex formation), whereas indirect joining can use a bridging moiety or linker (e.g., via an antibody or additional oligonucleotide(s). Any detectable moiety can be used, e.g., radionuclide, ligand such as biotin or avidin, enzyme, enzyme substrate, reactive group, chromophore such as a dye or particle (e.g., latex or metal bead) that imparts a detectable color, luminescent compound (e.g. bioluminescent, phosphorescent, or chemiluminescent compound), and fluorescent compound (i.e., fluorophore). Embodiments of fluorophores include those that absorb light (e.g., have a peak absorption wavelength) in the range of 495 to 690 nm and emit light (e.g., have a peak emission wavelength) in the range of 520 to 710 nm, which include those known as FAM®, TET®, HEX®, CAL FLUOR® (Orange or Red), CY®, and QUASAR® compounds. Fluorophores can be used in combination with a quencher molecule that absorbs light when in close proximity to the fluorophore to diminish background fluorescence. Such quenchers are well known in the art and include, e.g., BLACK HOLE QUENCHER® (or BHQ®), Blackberry Quencher® (or 3BQ-650®), Eclipse® or TAMRA™ compounds. Particular embodiments include a "homogeneous detectable label" that is detectable in a homogeneous system in which bound labeled probe in a mixture exhibits a detectable change compared to unbound labeled probe, which allows the label to be detected without physically removing hybridized from unhybridized labeled probe (e.g., U.S. Pat. Nos. 5,283,174, 5,656,207, and 5,658,737). Exemplary homogeneous detectable labels include chemiluminescent compounds, including acridinium ester ("AE") compounds, such as standard AE or AE derivatives which are well known (U.S. Pat. Nos. 5,656,207, 5,658,737, and 5,639,604). Methods of synthesizing labels, attaching labels to nucleic acid, and detecting signals from labels are known (e.g., Sambrook et al., *Molecular Cloning, A Laboratory Manual,* 2nd ed. (Cold Spring Harbor Laboratory Press, Cold Spring Harbor, N Y, 1989) at Chapt. 10, and U.S. Pat. Nos. 5,658,737, 5,656,207, 5,547,842, 5,283,174, 5,585,481, 5,639,604, and 4,581,333, and European Patent No. 0 747 706). Other detectably labeled probes include FRET cassettes, TaqMan® probes, and probes that undergo a conformational change in the presence of a targeted nucleic acid, such as molecular torches and molecular beacons. FRET cassettes are described in U.S. Patent Application Publication No. 2005/0186588 and U.S. Pat. No. 9,096,893. TaqMan® probes include a donor and acceptor label wherein fluorescence is detected upon enzymatically degrading the probe during amplification in order to release the fluorophore from the presence of the quencher. Chemistries for performing TaqMan assays are described in PCT Application No. PCT/US2018/024021, filed Mar. 23, 2018, and U.S. Pat. No. 5,723,591. Molecular torches and beacons exist in open and closed configurations wherein the closed configuration quenches the fluorophore and the open position separates the fluorophore from the quencher to allow a change in detectable fluorescent signal. Hybridization to target opens the otherwise closed probes. Molecular torches are described in U.S. Pat. No. 6,361,945; and molecular beacons are described in U.S. Pat. No. 6,150,097.

A "reconstitution solution" as used herein refers to a solvent (including water, organic solvents, and mixtures thereof) or buffer that can be used to dissolve another substance, such as a dried substance (e.g., lyophilisate). As used herein the terms "reconstitution solution" and "solvent" may be used interchangeably, as may the terms "reconstitute" and "dissolve."

The terms "lyophilization," "lyophilized," and "freeze-dried" as used herein refer to a process by which the material to be dried is first frozen and then the ice or frozen solvent is removed by sublimation in a vacuum environment. "Lyophilisate" refers to lyophilized material. A "lyophilized reagent" is a lyophilisate comprising at least one reagent.

System Overview

A fluid container management system is described herein that facilitates manual introduction of fluid containers (e.g., containers, such as vials, containing reagents or other process fluids) to a processing instrument followed by automated transfer of the container from a container loading interface to a container storage module, storage of the containers (e.g., in a temperature-controlled environment), automated transfer from each container of controlled amounts of the contents of the container and monitoring of the amount of fluid contained within each container, and automated discarding of the container when it is empty or otherwise no longer of further use. The processing instrument in which the system may be incorporated may be an analyzer for performing a biological, chemical, biochemical, or other multi-step analytical process, such as a molecular analyzer 10 shown in FIG. 1 for performing nucleic acid-based amplification reactions. Exemplary processing instruments include analyzers described in U.S. Pat. Nos. 8,731,712 and 9,732,374 and International Publication No. WO 2019/014239 A1, as well as the Panther Fusion® system available from Hologic, Inc. (Marlborough, MA).

Figure 2:
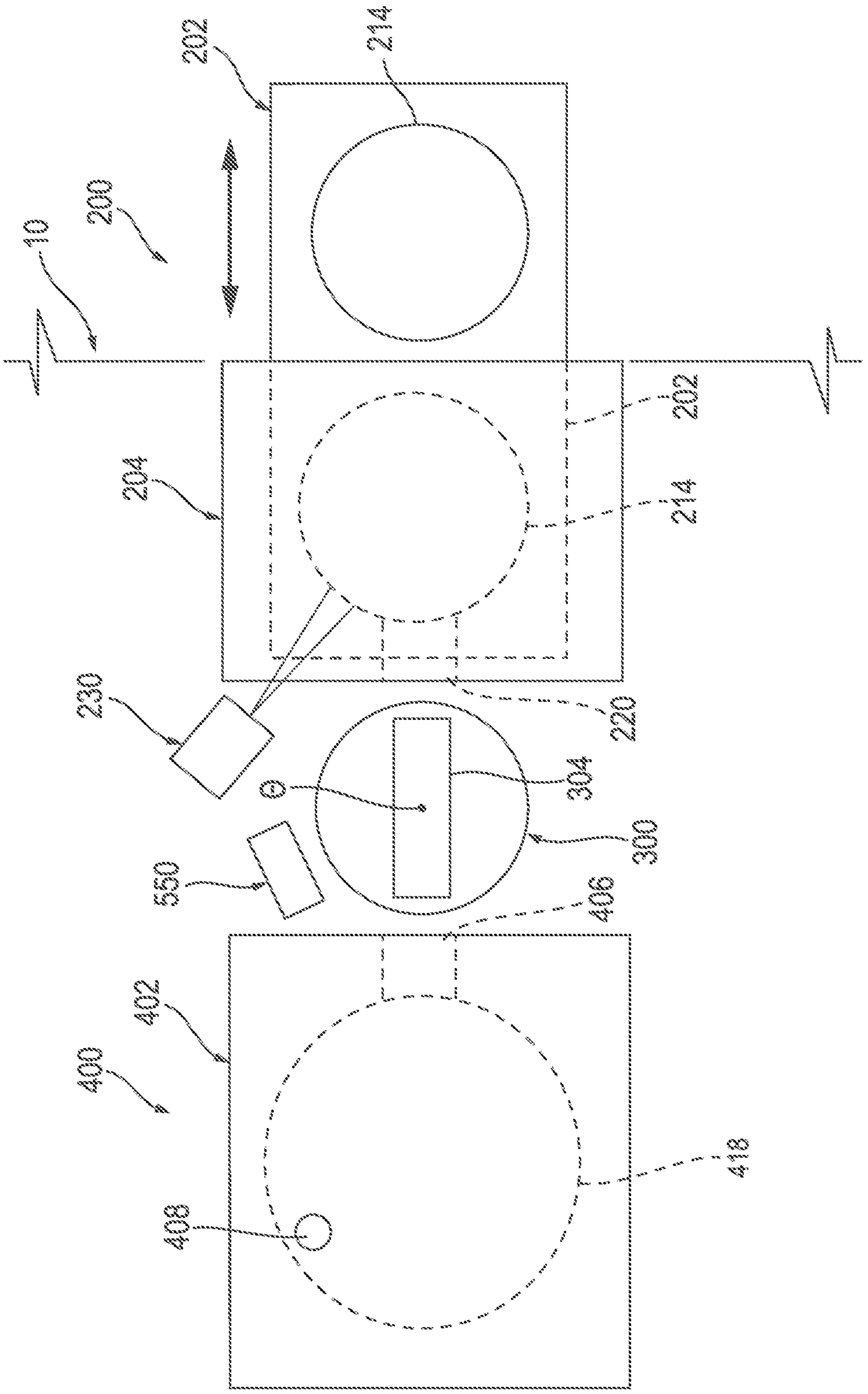
FIG. 2 is a schematic representation of a fluid container management system as described herein.

Major components or modules of the fluid container management system are shown in schematically in FIG. 2. In general, the system includes a container loading interface 200, a container distributor 300, a container storage module 400, and a container disposal module 550. Although the container loading interface 200, container distributor 300, container storage module 400, and container disposal module 550 are described as part of the fluid container management system, each of the modules 200, 300, 400, and 500 is capable of independent operation, or two or more, but less than all, of the modules may be operated together.

Loading interface 200 generally includes a container loading transport 214 supported on a movable support platform 202. Support platform 202 is movable between an accessible position, e.g., extending in drawer-like fashion from processing instrument 10, as shown in solid lines in FIG. 2, in which the container loading transport 214 is accessible to a user, and a non-accessible position, shown in dashed lines in FIG. 2, in which the container loading transport 214 is disposed within a support frame 204 within the processing instrument 10 and is not accessible to a user. A transfer opening 220 formed in the support frame 204 allows containers to be removed from the container loading transport 214 and the loading interface 200. An optional scanner 230 is configured to scan machine-readable identification information (e.g., a barcode (1D or 2D) or RFID tag) on each container 100 carried on the container loading transport 214.

Container storage module 400 includes a housing or enclosure 402 defining a chamber therein. The chamber within the housing 402 may be temperature-controlled, and container storage module 400 may include means for controlling the temperature within housing 402, such as insulation in one or more walls of the housing 402, heating and/or cooling elements, such as Peltier devices, temperature distribution or dissipation components, such as heat sinks and/or air circulation fans, temperature sensing elements, and temperature control circuitry that receives and processes data from the temperature sensing elements and transmits operating signals to the heating and/or cooling elements. A container storage transport 418 contained within the housing 402, and shown in dashed lines therein, is configured to carry a plurality of containers and transport them within the housing 402. A container ingress/egress opening 406 permits containers to be inserted into and removed from the housing 402. A container access opening 408 formed in a top wall of the housing 402 allows access into a container 100 aligned with the opening 408, such as by a pipettor.

Container distributor 300 includes a distributor head 304 with a mechanism for grasping individual containers carried on the container loading transport 214 through the transfer opening 220. The distributor head 304 is a mechanism configured to remove the container 100 from the container loading transport 214, hold and transfer the removed container 100 to the container ingress/egress opening 406 of the container storage module 400 (e.g., by rotation of the distributor head 304 about an axis of rotation Θ), open a door or other barrier covering the ingress/egress opening 406, and insert the container 100 into the housing 402 and onto the container storage transport 418. Distributor head 304 is further configured to open the door or other barrier covering the ingress/egress opening 406, remove a container

100 from the container storage transport 418 through the ingress/egress opening 406 of the container storage module 400, transfer the container 100 to the waste disposal module 550, and deposit the container 100 into the waste disposal module 550.

Further details of each component or module are described below.

Fluid Containers

Figure 4:
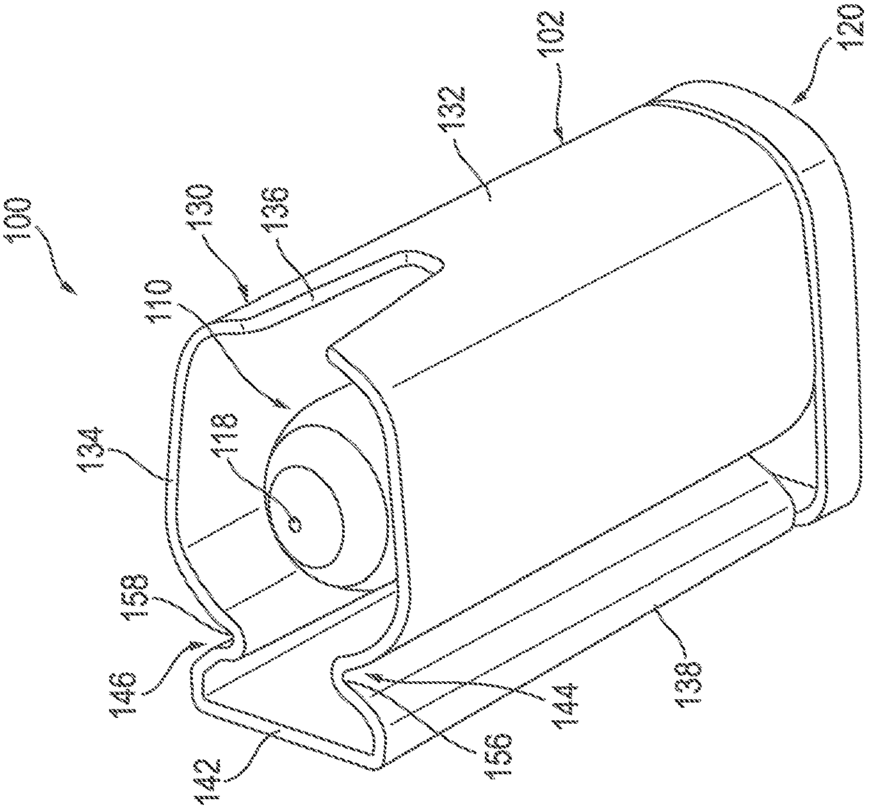
FIG. 4 is a bottom perspective view of the container.
Figure 3:
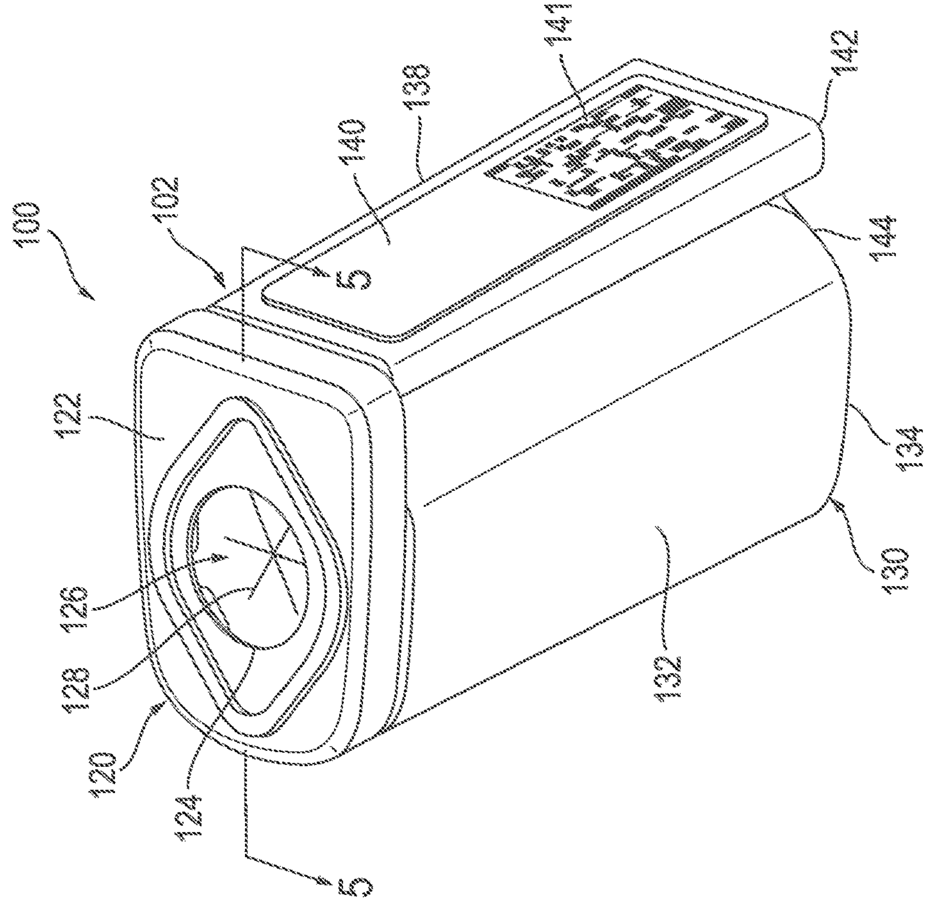
FIG. 3 is a top perspective view of a fluid container that may be managed in the fluid container management system.
Figure 5:
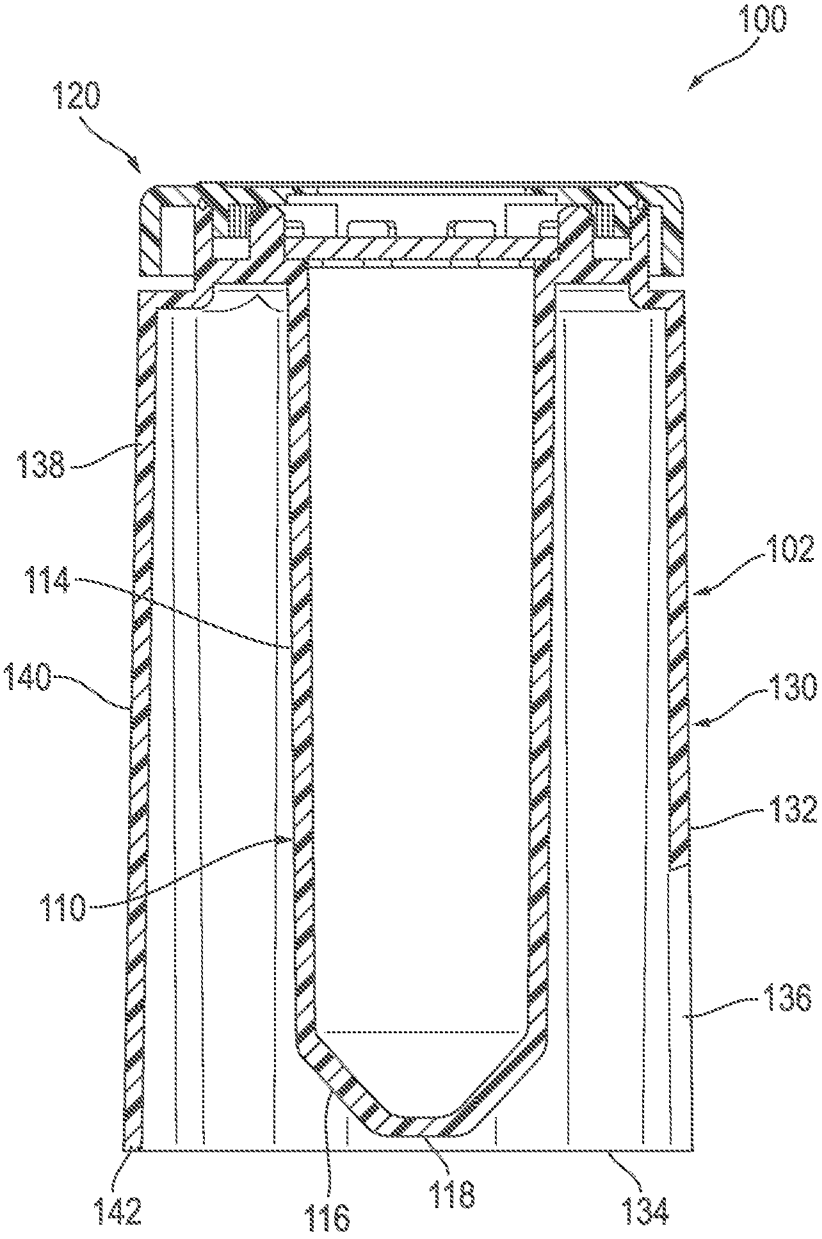
FIG. 5 is a transverse cross-section of the container along the line 5-5 in FIG. 3.

FIGS. 3-5 show an exemplary fluid container 100 that may be used with the system described herein. Container 100 may include a base 102 and a lid 120 disposed on a top end of the base 102. The base 102 and lid 120 may be made from suitable moldable materials, including various plastics, such as polypropylene or cyclic olefin copolymer, polyethylene, polycarbonate, acrylic, or polyvinyl chloride (PVC), and the base 102 and lid 120 may be injection molded.

Referring to FIGS. 4 and 5, the base 102 includes a vessel 110 configured to hold a fluid and extending longitudinally from a top end of the base 102 and including side walls 114 and a bottom wall 116 at a bottom end 118 of the vessel 110. In the illustrated embodiment, the vessel 110 has a tubular or cylindrical side wall 114 (i.e., a circular transverse profile) with a rounded, interiorly concave bottom wall 116. The vessel 110 may have different shapes and configurations, such as a square or rectangular transverse profile and/or a flat bottom wall.

Base 102 of container 100 further includes a skirt 130 surrounding vessel 110. In various embodiments, the skirt 130 has a flat bottom edge that extends below the bottom end 118 of the vessel 110. Accordingly, the container 100 may be self-balancing in an upright position when placed with the bottom edge of the skirt 130 supported on a flat surface. Skirt 130 may include a first wall segment 132 partially surrounding the vessel 110 and having a bottom edge 134, and at least a portion of the bottom edge 134 of the first segment 132 extends below the bottom end 118 of the vessel 110.

First wall segment 132 may include an alignment notch 136 formed therein and extending upwardly from the bottom edge 134 of the first wall segment 132. The container 100 may be carried within a recessed pocket of a rack, shelf, conveyor, carousel, etc., (e.g., container loading transport 214 or container storage transport 418) and a prong or other inward extension may be provided within the recessed pocket to extend into and engage the alignment notch 136 of the container 100 placed within the pocket to thereby force a particular, desired orientation of the container 100 within the pocket and restrict the container 100 from rotating or otherwise moving within the pocket.

Skirt 130 may further include a second wall segment 138 having a bottom edge 142. Second wall segment 138 may include a label panel 140 on which may be secured a label 141 that may be imprinted with identification or other informational indicia related to the container 100 and/or its contents and may include machine-readable indicia such as barcodes or radio frequency ID tags ("RFID"). Bottom edge 142 of second wall segment 138 may be contiguous with bottom edge 134 of first wall segment 132.

Referring to FIGS. 3 and 4, the skirt 130 further includes grooves 144, 146 formed on opposed sides of the base 102 that are preferably generally parallel with each other and may be oriented vertically, or longitudinally with respect to the orientation of the elongated vessel 110, as shown in the figures. Groove 144 is V-shaped and may be defined by exteriorly convex surfaces (i.e., sides, or walls of the groove) converging towards a root 156 of the groove 144. The root 156 of the groove 144 is the transition between one wall of the groove 144 and an opposite wall of the groove 144. One converging surface may include part of the first wall segment 132, and the opposite converging surface may include part of the second wall segment 138. The root 156 thereby separates the first wall segment 132 and the second wall segment 138. Similarly, groove 146 is V-shaped and may be defined by exteriorly convex surfaces (i.e., sides, or walls of the groove) converging towards a root 158 of the groove 146. One converging surface may include part of the first wall segment 132, and the opposite converging surface may include part of the second wall segment 138. The root 158 thereby separates the first wall segment 132 and the second wall segment 138.

Grooves 144, 146 provide surface features to be engaged by a mechanical gripper mechanism, as will be described below, to permit the container 100 to be held and transferred by a container transfer mechanism, such as container distributor 300, that includes the mechanical gripper mechanism. In addition, grooves 144, 146 are located closer to one end, or side, of the container 100 than to an opposite end, or side, of the container 100. For example, as shown in FIGS. 3 and 4, grooves 144, 146 are much closer to the right-hand end, or side, (when the container is in the upright orientation as shown in FIG. 3) than to the left-hand side, or end, of the container 100. This off-center positioning of the grooves 144, 146 allows a gripper mechanism that engages the grooves 144, 146 from the same side that the grooves are located on (i.e., from the right-hand side in FIG. 3) to insert the container 100 laterally into a container holder that is configured to allow access by the gripper mechanism to the grooves 144, 146. The container holder may be configured to allow access to the grooves 144, 146, by leaving the side of the container at which the grooves 144, 146 are located exposed to permit engagement of the grooves by the gripper mechanism.

Referring to FIG. 3, the lid 120 includes a cover wall 122 that has formed therein a lid aperture 124 that is generally aligned with the vessel 110. A septum 126 may be disposed between the lid 120 and the base 102 below the lid aperture 124. Septum 126 may include a plurality of slits 128 formed through a portion of the septum 126 to permit a rigid instrument, such as the mounting shaft of a pipettor (not shown), to pass through the septum 126 and into the vessel 110.

Additional features that may be incorporated into the container 100 are described in U.S. Provisional Application No. 62/994,552.

Container Loading Interface

Figure 6:
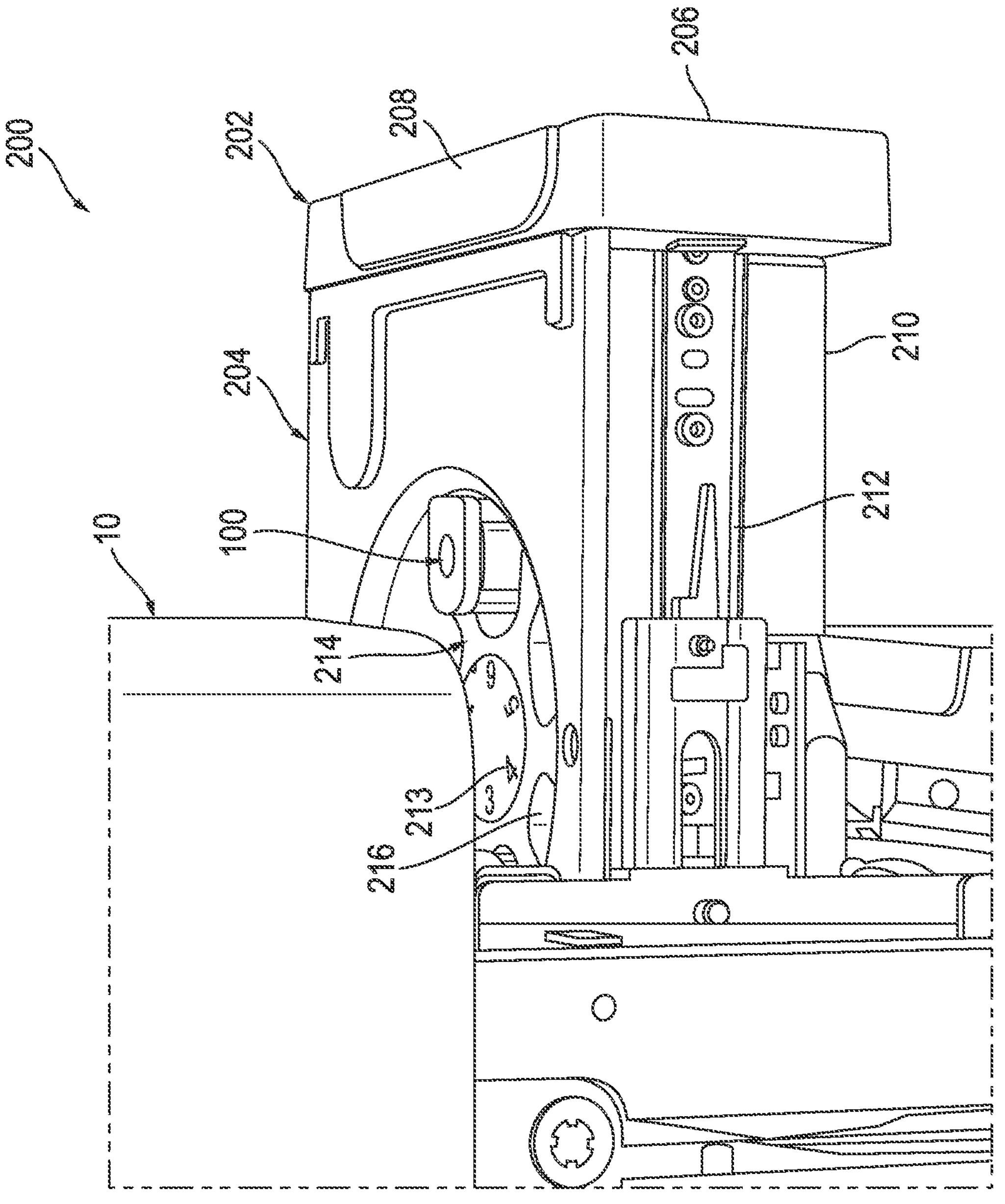
FIG. 6 is a partial perspective view of a support platform of a container loading interface extended from the instrument.
Figure 7:
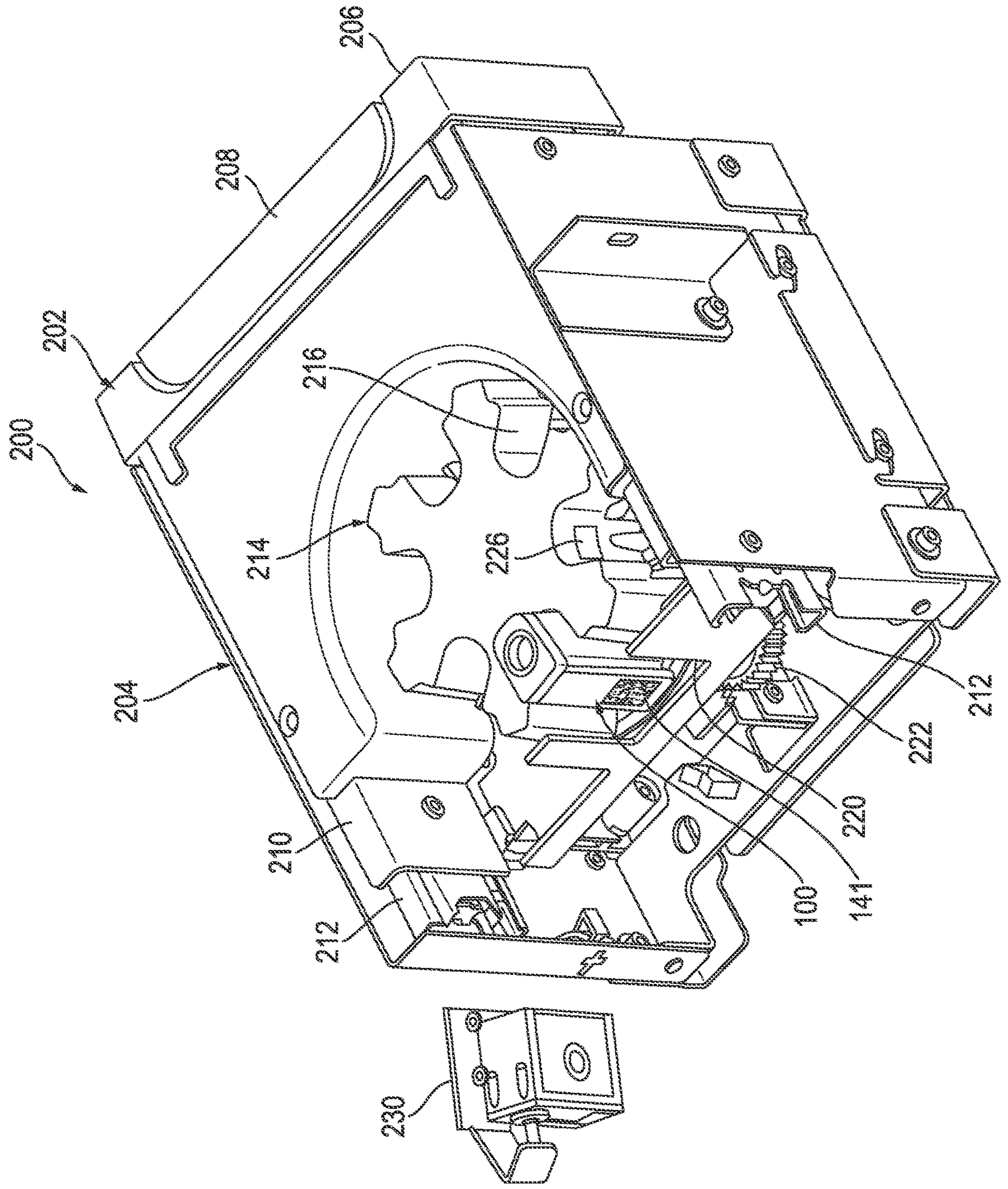
FIG. 7 is a top, rear perspective view of the container loading interface.
Figure 8:
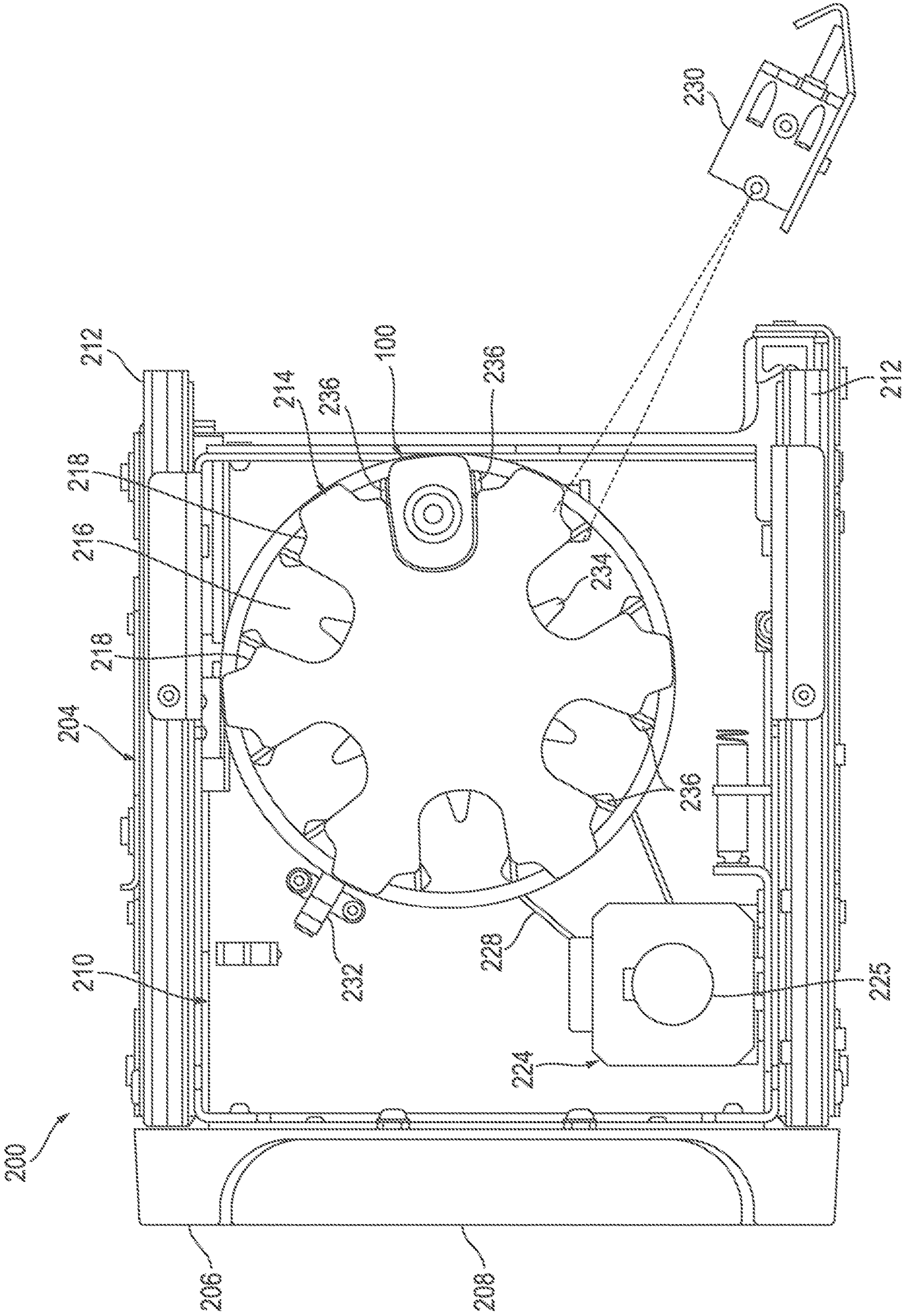
FIG. 8 is a top plan view of the container loading interface.

Additional features that may be included in the container loading interface 200 are shown in FIGS. 6-8. Movable support platform 202 may comprise a drawer, including a drawer front panel 206 and a drawer frame 210 supported on a linear track 212 (e.g., a linear bearing) within the support frame 204 disposed within the instrument 10. Although the movable support platform 202 need not necessarily comprise a drawer, for simplicity, reference number 202 will be used to refer to a moveable support platform generally or to a drawer specifically.

The drawer 202 may be manually pulled out of the instrument 10, as shown in FIG. 6, by a user grasping and pulling on a hand hold 208 formed in the front panel 206 of the drawer. Drawer 202 may thereafter be closed by pushing on the hand hold 208, or front panel 206, to push the drawer 202 back into the support frame 204 within the instrument 10. As shown in FIG. 7, drawer 202 may optionally include a linear damper 222 (e.g., a rack and pinion damper) to modulate movement of the drawer 202 and prevent abrupt opening or closing movements that can cause the container (s) 110 to become dislodged or their contents to splash. Alternatively, drawer 202 may be motorized and can be opened and closed by the touch of a button or switch or by computer command. An automatically-controlled lock mechanism (not shown) may be provided to lock the drawer in the closed position when the instrument 10 is operating or at other times that it would not be desirable to open the drawer 202. One or more sensors, such as slotted optical sensors (not shown), may be provided to generate a signal indicating that the drawer 202 is the open and/or closed position.

As shown in FIG. 7, a container loading transport 214 in the form of a carousel may be supported by or within the drawer 202 for rotation about a central, vertically-oriented carousel axis. Although the container loading transport 214 need not necessarily comprise a carousel, for simplicity, reference number 214 will be used to refer to a container loading transport generally or to a carousel specifically. Loading carousel 214 may include a plurality of container pockets 216 formed about the periphery of the carousel. Each container pocket 216 may be configured to receive and hold a single container 100. The container pockets 216 are open at the top to permit a container 100 to be inserted vertically into each container pocket 216 from above the transport 214 and are open at their outer periphery (the outer periphery of loading carousel 214) to permit a container 100 to be removed laterally with respect to the carousel axis of rotation (e.g., radially with respect to the carousel axis of rotation) from the container pocket 216 through the transfer opening 220. In an embodiment, as shown in FIG. 6, container loading transport 214 may include indicia 213, such as alphanumeric characters, uniquely identifying each of the container pockets 216.

In an embodiment, as shown in FIG. 8, retention clips 236 may be provided on opposite sides of the container pocket 216 to retain the container 100 within the container pocket 216. The retention clips 236 may be resilient, spring-like members that engage the grooves 144, 146 of the container 100 held in the container pocket 216 and deflect outwardly to permit the container 100 to be laterally removed from the container pocket 216. Each retention clip 236 may include a top beveled surface that engages the bottom edge of skirt 130 as the container is vertically inserted into the container pocket 216 to move the clip laterally outwardly to permit the container to be inserted into the container pocket 216. When the container 100 is withdrawn laterally from the container pocket 216, the portion of the first wall segment 132 of the side of skirt 130 forming parts of the grooves 144, 146 contacts the retention clips 236, which causes the retention clips 236 to spread apart from each other and allow the container 100 to be removed from the container pocket 216.

Each container pocket 216 may include a container-positioning cleat 234 that engages notch 136 formed in the skirt 130 of the container 100. A machine-readable tag 226 (e.g., a barcode) may be provided on an inner wall of the container pocket 216 itself to be detected by the scanner 230 when the container pocket 216 is empty, thereby serving as a pocket-empty signal.

Each container pocket 216 of the loading carousel 214 is opened toward the outer periphery of the loading carousel 214, and the container 100 is positioned within the container pocket 216 of the carousel with the grooves 144, 146 of the container 100 located at or near the outer periphery of the loading carousel 214. Accordingly, the side of the container 100 at which the grooves 144, 146 are located is exposed at an outer periphery of the loading carousel 214, and a gripper mechanism that grasps the container 100 with cooperating fingers or jaws (opposable gripper, or gripping, elements) engaging the opposed grooves 144, 146 is able to access the grooves from a position located radially outside of the loading carousel 214. As shown in FIG. 8, a relief 218 may be provided on either side of the opening to each container pocket 216 to provide clearance for a gripping mechanism to open to engage or disengage the grooves 144, 146 of the container 100.

The scanner 230 is able to read a machine-readable label (e.g., 2-D barcode 141) disposed on the label panel 140 of each container 100 as the loading carousel 214 rotates the container 100 past the scanner 230, as represented by diverging dot-dashed lines emanating from scanner 230 in FIG. 8. Information derived from the label, such as identification of the contents of the container, lot number, expiration date, etc., is associated with a particular position on the loading carousel 214. In one implementation, after the machine-readable label of a container 100 is read by the scanner 230, system control software is able to monitor the precise position of that container 100 as the loading carousel 214 rotates within the drawer 202. In addition to information that may be encoded by each machine-readable label, the operator may be able to provide the system with additional information about the contents or use of each container 100. This information may be provided via a user input screen on the main display. Alternatively, the label is read by the scanner 230 immediately before the container 100 is transferred by the container distributor 300 to the storage module 400, and the identification information is associated with a particular location within the storage module 400.

As shown in FIG. 8, powered rotation of the loading carousel 214 may be effected by a loading transport motor 224 coupled to a drive pulley (not shown) coaxially mounted to the loading carousel 214 by a drive belt 228. Loading transport motor 224 may comprise a stepper motor and may include a rotary encoder 225. A rotational position sensor, such as an optical home sensor 232, may be provided to detect a home position—and, optionally, one or more other rotational positions—of the loading carousel 214. In an embodiment, home sensor 232 comprises an optical sensor comprising an emitter-detector pair that detects the passage of a home flag (not shown) projecting from the loading carousel 214 that passes between the emitter and the detector. Precise rotational positioning of the loading carousel 214 may be achieved by a control system (computerized) that monitors signals from the sensor 232 and encoder counts from the encoder 225 and generates movement commands in the form of specified numbers of steps of motor movement. Thus, as information about the container is obtained by reading the label 141 on the container, the position of that container on the loading carousel 214 is known from the sensor 232 and the encoder 225.

Container Distributor

Figure 9:
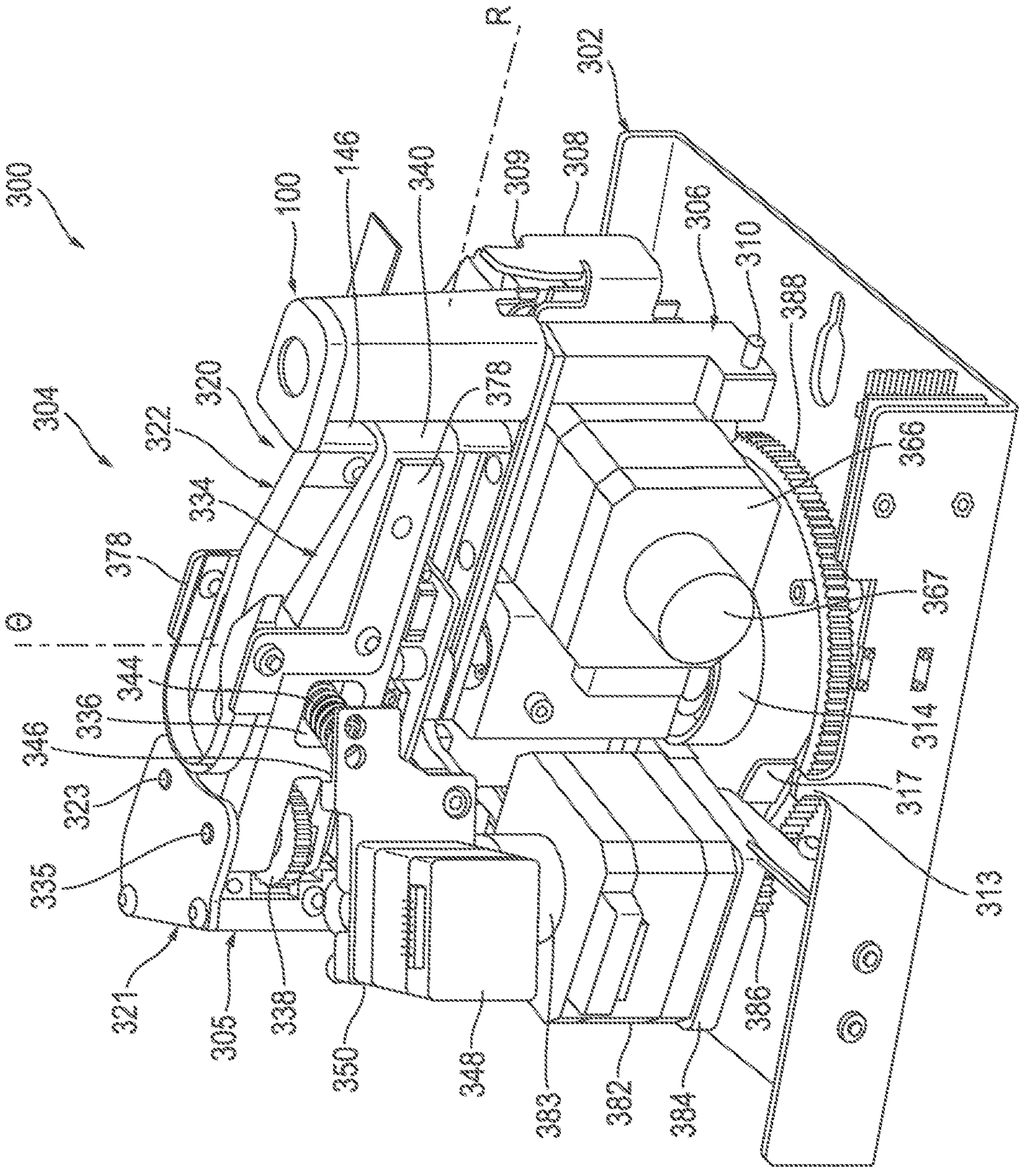
FIG. 9 is a top perspective view of a container distributor.

Features of an exemplary container distributor 300 are shown in FIGS. 9-14. Container distributor 300 comprises a distributor head 304 that includes a distributor head frame, or chassis, 306 that is mounted on a support frame 302 so as to be rotatable about a distributor axis (or chassis axis) of rotation "Θ" that is coaxial with a sun gear 388 that is fixed to the support frame 302. A gripper carriage 305 carries a container gripper 320 and is moveable relative to the chassis 306 in a radial direction "R" with respect to the distributor axis of rotation Θ. A flex cable 314 may be provided to transmit power, data, and commands between the rotating distributor head 304 and the structure to which the support frame 302 is attached. As shown in FIG. 9, a distributor moving system is configured to move the distributor chassis 306 and the gripper carriage 305 and, in an embodiment, comprises a distributor motor 382 mounted on a motor mount 384 attached to the distributor head chassis 306 and including a drive gear 386 (spur gear) that engages the outer, peripheral teeth of fixed sun gear 388 so that powered rotation of the drive gear 386 by the distributor motor 382 effects rotation of the distributor head 304 about the axis Θ. Distributor motor 382 may comprise a stepper motor and may include a rotary encoder 383. A rotational position sensor, such as an optical home sensor 315 shown in FIGS. 11 and 12, may be provided to detect a home position (e.g., as indicated by a home flag 317 shown in FIGS. 9 and 11)—and, optionally, one or more other rotational positions—of the distributor head 304. Precise rotational positioning of the distributor head 304 may be achieved by a control system (computerized) that monitors signals from the home sensor 315 and encoder counts from the encoder 383 and generates movement commands in the form of specified numbers of steps of motor movement. An optional first stop pin 310 and an optional second stop pin 312 extend horizontally from opposite ends of the distributor head chassis 306. Stop pins 310, 312 contact an optional blocking element 313 to prevent over-rotation of the distributor head 304 that can damage the flex cable 314. Container distributor 300 may optionally include an actuator arm 308 that extends off one end of the chassis 306 and which includes a vertically oriented upper end with a pin notch 309 form on one side of the upper end.

Container gripper 320 of distributor head 306 is configured to grasp and hold a container 100 in an upright orientation as shown in FIGS. 9-14. Gripper 320 includes opposable gripper or gripping elements, including a first gripper finger, or gripper or gripping element, 322 and a second gripper finger, or gripper or gripping element, 334. First gripper finger 322 includes a first hook 332 at an end of the first gripper finger 322 that engages groove 144 of the container 100, and second gripper finger 334 includes a second hook 340 at an end of the second gripper finger 334 that engages groove 146 of the container 100.

First gripper finger 322 is pivotably mounted at a first pivot mount (e.g., a rod, shaft, or pin) 323 to a gripper finger mounting bracket 321 of the gripper carriage 305. First pivot mount 323 is generally located at a longitudinal end of the first gripper finger 322 opposite the hook 332 and supports the first gripper finger 322 for pivoting rotation about a first gripper axis of rotation extending through first pivot mount 323. Similarly, second gripper finger 334 is pivotably mounted at a second pivot mount (e.g., a rod, shaft, or pin) 335 to the gripper finger mounting bracket 321. Second pivot mount 335 is generally located at a longitudinal end of the second gripper finger 334 opposite the hook 340 and supports the second gripper finger 334 for pivoting rotation about a second gripper axis of rotation extending through second pivot mount 335. First gripper axis of rotation through first pivot mount 323 and second gripper axis of rotation through second pivot mount 335 are preferably parallel to each other and, in an embodiment as shown in the drawings, are both vertically oriented. Gripper 320 is configured to move the first and second gripper fingers 322, 334 in a pivoting fashion toward each other to grasp the container 100 or to spread the first and second gripper fingers 322, 334 apart from each other to release the container 100. A first finger coupling gear 330 is attached to the first gripper finger 322 and comprises a spur gear that is coaxial with the first gripper axis of rotation through first pivot mount 323. Similarly, a second finger coupling gear 338 is attached to the second gripper finger 334 and comprises a spur gear that is coaxial with the second gripper axis of rotation through second pivot mount 335. The first finger coupling gear 330 and the second finger coupling gear 338 are inter-engaged so that rotation of either the first gripper finger 322 or the second gripper finger 334 results in a corresponding, coordinated rotation of the other finger in an opposite rotational direction (i.e., rotation of the first gripper finger 322 causes an equal and opposite rotation of the second gripper finger 334).

First hook 332 of first gripper finger 322 is bent laterally, or transversely, with respect to a longitudinal direction of the first gripper finger 322 (i.e., the direction between a first end of the first gripper finger at which it is pivotably mounted at first pivot mount 323 and a second end of the first gripper finger at which first hook 332 is located). Similarly, second hook 340 of second gripper finger 334 is bent laterally, or transversely, with respect to a longitudinal direction of the second gripper finger 334 (i.e., the direction between a first end of the second gripper finger at which it is pivotably mounted at 335 and a second end of the second gripper finger at which second hook 340 is located). First hook 332 and second hook 340 are bent in opposite directions, inwardly toward each other. In an embodiment, the lateral extent of each of the first hook 332 and the second hook 340 is at least equal to the depth of each of the grooves 144, 146, so that the tip of each hook seats in the respective root 156 or 158 of groove 144 or 146, respectively. The V-shape of each of the grooves 144, 146 will cause the corresponding first and second hooks 332 and 340 to wedge into the respective grooves thereby enabling the gripper 320 to firmly grasp the container 100. Each of the first and second hooks 332 and 340 may have a V-shape distal edge that conforms to the V-shape of the corresponding grooves 144, 146 to further enhance the wedging effect between the hooks and the grooves.

As can be appreciated in FIGS. 9, 11, 12, and 14, each of first hook 332 and second hook 340 has a vertical extent, or width, so that it engages a longitudinal extent of the respective groove 144 and 146 of container 100 so that the container 100 is stably held by the gripper 320 and unlikely to tip with respect to the gripper 320.

Figure 15:
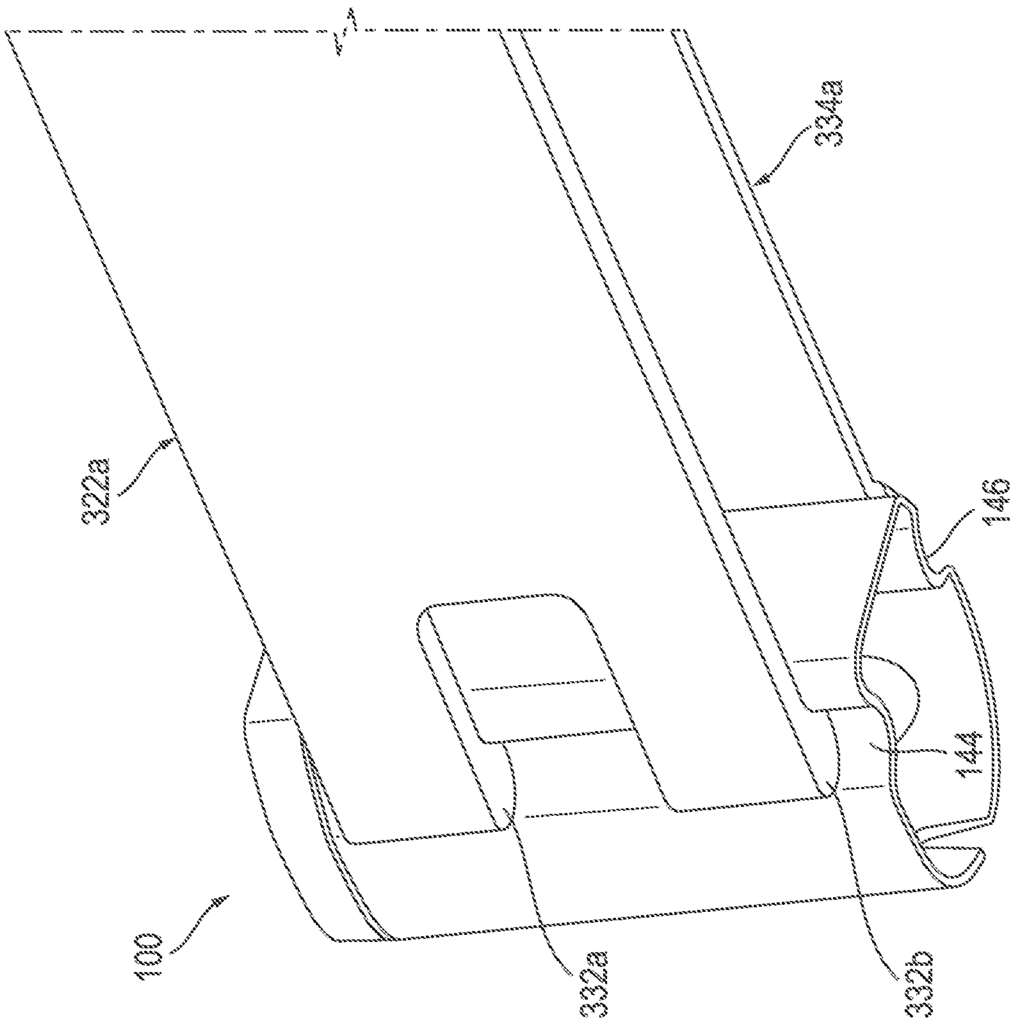
FIG. 15 is a partial perspective view of an alternate gripper.
Figure 16:
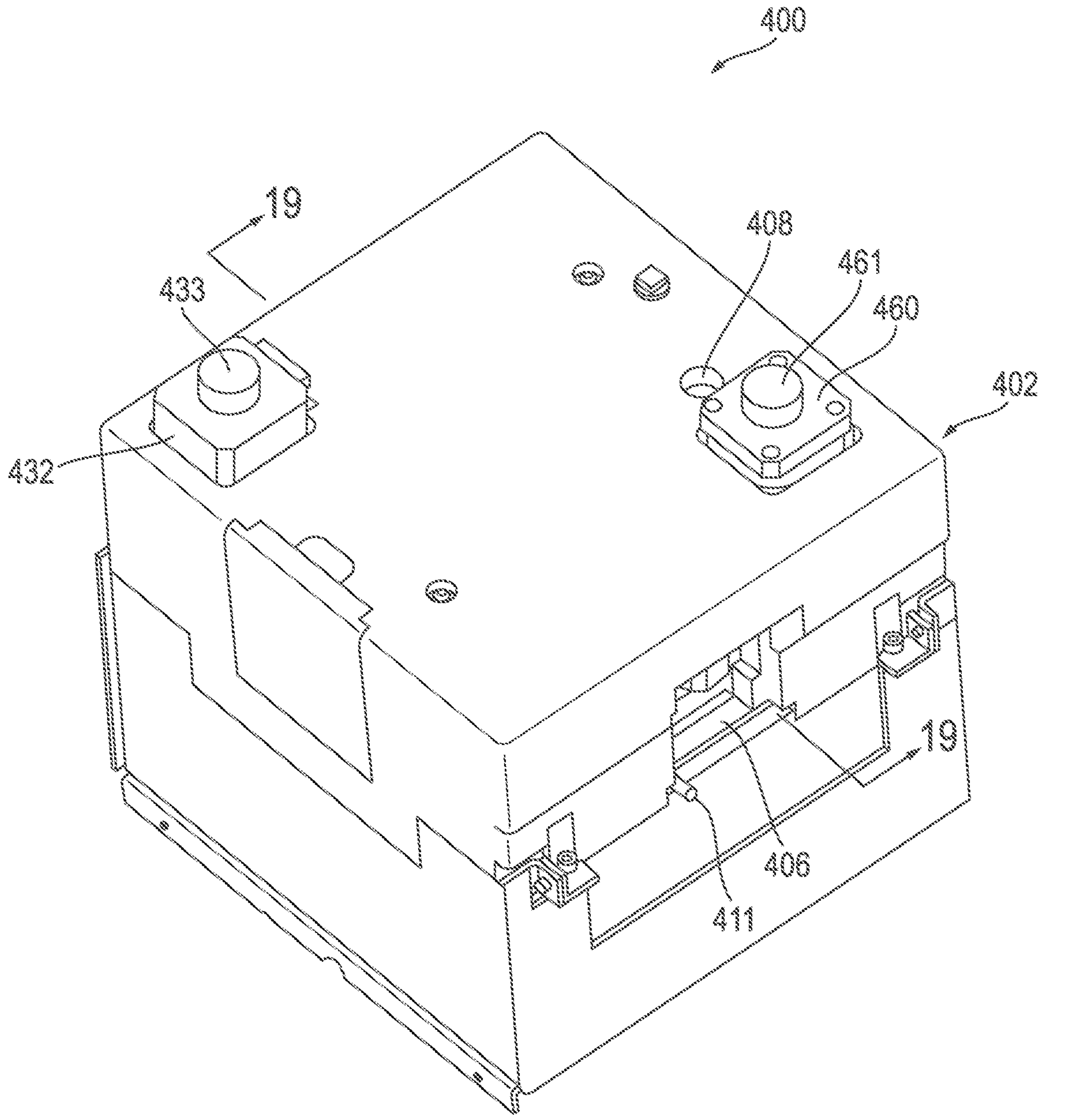
FIG. 16 is a top, front perspective view of the container storage module.

First gripper finger 322 has a single first hook 332, and second gripper finger 334 has a single second hook 340, that engage longitudinal extents of the grooves 144, 146, respectively, generally at a middle portion of the grooves 144, 146 between top and bottom ends of the grooves. In an alternate embodiment, shown in FIG. 15, a first gripper finger 322*a*, may include a hook comprising two (or more) discrete hooks that are vertically spaced apart, such as an upper hook 332*a* and a lower hook 332*b*, and are aligned so as to be engageable with upper and lower, longitudinally-spaced portions of groove 144 of container 100. Similarly, a second gripper finger 334*a*, may include a hook comprising two (or more) discrete hooks that are vertically spaced apart (but are not visible in FIG. 15) and aligned so as to be engageable with upper and lower, longitudinally-spaced portions of groove 146 of container 100.

A gripper spring 344 is attached at a first end to the first gripper finger 322 at a spring anchor 324 (see FIG. 11), extends through a spring opening 336 (see FIG. 9) formed in the second gripper finger 334, and is attached at an opposite end to a spring bracket 346. Gripper spring 344 operates to bias the gripper fingers 322 and 334 toward each other. That is, tension in the gripper spring 344 pulls the first gripper finger 322 toward the spring bracket 346 (and toward the first gripper finger 334). Meanwhile, inter-engagement between the first finger coupling gear 330 and the second finger coupling gear 338 causes the second gripper finger 334 to rotate in an opposite direction toward the first gripper finger 322.

Figure 10:
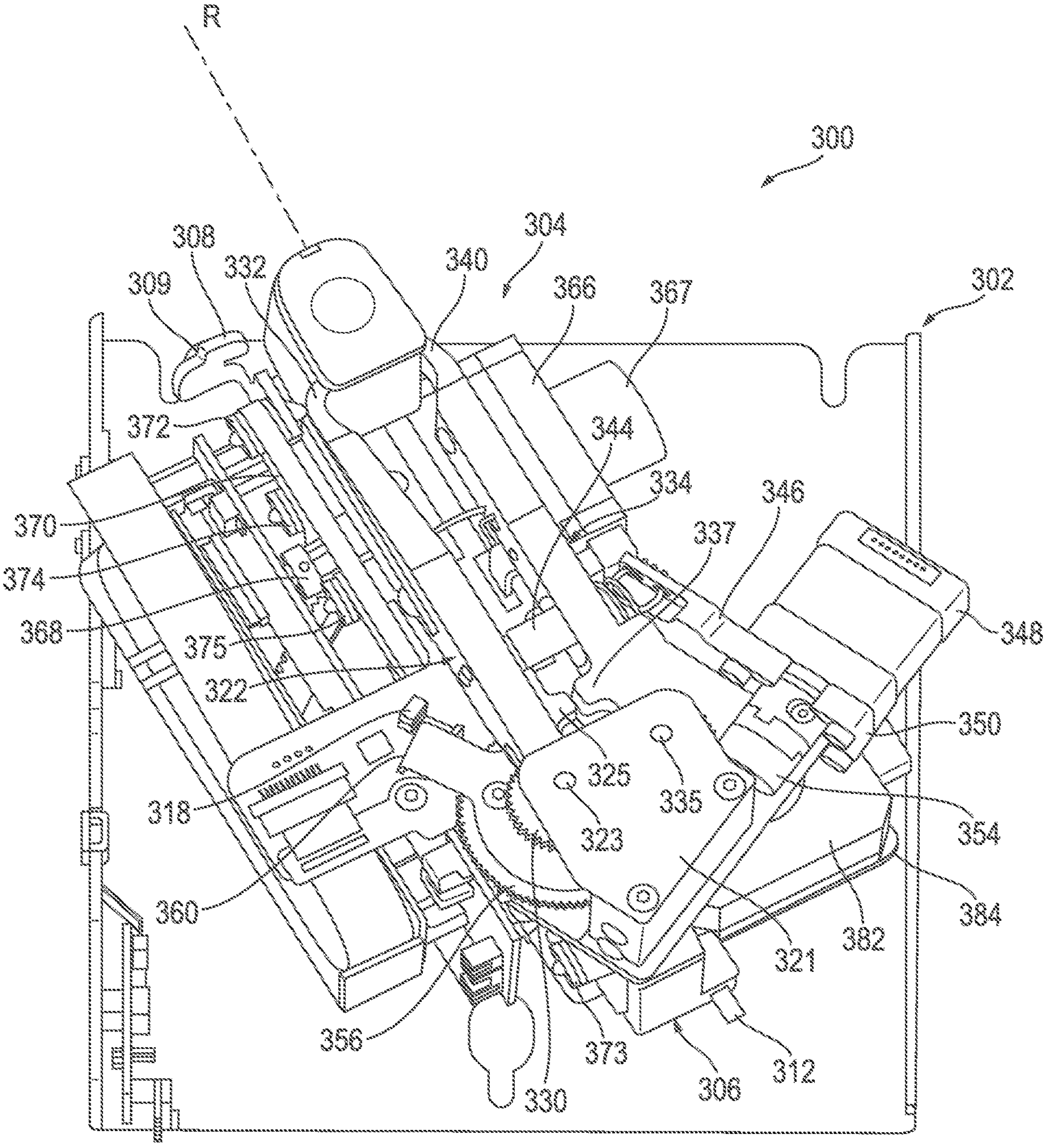
FIG. 10 is a top plan view of the container distributor.
Figure 11:
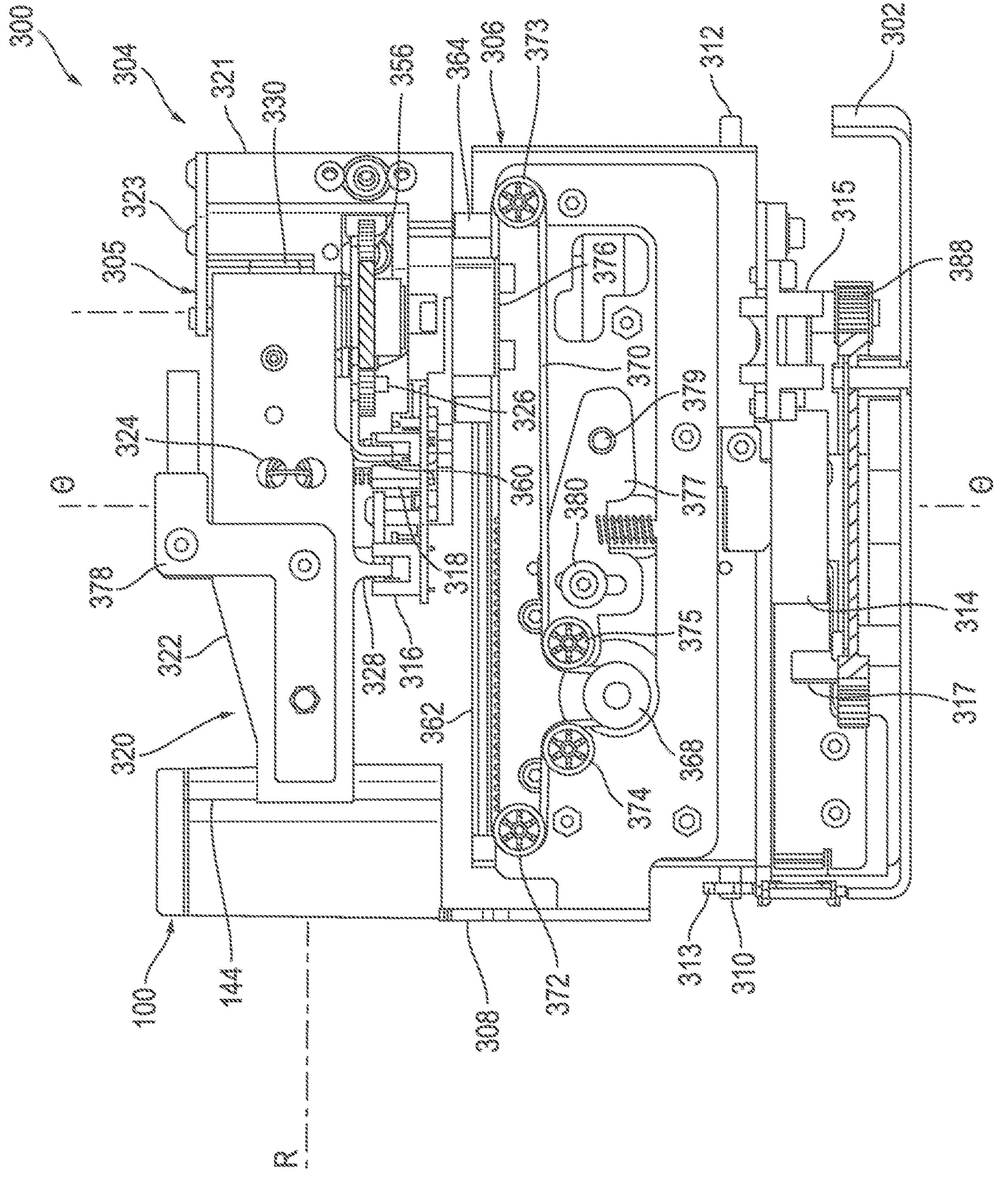
FIG. 11 is a side view of the container distributor.
Figure 13:
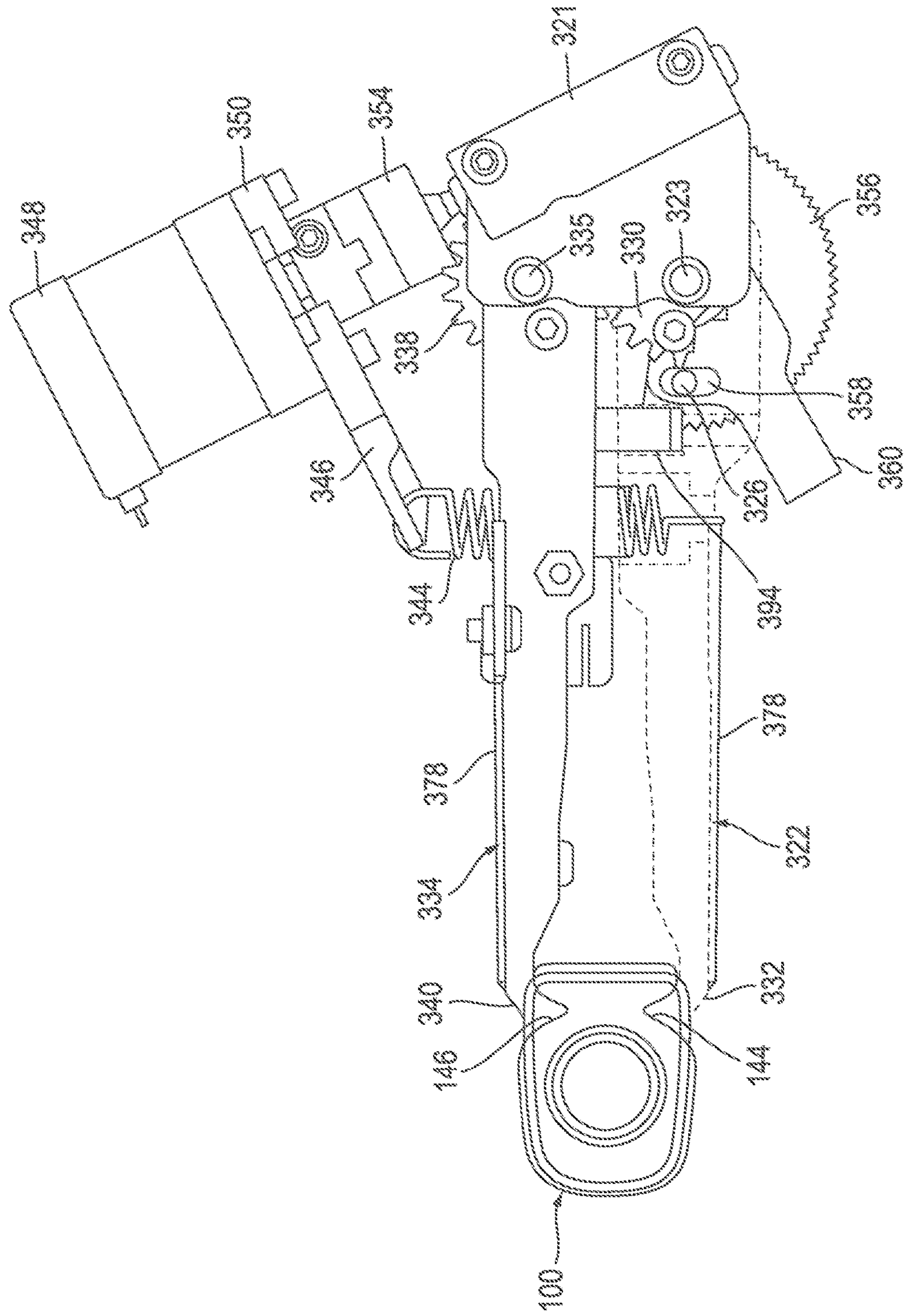
FIG. 13 is a top plan view of a gripper of the container distributor, with one gripper finger depicted as transparent.
Figure 14:
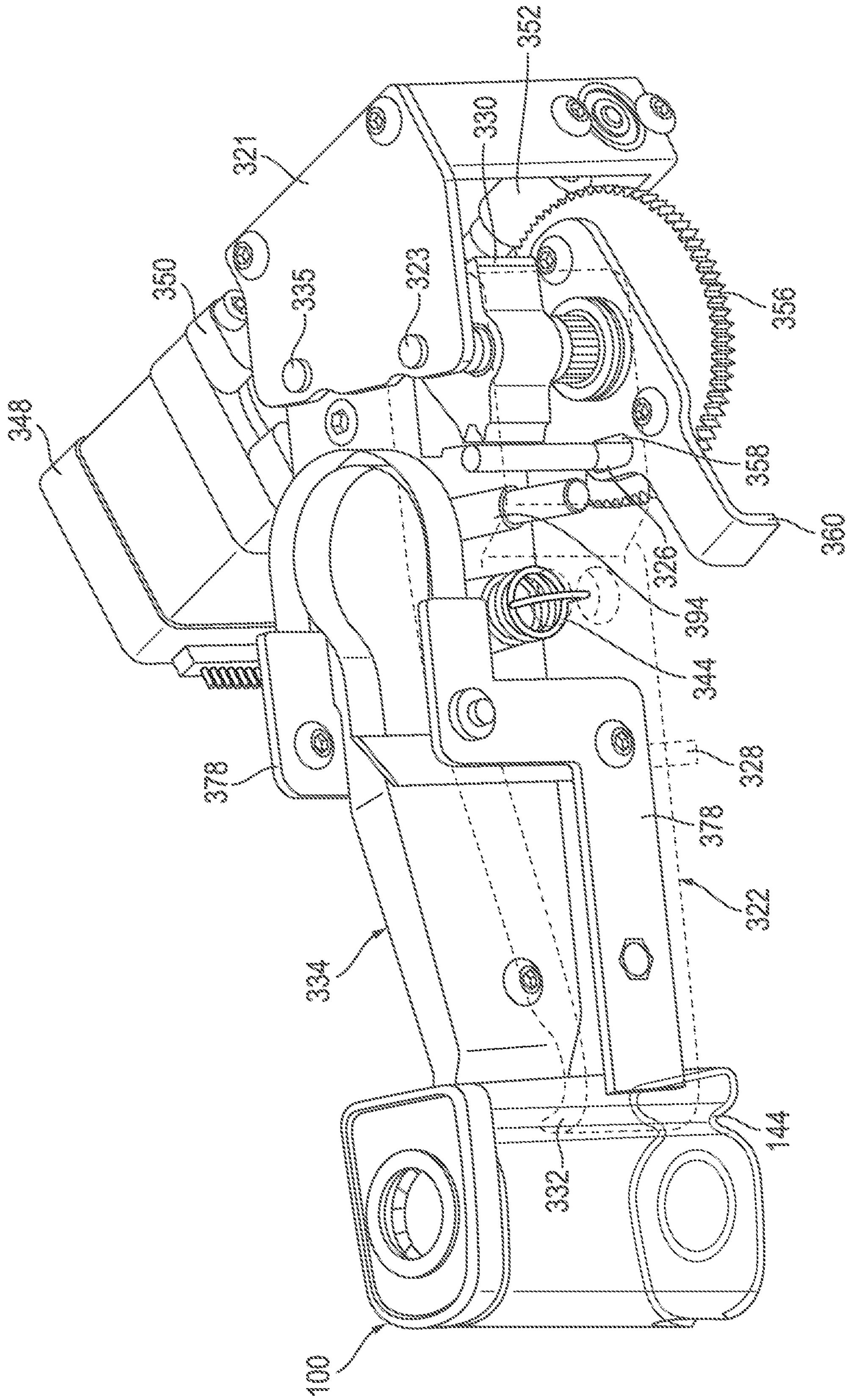
FIG. 14 is a top perspective view of the gripper, with one gripper finger depicted as being transparent.

To expand the gripper 320 by moving (or spreading) the first and second gripper fingers 322 and 334 apart from each other, the first gripper finger 322 is moved outwardly (counter-clockwise as shown in FIGS. 10, 13, and 14) about first pivot mount 323 against the bias of the gripper spring 344. In an embodiment, powered rotation of the first gripper finger 322 against the bias of the spring 334 is effected by a gripper motor 348 mounted to a motor bracket 350 and having a gripper actuator gear, such as a worm gear 352, on its output shaft that engages a gripper drive gear 356 (e.g., a spur gear) that is mounted coaxially with the finger coupling gear 330 and the first pivot mount 323. A coupler 354 connects an output shaft of gripper motor 348 to a shaft of worm gear 352 and allows for slight misalignment between the motor shaft and the worm gear shaft. Gripper drive gear, or gripper element drive gear, 356 is not fixed to the finger coupling gear 330, or to the first gripper finger 322, but is configured to rotate independently of the finger coupling gear 330 and the first gripper finger 322. As shown in FIGS. 11, 13, and 14, a drive pin 326 extends downwardly from the first gripper finger 322 through an arcuate slot 358 formed in the gripper drive gear 356 having a width in the radial direction that is slightly larger than the diameter of the drive pin 326 and a circumferential length that is multiple times the diameter of the drive pin 326. As gripper motor 348 and worm gear 352 rotate gripper drive gear 356 in a counter-clockwise direction, bias of the gripper spring 344 pulling the first gripper finger 322 in a clockwise direction will cause the drive pin 326 to contact an end of the slot 358 closest to the second gripper finger 334. Continued rotation of the worm gear 352 and the gripper drive gear 356 in a counter-clockwise (spreading) direction, applies a counter-clockwise torque to the first gripper finger 322 and causes corresponding, counter-clockwise rotation of the first gripper finger 322. In one embodiment, gripper motor 348 will rotate a specified number of steps to move the first gripper finger 322 a desired amount from a detected closed position. As explained above, inter-engagement between the first finger coupling gear 330 and the second finger coupling gear 338 will cause the second gripper finger 334 to rotate in an opposite direction (i.e., clockwise) about second pivot mount 335 away from the first gripper finger 322.

To close the first and second gripper fingers 322, 334, gripper motor 348 reverses rotation of the worm gear 352, thereby rotating the gripper drive gear 356 in a clockwise direction and permitting the gripper spring 344, which continues to cause the drive pin 326 to contact the end of the slot 358 closest to the second gripper finger 334, to pull the first gripper finger 322 in a clockwise direction about first pivot mount 323.

As the first gripper finger 322 moves in a clockwise direction, the second gripper finger 334 correspondingly moves in a counter-clockwise direction about second pivot mount 335 due to the inter-engagement of the first finger coupling gear 330 and the second finger coupling gear 338. If a container 100 is disposed between the inwardly facing hooks 332 and 340 of the first and second gripper fingers 322, 334, respectively, further motion of the gripper fingers 322, 334 toward each other will be prevented after the hooks 332, 340 engage the grooves 144, 146 of the container 100. A container-present tab 328 extending below the first gripper finger 322 is positioned to encounter a container-present sensor 316 (e.g., break a beam between an emitter and receiver of a slotted optical sensor), thereby generating a signal to a system controller (not shown) indicating that the first gripper finger 322 is in a position corresponding to a container 100 being present between the first and second gripper fingers 322, 334. After the hooks 332, 340 engage the grooves 144, 146, gripper motor 348 may continue to rotate worm gear 352 and gripper drive gear 356. But because further closing rotational movement of the gripper fingers 322, 334 is prevented by the container 100 grasped between them, drive pin 326 moves within slot 358 away from the end of the slot closest to the second gripper finger 344, thereby decoupling the drive gear 356 from the drive pin 326 and first gripper finger 322. Thus, the gripper drive gear 356 is permitted to further rotate in the clockwise direction after the gripper fingers 322, 334 contact the container 100 without applying any rotational torque to the first gripper finger 322, thereby avoiding damage to components, such as the gripper 320, gripper drive gear 356, worm gear 352, and/or gripper motor 348 that might be caused by continued application of torque after further movement of the gripper fingers 322, 334 is blocked. Gripper motor 348 may continue to rotate until a motor stop tab 360 that is fixed to and rotatable with the gripper drive gear 356 engages a motor stop sensor 318 (e.g., breaks a beam between an emitter and receiver of a slotted optical sensor) to generate a signal to the system controller to stop the gripper motor 348 (i.e., by indicating a closed position of the gripper finger 322). The motor stop tab 360 extends radially outwardly from the gripper drive gear 356 and downwardly at its distal end. The arcuate length of the slot 358 is preferably sufficient to permit the gripper drive gear 356 to rotate after the gripper fingers 322, 334 contact the container 100 and until the motor stop tab 360 engages the motor stop sensor 318 and before the drive pin 326 contacts an opposite end of the slot 358.

If a container 100 is not positioned between the first and second gripper fingers 322, 334 as gripper motor 348 reverses rotation of the worm gear 352 and the gripper spring 344 pulls the first gripper finger 322 in a clockwise direction about first pivot mount 323 (and the second finger coupling gear 338 correspondingly rotates in a counter-clockwise direction), the first and second gripper fingers 322, 334 will continue to move toward each other until respective hard stops 325 and 337 of the gripper fingers 322, 334 contact each other to prevent further movement of the fingers (see FIG. 10). In an alternate embodiment shown in FIGS. 13 and 14, hard stops 325, 337 are replaced with a spring plunger 394 that is fixed to one of the gripper fingers (the first gripper finger 322 in the illustrated embodiment) and includes an axially-movable, spring-biased tip that contacts the other gripper finger (the second gripper finger 334 in the illustrated embodiment) to arrest relative movement of the gripper fingers 322, 334 toward each other while absorbing shock associated with the contact.

As further movement of the first and second gripper fingers 322, 334 toward each other is prevented, continued reverse rotation of the worm gear 352 causes continued rotation of the gripper drive gear 356 as the drive pin 326 moves within the slot 358, so that the drive gear 356 is decoupled from the drive pin 326 and first gripper finger 322. Accordingly, further reverse rotation of the worm gear 352 and the gripper drive gear 356 does not apply further rotational torque to the first gripper finger 322, thereby avoiding damage to components, such as the gripper 320, gripper drive gear 356, worm gear 352, and/or gripper motor 348 that might be caused by continued application of torque after further movement of the gripper fingers 322, 334 is blocked.

In the illustrated embodiment, the respective hard stops 325 and 337 of the gripper fingers 322 and 334 are configured so that if a container 100 is not positioned between the gripper fingers 322 and 334, the gripper fingers 322, 334 will rotate further—and closer together—than if a container 100 were located between the gripper fingers 322, 334. Accordingly, when the container 100 is not present, the container-present tab 328 extending below the first gripper finger 322 will pass through the container-present sensor 316, and will only momentarily trip the sensor 316. Thus, the presence of a container 100 in the closed gripper 320 is confirmed by the container-present sensor 316 being tripped by the container-present tab 328 simultaneously with the motor stop tab 360 engaging motor stop sensor 318 to gripper motor 348. Conversely, the absence of a container 100 in the closed gripper 320 is confirmed by the absence of a container-present signal from the container-present sensor 316 at the time the motor stop tab 360 engages the motor stop sensor 318 to stop gripper motor 348.

Figure 12:
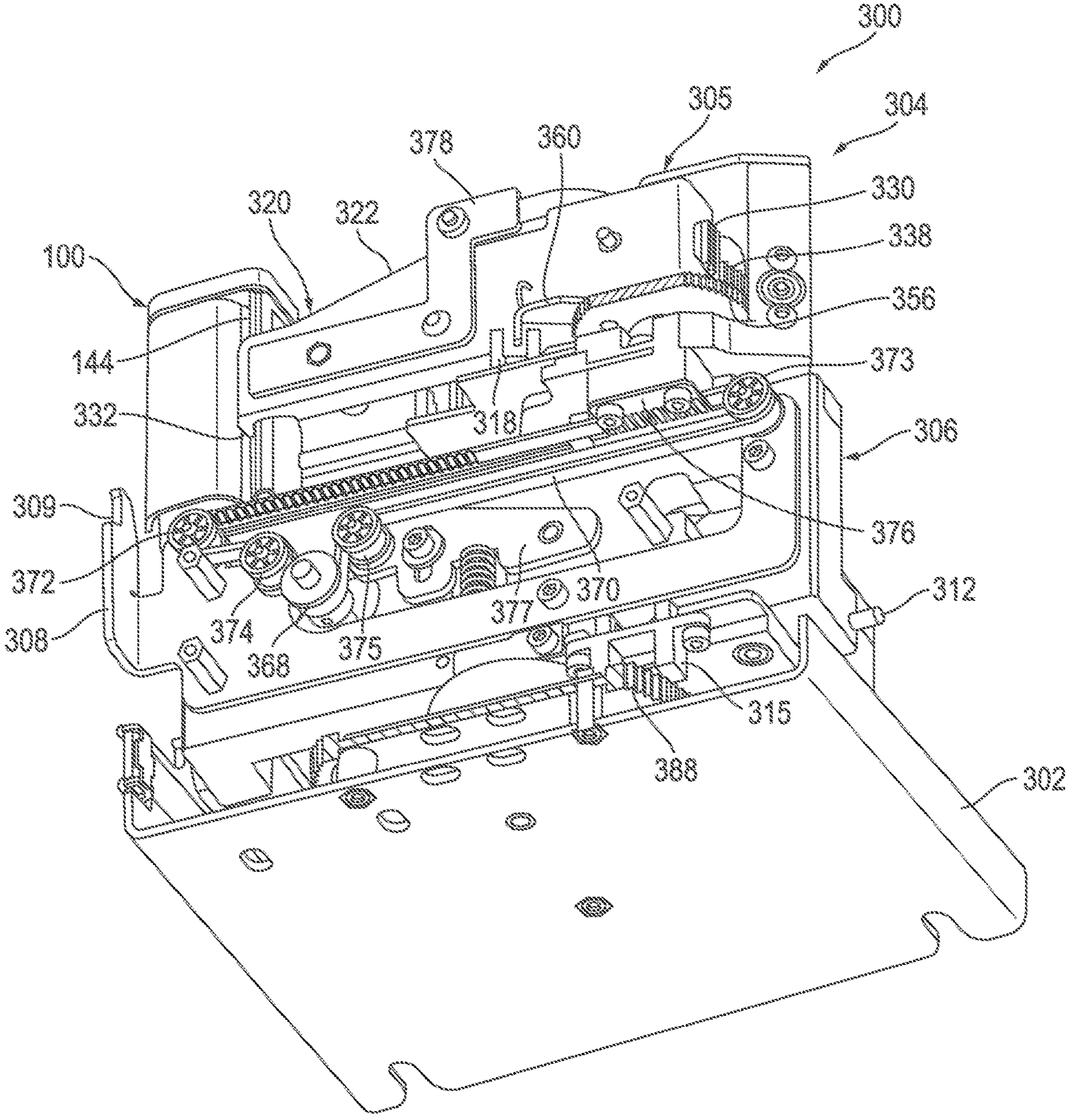
FIG. 12 is a bottom perspective view, partially in cross-section, of the container distributor.

The distributor head 304 is further configured to move the gripper 320 in a radial direction "R" relative to the distributor axis of rotation Θ, wherein direction R is transverse to—and may be perpendicular to—the generally vertical orientation of the vessel 110. As shown in FIGS. 11 and 12, a gripper advance system is configured to move the gripper carriage 305 and the gripper 320 in a lateral, e.g., radial, direction and, in an embodiment, includes a linear track 362 supported on the distributor head chassis 306 and on which the gripper carriage 305 and gripper 320 are mounted for linear translation by means of a linear bearing 364 coupled to the track 362. As shown in FIGS. 9 and 10, a gripper advance motor 366, which may comprise a stepper motor and include a rotary encoder 367, is mounted to the distributor head chassis 306, and a drive gear 368 on the output shaft of the gripper advance motor 366 extends through the distributor head chassis 306 (see FIGS. 11 and 12). Drive gear 368 drives a belt 370 supported on idler pulleys 372, 373 mounted to the distributor head chassis 306. In an embodiment, tension pulley 374 mounted to the distributor head chassis 306 and tension pulley 375 mounted to a tension bracket 377 pivotably attached to chassis 306 are provided on opposite sides of the drive gear 368. Tension bracket 377 is pivotably attached to chassis 306 at 379 and may be secured in a desired position by a screw 380 extending into the chassis 306 through a slot formed in the bracket 377 to effect a desired tension in the belt 370. Belt 370 is attached to the gripper carriage 305 by an attachment clamp 376 so that as the belt 370 is driven in one direction or another by the gripper advance motor 366 and drive gear 368, the gripper 320 is advanced or retracted in the R direction. One or more sensors may be provided to detect one or more radial positions of the gripper carriage 305. The amount of movement of the gripper 320 can be monitored and controlled by a control system that monitors encoder count from the encoder 367 and position signals from radial position sensors and generates movement commands in the form of specified numbers of steps of motor movement.

In an embodiment, each gripper finger 322, 334 may optionally include a conductive plate 378 (e.g., a metal plate) secured to an outer side thereof (i.e., on the side of the gripper finger not facing the other gripper finger). The purpose of the conductive plate is for self-teaching proper positioning of the gripper 320 and distributor head 304, as described below.

Container Storage Module

Figure 17:
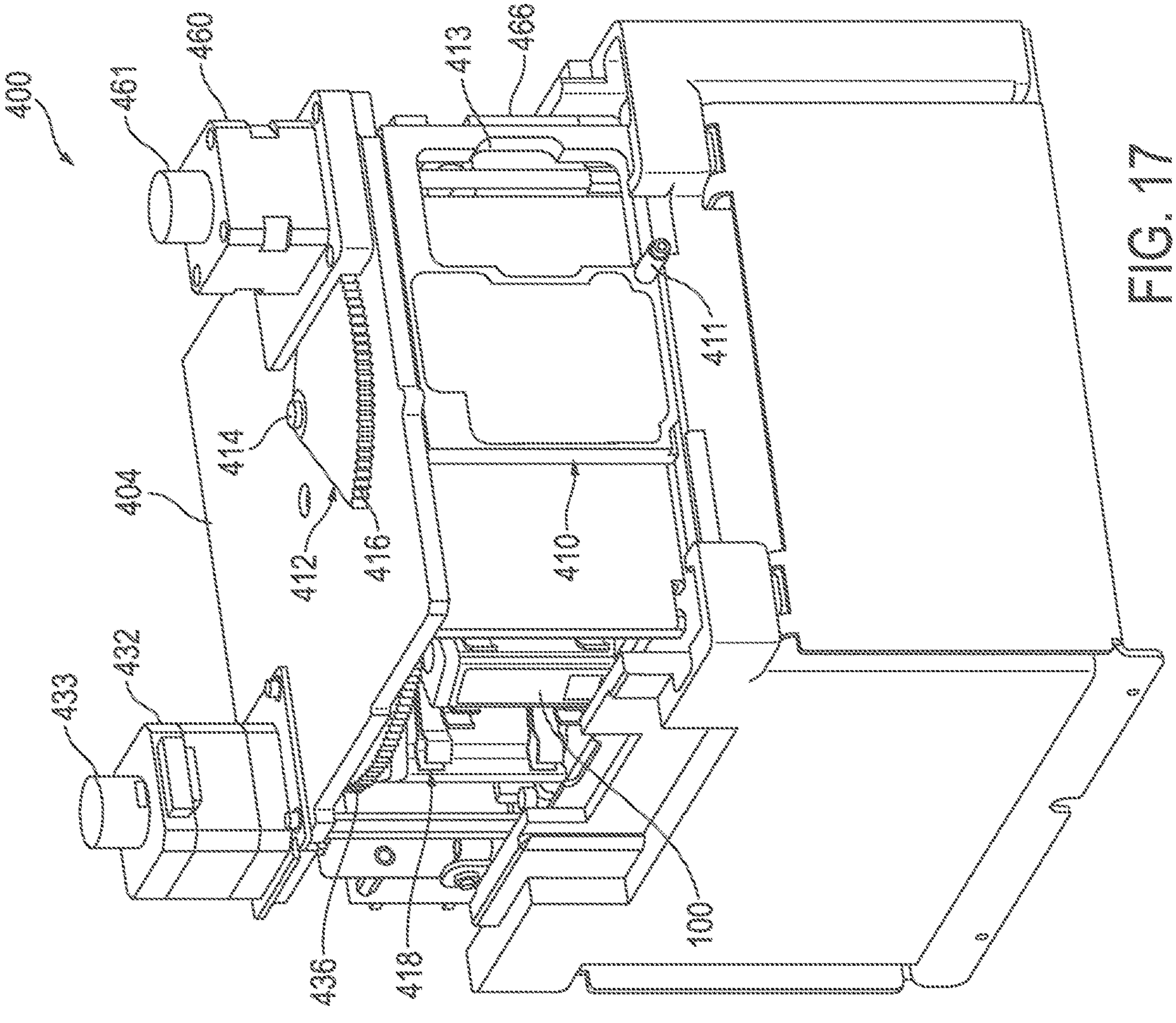
FIG. 17 is a top, front perspective view of the container storage module with the housing omitted.
Figure 18:
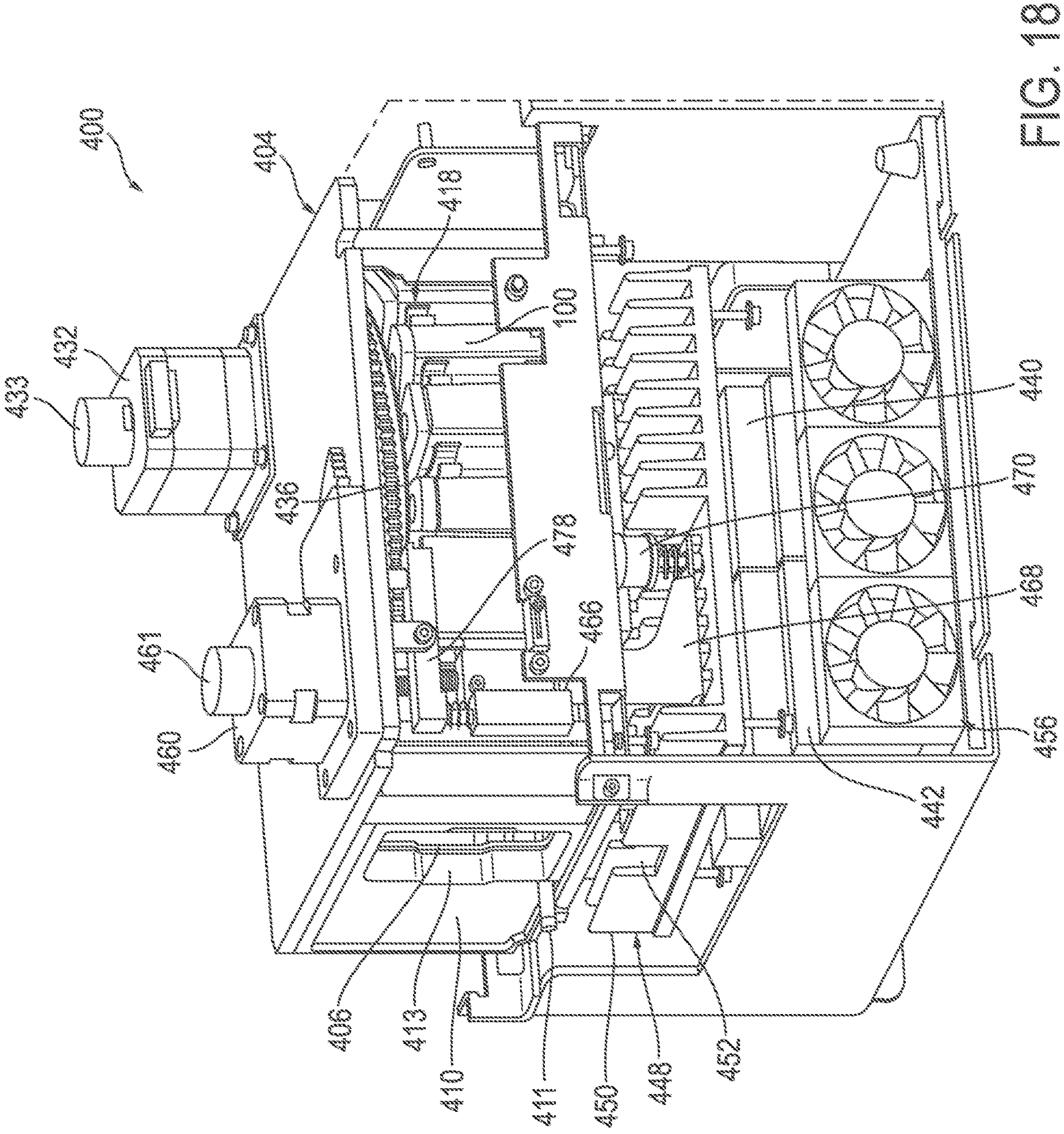
FIG. 18 is a top, right side perspective view of the container storage module with the housing omitted.
Figure 19:
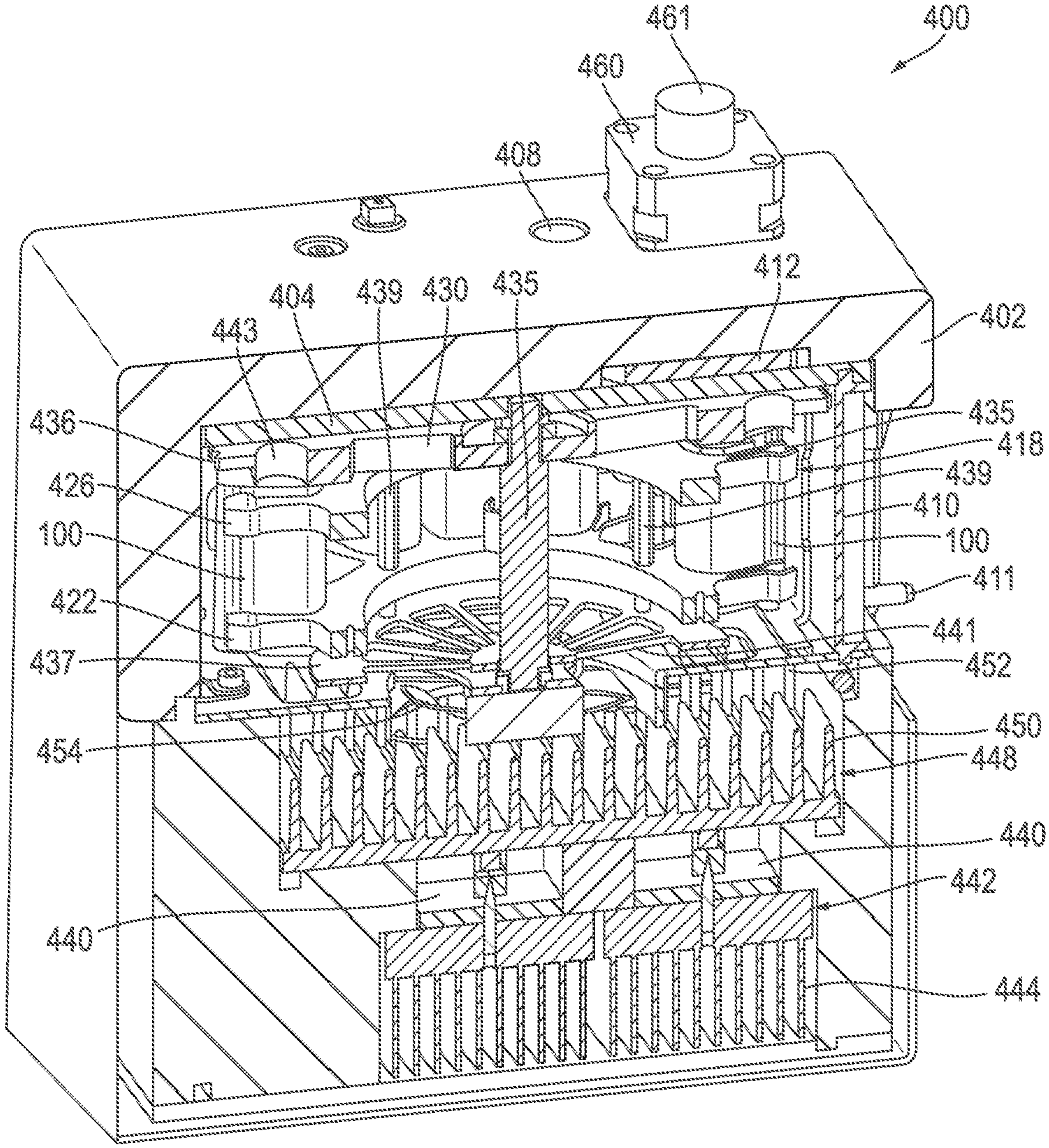
FIG. 19 is a cross-sectional perspective view along the line 19-19 in FIG. 16.

Additional features that may be included in the container storage module 400 are shown in FIGS. 16-24. Container storage module 400 comprises an enclosure, or housing, 402 defining an internal chamber that may be temperature-controlled, for example, as described below. Where the internal chamber is temperature-controlled, the enclosure or housing 402 may be insulated. A container ingress/egress opening 406 in the housing 402 allows containers 100 to be placed into or removed from the internal chamber of the container storage module 400. As shown in FIGS. 17 and 19, movable barrier, or door, 410 may be provided to close the ingress/egress opening 406 when containers are not being moved into or out of the container storage module 400. Such a barrier or door may be particularly desirable where the internal chamber of the storage module 400 is temperature-controlled. In an embodiment, the movable barrier 410 is a sliding door with a pusher pin 411 extending therefrom and a cutout 413 formed therethrough. (See also FIG. 18). The door 410 may be opened by the distributor 300 using the actuator arm 308 of the distributor head chassis 306 contacting the side of the pusher pin 411 as the distributor head 304 rotates about its axis of rotation Θ to push the sliding door 410 from the closed position to an open position. In particular, the distributor head chassis 306 is rotated until the pusher pin 411 is seated in the pin notch 309 of the actuator arm 308. The distributor had chassis 306 is thereafter further rotated—in a counter-clockwise direction in the illustrated embodiment—thereby pushing the movable barrier 410—to the left in the illustrated embodiment—until the cutout 413 formed in the movable barrier 410 is aligned with the ingress/egress opening 406 formed in the housing 402 so that a container 100 can be inserted into or removed from the storage module 400 with the gripper 320. In an embodiment, movable barrier 410 is spring-biased toward a closed position—to the right in the illustrated embodiment—so that a lateral force applied to the pusher pin 411 by the actuator arm 308 and the distributor head chassis 306 will move the door against the spring bias to an open position and removing or releasing the lateral force will allow the spring bias to move the door to a closed position.

In an embodiment, the distributor head 304 may incorporate a self-teaching capability for determining the proper rotational (0) position of the distributor head 304 with respect to the ingress/egress opening 406. The gripper 320 is extended in the R direction into the ingress/egress opening 406, and the distributor head is rotated in the Θ direction, first in one direction until the gripper contacts a side of the opening 406 and then in the opposite direction until the gripper 320 contacts the opposite side of the opening 406. Contact of the gripper 320 with a side of the opening 406 may be detected by the conductive plate 378 on the first gripper finger 322 or the second gripper finger 334 contacting the conductive side of the opening 406, whereby an electrical circuit detects electrical continuity from the plate 378 to the support frame 302. The rotational Θ positions of the distributor head 304 at which the gripper 320 contacts the sides of the opening 406 are recorded for subsequent positioning of the distributor head 304 for contacting and pushing the pusher pin 411 with the actuator arm 308 and for placing containers into or removing containers from the storage module 400.

Container storage module 400 further includes a container access opening 408 formed through a top wall of the housing 402. Container access opening 408 allows a pipettor inserted through the opening to access the contents of a container 100 held within the storage module 400 beneath the access opening 408 to aspirate fluid from the container 100 and/or detect the level (i.e., the amount) of the fluid within the container 100 as will be described below. A movable barrier may be provided for selectively opening (exposing) the container access opening 408, to permit access to containers within the storage module 400, or closing (covering) the container access opening 408 when such access is not required. Such a barrier may be particularly desirable where the internal chamber of the storage module 400 is temperature-controlled. Further details of an exemplary barrier for the container access opening 408 will be described below.

Figure 20:
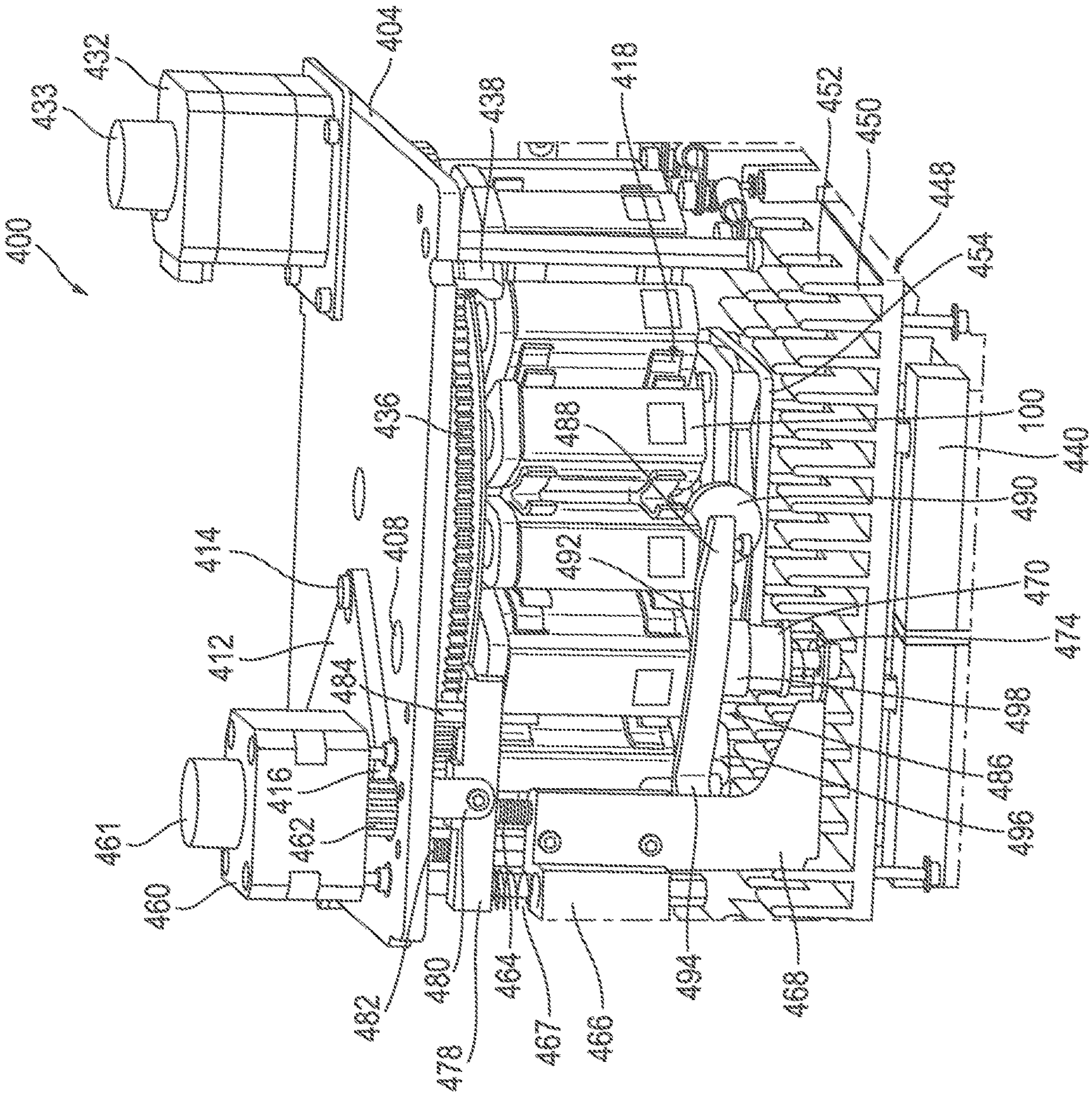
FIG. 20 as a partial, right side, internal perspective view of the container storage module.

Referring to FIGS. 18 and 20, in which the housing 402 is omitted from the drawing to permit visibility of internal components of the storage module 400, and FIG. 19, which is a cross-section of the storage module, a container storage transport 418 is provided within the storage module 400 to receive and carry a plurality of fluid containers 100. In the illustrated embodiment, the container storage transport 418 is a storage carousel that is rotatable about a center, vertically-oriented storage carousel axis and has the plurality of holding stations 420 disposed about its outer periphery. Each holding station 420 of the storage carousel 418 may comprise resilient spring clips that removably retain a fluid container 100 within the holding station 420.

Figure 21:
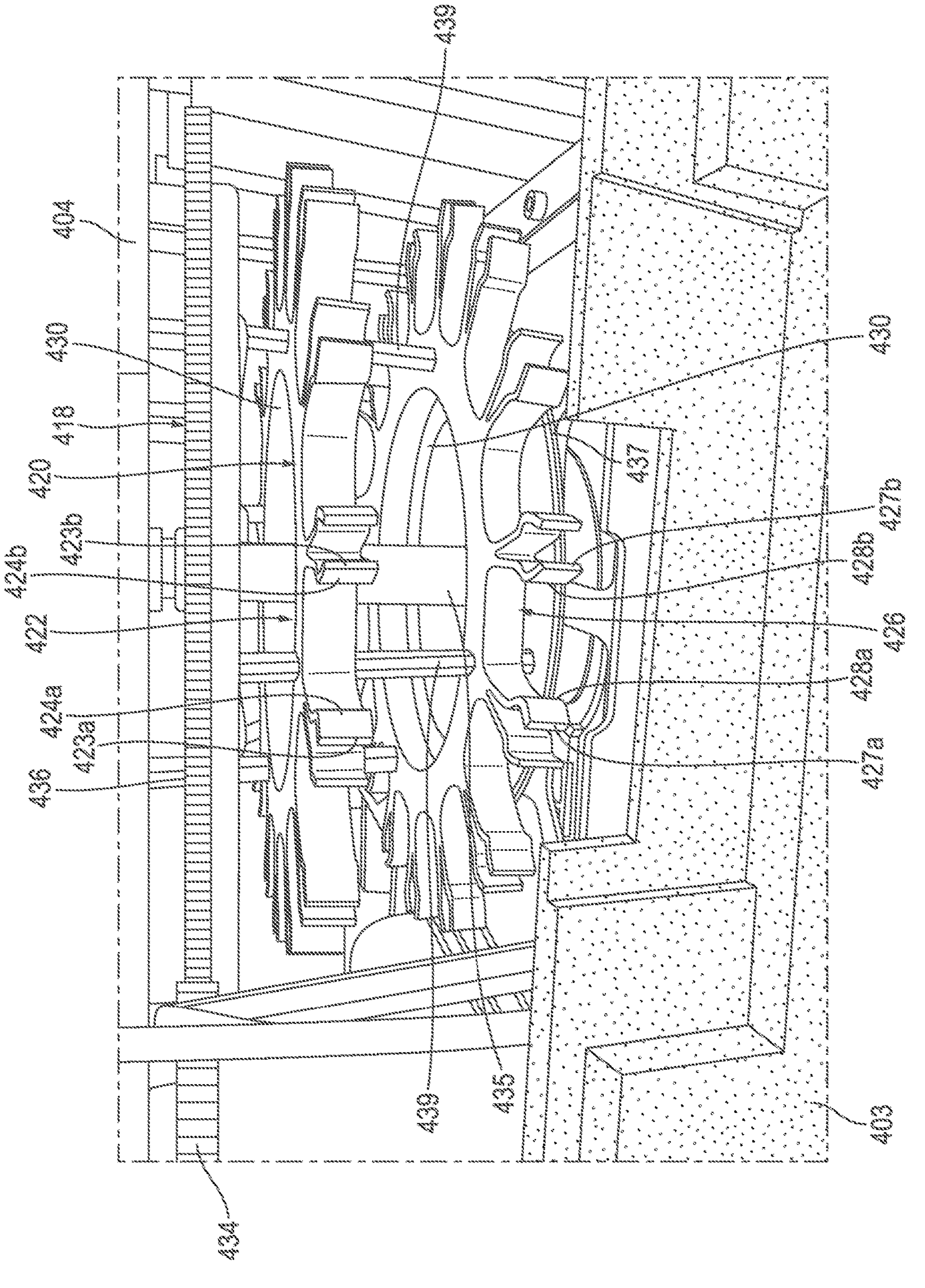
FIG. 21 is a top perspective view of the container storage transport within the container storage module.
Figure 22:
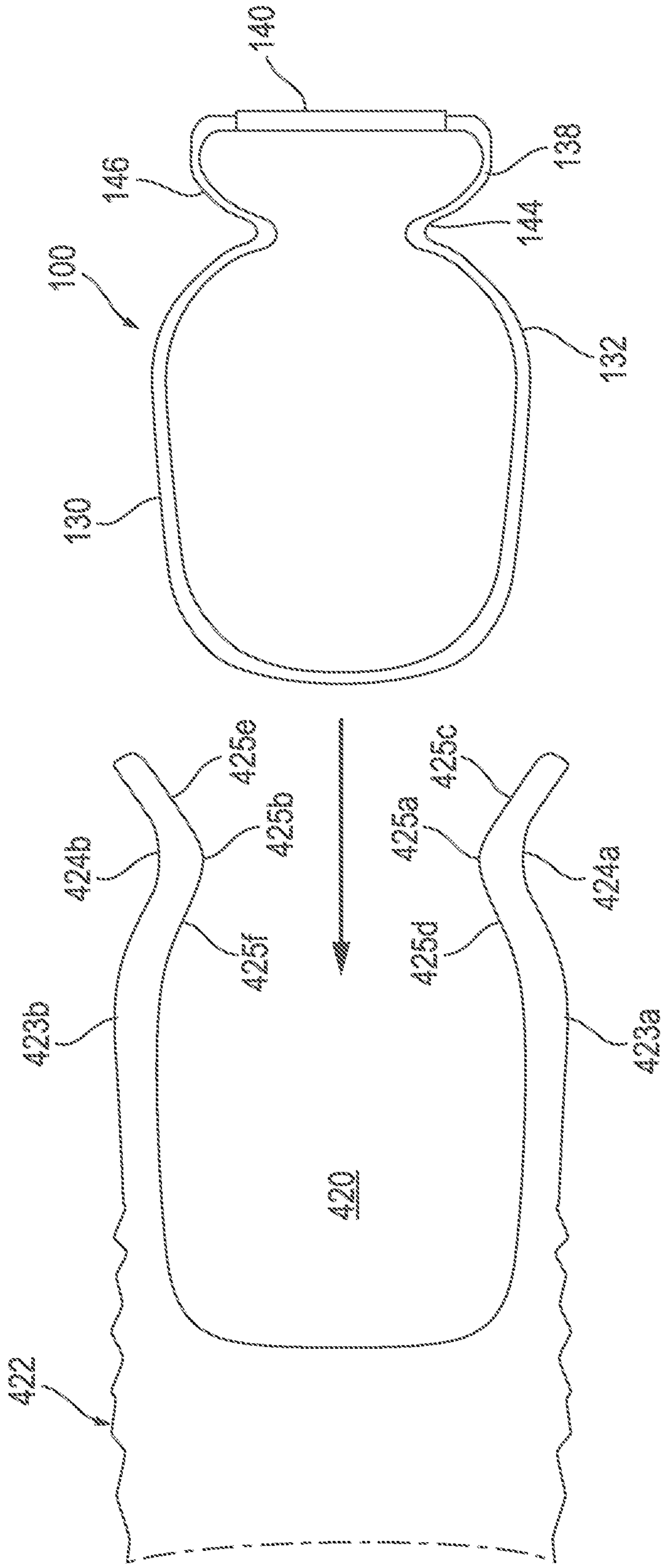
FIG. 22 is a partial plan view of a holding station of the container storage transport and a container to be inserted into the holding station.

In an embodiment, as shown in FIGS. 21 and 22, the storage carousel 418 may include an upper clip ring 422 including multiple pairs of opposed, facing spring tabs 423*a*, 423*b*, and a lower clip ring 426 including multiple pairs of opposed, facing spring tabs 427*a*, 427*b*. In an embodiment, the upper spring tabs 423*a*, 423*b* and the lower spring tabs 427*a*, 427*b* extend radially outwardly with respect to the storage carousel axis. Spring tabs 423*a*, 423*b* include inwardly bent knuckles 424*a*, 424*b*, respectively, and spring tabs 427*a*, 427*b* include inwardly bent knuckles 428*a*, 428*a*, respectively. The upper clip ring 422 and the lower clip ring 426 are configured so that each pair of spring tabs 423*a*, 423*b* of the upper clip ring 422 is aligned with a corresponding pair of spring tabs 427*a*, 427*b* of the lower clip ring 426 to define each holding station 420. A container 100 is held in a holding station 420 with the bent knuckles 424*a*, 424*b* of the upper clip ring 422 and the bent knuckles 428*a*, 428*b* of the lower clip ring 426 engaged (e.g., seated) in the grooves 144, 146 of the container 100. Upper and lower knuckles 424*a*, 428*a* engage groove 144 near the top and bottom of the groove, respectively, and upper and lower knuckles 424*b*, 428*b* engage groove 146 near the top and bottom of the groove, respectively. The spring tabs 423*a*, 423*b* of the upper clip ring 422 and the spring tabs 427*a*, 427*b* of the lower clip ring 426 are resiliently flexible and are deflected apart from each other when a container 100 is pushed into the holding station 420. The deflected spring tabs 423*a*, 423*b* and 427*a*, 427*b* generate a force that urges the knuckles 424*a*, 424*b*, 428*a*, 428*a* into the grooves 144, 146 to retain the container 100 within the holding station 420.

FIG. 22 shows one pair of spring tabs 423*a*, 423*b* of the upper clip ring 422 for one container holding station 420. Knuckle 424*a* of spring tab 423*a* is defined by a first sloped portion 425*c*, extending to a first peak 425*a*, and then a second sloped portion 425*d* extending from peak 425*a*. Opposed knuckle 424*b* of spring tab 423*b* is defined by a first sloped portion 425*e*, extending to a first peak 425*b*, and then a second sloped portion 425*f* extending from peak 425*b*. The opposed knuckles 428*a*, 428*b* of each pair of spring tabs 427*a*, 427*b* of the lower clip ring 426 of the container holding station 420 have a similar configuration.

When the container 100 is first inserted into the container holding station 420, the side of skirt 130 opposite label panel 140 contacts the first sloped portions 425*c*, 425*e* of the knuckles 424*a*, 424*b*, respectively, which causes the spring tabs 423*a*, 423*b* to spread apart from each other. As the container is pushed into the container holding station 420, the peaks 425*a*, 425*b* slide along opposite sides of the first wall segment 132 of the skirt 130 until the peaks 425*a*, 425*b* are aligned with roots 156, 158 of grooves 144, 146, where the resilience of the spring tabs 423*a*, 423*b* causes the spring tabs to seek their undeflected positions and seat the knuckles 424*a*, 424*b* into the grooves 144, 146. The spring tabs 423*a*, 423*b* are configured so that they are still slightly deflected when the knuckles 424*a*, 424*b* are seated in the grooves 144, 146 so as to generate a squeezing force from the resilience of the spring tabs 423*a*, 423*b* onto the container 100. When the container 100 is withdrawn from the container holding station 420, the portion of the first wall segment 132 of the side of skirt 130 forming parts of the grooves 144, 146 contacts the second sloped portions 425*d*, 425*f* of the knuckles 424*a*, 424*b*, respectively, which causes the spring tabs 423*a*, 423*b* to again spread apart from each other to lift the knuckles 424*a*, 424*b* from the grooves 144, 146 and allow the container 100 to be removed from the holding station 420. This description of the insertion and removal of the container 100 into and from the spring tabs 423*a*, 423*b* of the upper clip ring 422 also applies to the insertion and removal of the container 100 into and from the spring tabs 427*a*, 427*b* of the lower clip ring 426 that occurs when the container is pushed into and removed from the holding station 420.

Accordingly, owing to the configurations of the knuckles 424*a*, 424*b* of the upper clip ring 422 and the knuckles 428*a*, 428*b* of the lower clip ring 426, the container 100 can be laterally inserted into the container holding station 420, can be stably retained within the container holding station 420, and can be laterally withdrawn from the container holding station 420.

The spacing between the upper clip ring 422 and lower clip ring 426 is sufficient to permit the gripper fingers 322, 334 to pass between the upper clip ring 422 and lower clip ring 426 to thereby permit the gripper 320 of the distributor 300 to move a container 100 grasped by the gripper fingers 322, 334 into the holding station 420. When the container 100 is placed in the holding station 420, the knuckles 424*a*, 424*b* of upper clip ring 422 engage the grooves 144, 146, respectively, of the container 100 above the gripper fingers 322, 334, and the knuckles 428*a*, 428*b* of lower clip ring 426 engage the grooves 144, 146, respectively, of the container 100 below the gripper fingers 322, 334. The spacing between the upper clip ring 422 and the lower clip ring 426 permits the gripper fingers 322, 334 to grasp the grooves 144, 146 of a container 100 that is held in the holding station 420. The spring tabs are sized and configured so that a container 100 may be inserted into the holding station 420 with the label panel 140 facing radially outwardly and the inwardly-bent knuckles 424*a*, 424*b* of the upper clip ring 422 and the inwardly-bent knuckles 428*a*, 428*b* of the lower clip ring 426 engaged with the grooves 144 and 146 of the container 100 to accurately position the container 100 within the holding station 420 and to retain the container 100 within the holding station 420. Positioning the containers 100 about the outer periphery of the storage carousel 418 with the container oriented radially and the grooves 144, 146 positioned near the outer periphery, where the spacing between adjacent containers 100 on the storage carousel 418 is greatest, enables the gripper 320 to engage the container 100 in each holding station 420 with minimal interference from any container 100 on either side of the container being engaged.

As shown in FIG. 21, housing 402 may include insulation 403, which may comprise a cellular material, such as Styrofoam, or similar thermally insulating material.

The storage carousel 418 may be rotationally driven by a storage transport motor 432 with which the storage carousel 418 is operatively coupled. Motor 432 may be mounted to a top support panel 404 of the holding station 400 and has a drive gear 434 (e.g., a spur gear) on its output shaft that engages outer peripheral gear teeth of a driven spur gear 436 attached to the upper clip ring 422 and lower clip ring 426 so as to be coaxial with the axis of rotation of the storage carousel 418.

Motor 432 may comprise a stepper motor and may include a rotary encoder 433. An optical sensor 438 (see FIG. 20) detects a home rotational position of the storage carousel 418. The identifying information of each container 100—as determined from a label read by scanner 230 of the container loading interface 200—can be correlated to a particular holding station 420 of the storage carousel 418, as determined and monitored by the rotary encoder 433 and sensor 438. Precise rotational positioning of the storage carousel 418 may be achieved by a control system (computerized) that monitors signals from the sensor 438 and encoder counts from the encoder 433 and generates movement commands in the form of specified numbers of steps of motor movement.

In an alternative embodiment, the storage carousel 418 may be driven by a motor operatively coupled to the storage carousel 418 via a belt and pulley arrangement.

In an embodiment, as shown in FIGS. 19 and 21, storage carousel 418 may further include a center post 435 that is rotatably mounted at its upper end to top support panel 404 and rotatably mounted at its lower end to a frame member of the storage module 400. Driven spur gear 436 is coaxially arranged with and attached to an upper end of center post 435. A circular lower plate 437 is coaxially arranged with and attached to a lower end of center post 435. Lower plate 437 may include radial spokes 441 providing axial openings through the center of the plate 437 (see FIG. 19). A number of risers 439 extend through the upper clip ring 422 and the lower clip ring 426 and are attached at their upper and lower ends to the driven spur gear 436 and the lower plate 437, respectively. Access holes 443 are formed through the outer periphery of the driven gear 436. One access hole 443 is associated with and axially aligned with each container holding station 420.

In an embodiment, sensor 438 is attached to the top support panel 404 and comprises an L-shaped bracket comprising a lateral, or horizontal, portion attached to top support panel 404 and an upright, or vertical, portion extending downwardly from the top support panel 404. An optical emitter is disposed at a distal end of one of the upright and lateral portions and an optical receiver is disposed at the distal end of the other of the upright and lateral portions. An optical beam is directed between the optical emitter and receiver at the distal ends of the upright and lateral portions. Thus, when the storage carousel 418 is rotated, an extending flag at a home position on the carousel (not shown) passes through the optical beam and interrupts the beam between the emitter and the receiver of the sensor to generate a signal indicating the presence of flag. Alternatively, the optical beam passes through an opening formed in the storage carousel 418 at a home position to generate a signal indicating the presence of opening. Sensors of this type are described in International Publication No. WO 2020/181231.

Optionally, temperature control within the housing 402 of container storage module 400 may be implemented by various thermal control components. Such thermal control components may include one or more thermal devices, such as one or more Peltier devices (thermoelectric module) 440 disposed beneath the container storage transport 418, as shown in FIGS. 19 and 20. To maintain a temperature within the housing 402 of the storage control module 400 that is lower than ambient temperature, the Peltier device(s) 440 can be arranged such that a top surface of the Peltier device(s) 440 facing the container storage transport 418 is the cold surface and the bottom surface of the Peltier device(s) 440 is the hot surface. Cold side thermal dissipaters, such as heat sinks 448 with a plurality of parallel heat fins 450, can be provided on top of the Peltier device(s) 440 and hot side thermal dissipaters, such as heat sinks 442 including a plurality of parallel fins 444, may be disposed on the bottom side of the Peltier device(s) 440.

The thermal control components may optionally include one or more fans provided within the housing 402 to circulate air within the housing 402 and/or to exhaust air (e.g., hot air) out of the housing 402. For example, a fan 454 may be disposed beneath the container storage transport, or carousel, 418 so as to force cold air upwardly through an open center 430 formed through the middle of the container storage transport 418. Such vertically, or axially, directed flow will deflect radially outwardly when it contacts a top surface of the storage carousel 418 (e.g., the bottom side of top support panel 404) or the housing 402 and pass downwardly along the outer side walls of the housing 402. Fan 454 will draw air beneath the storage carousel 418 radially inwardly between the fins 450 or through cut-outs 452 formed in the fins 450. Accordingly, the fan 454 will generate a generally toroidal airflow around the containers 100 carried on the storage carousel 418.

As shown in FIG. 18, the container storage module 400 may further include one or more fans 456 adjacent the hot side thermal dissipaters 442 to exhaust warm air out of the housing 402 of the module 400.

Referring to FIGS. 17 and 20, a movable barrier for selectively covering the container access opening 408 may comprise a pivoting shutter plate 412. Shutter plate 412 may comprise a sector gear that is pivotably mounted at a pivot point (e.g., a screw, bolt, rod, shaft, or pin) 414 to the top support panel 404 and includes gear teeth 416 along an arcuate edge thereof. A multi-function motor 460, which may be mounted to the top support panel 404 and which may include a rotary encoder 461, includes a spur gear 462 mounted to its output shaft that engages the gear teeth 416 of the shutter plate 412 (see also FIGS. 23 and 24). Rotation of the spur gear 462 causes the shutter plate 412 to pivot about the pivot point 414 between a first position covering the container access opening 408 and a second position uncovering, or exposing, the container access opening 408, depending on the direction of rotation of the spur gear 462.

With the shutter plate 412 in the second position, a probe of a pipettor, or a tip removably attached to the probe, may be inserted through the container access opening 408 and access hole 443 formed in gear 436 to access the fluid contents of a container 100 that has been positioned by the storage carousel 418 beneath the container access opening 408 to aspirate fluid from the container 100 and/or dispense fluid into the container 100.

It may also be desirable to monitor the level of fluid within the container 100, and one way this can be accomplished is via fluid level sensing using a pipettor enabled for capacitive liquid level sensing. As is known in the art, e.g., as described in U.S. Pat. No. 5,648,727, capacitive liquid level sensing may be performed by lowering a pipettor having a conductive probe or tip removably attached to the probe into a fluid held in a container supported on a plane that is electrically grounded while monitoring an electronic, capacitively-based signal from the tip or probe. Due to the dielectric constant of the fluid within the container between the tip and the grounded plane, the measured capacitance-based signal will instantly, and detectibly, change (e.g., increase) when the tip contacts the fluid. As the tip is lowered, the vertical (Z-axis) position of the pipettor is also monitored as it descends into the container toward the surface of the fluid. Upon contact with the fluid surface, a change in the capacitively-based signal from the tip or probe is registered and the corresponding vertical position of the pipettor is recorded to determine the level, or height, of the liquid surface within the container.

For capacitive liquid level sensing to be effective, the container within which the liquid level is being monitored must be supported on a conductive structure to provide capacitive coupling with the probe of the pipettor or the tip removably attached to the pipettor, especially if the container is made from a non-conductive material, such as plastic. In addition, so that the level of fluid within the container can be ascertained from the vertical position of the pipettor at which the tip or probe contacts the fluid surface, the container itself must be at a fixed, known, and repeatable vertical datum position. In an embodiment as described herein, a container 100 is not supported on a conductive structure but is held by spring tabs 423*a*, 423*b* and 427*a*, 427*b* engaged with the grooves 144, 146 on the sides of the container 100. In addition, because there is no structure supporting the bottom of the container 100, and because the container is pinched between the spring tabs 423*a*, 423*b* and 427*a*, 427*b* in the position at which the gripper 320 inserts the container into the holding station 420, the exact vertical position of each container 100 within its associated holding station 420 may vary from container to container.

Figure 23:
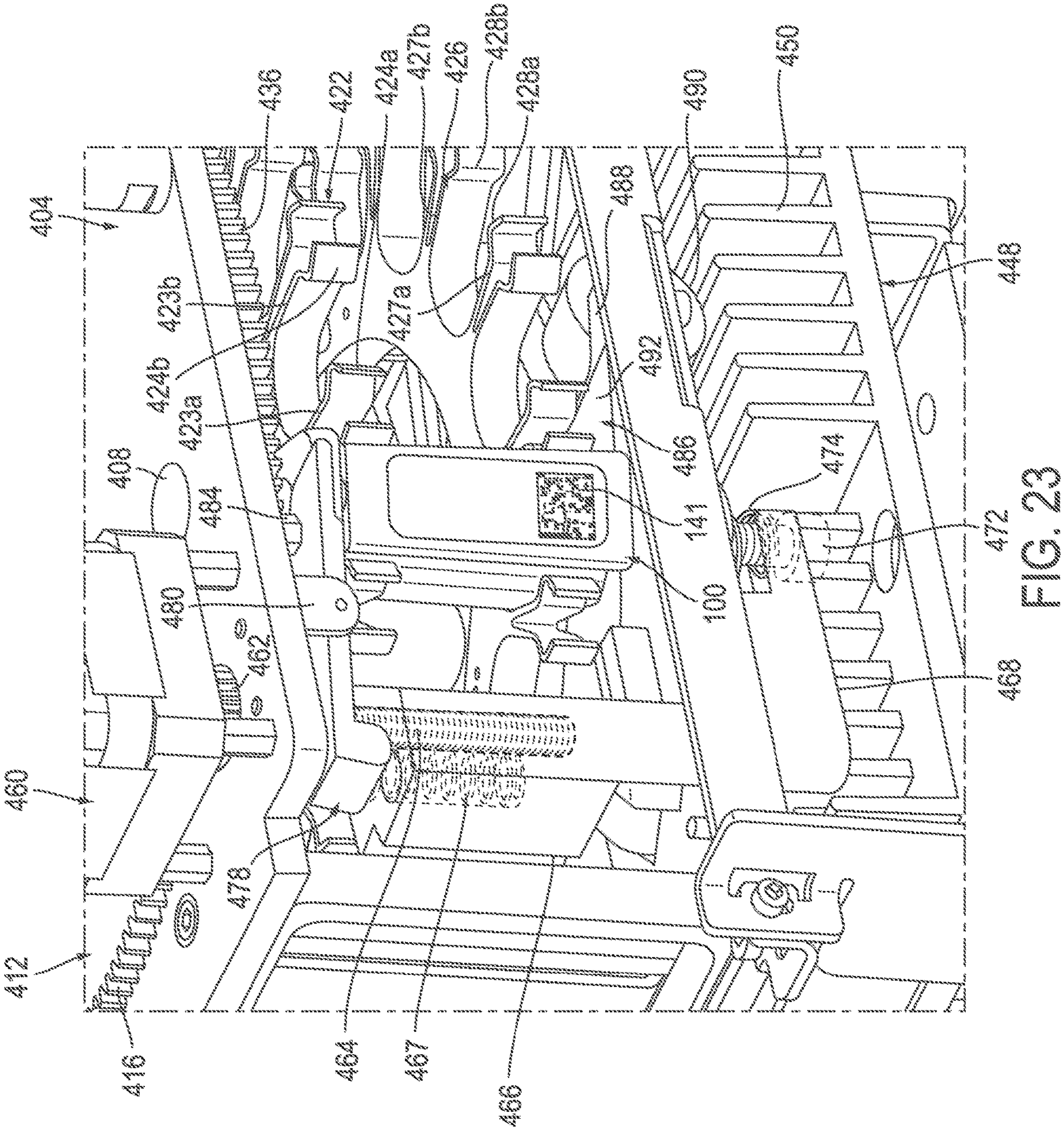
FIG. 23 is a partial perspective internal view of the container holding station showing all or a portion of the container storage transport, a multi-function motor, a follower block and bracket coupled to the multi-function motor, a container hold down arm actuated by the follower block, and a container positioning ramp.
Figure 24:
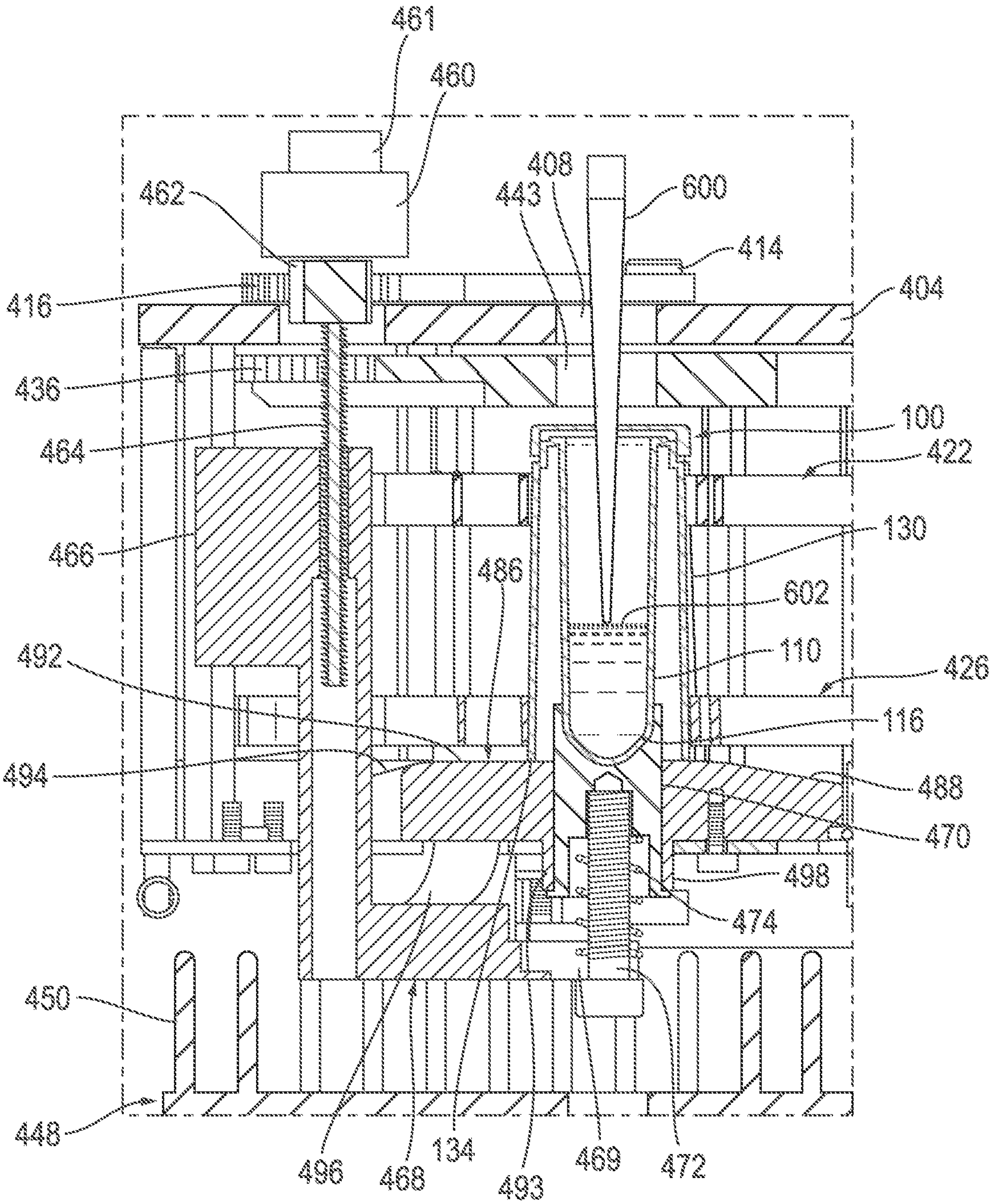
FIG. 24 is a partial, cross-sectional, internal view of the container holding station showing all or a portion of the container storage transport, the multi-function motor, the follower block and bracket coupled to the multi-function motor, and the container positioning ramp.

Thus, container storage module 400 includes a container positioner configured to contact the container 100 positioned beneath the access opening 408 (i.e., in a level-sensing location with respect to a pipettor) to force the container into a repeatable, vertical datum, or level-sensing, position. As shown in FIGS. 20, 23, and 24, in an embodiment, the container positioner includes a container positioning ramp 486 that is mounted beneath the storage carousel 418 and beneath the container access opening 408. Container positioning ramp 486 includes a sloped first end 488 with a roller 490, a level center portion 492, and a sloped second end 494 with a roller 496. As the storage carousel 418 rotates clockwise to position a container 100 beneath the container access opening 408, the container 100 will first encounter the sloped first end 488 and roller 490 at the beginning of the sloped first end 488. Sloped first end 488 is inclined upwardly toward the level center portion 492 to accommodate minor variations in the vertical position of the container 100 in the holding station 420 (i.e., if the bottom edge of skirt 130 of container 100 is initially below the level center portion 492). The roller 490 helps ensure a smooth transition as the container 100 passes onto the sloped first end 488 and prevents the container 100 from contacting the end of the container positioning ramp 486. As the storage carousel 418 continues to rotate, assuming the bottom edge of skirt 130 of container 100 is initially below the level center portion 492, the bottom edge of skirt 130 slides from the sloped first end 488 onto the level center portion 492, such that the bottom edge 134 of the skirt 130 of the container 100 contacts the level center portion 492, which provides a fixed, known, and repeatable vertical position of the container 100 for capacitive level sensing or for any other purpose for which it is necessary or desirable that the container 100 be positioned at a repeatable, vertical datum position. That is, if the container 100 is in the holding station 420 such that the bottom edge of the container 100 is below the level of the level center portion 492, the sloped first end 488 will push the container 100 up within the holding station 420 until the bottom edge of the container 100 is at the level of the level center portion 492.

If the storage carousel 418 rotates counter-clockwise to position a container 100 beneath the container access opening 408, the container 100 will first encounter the sloped second end 494 and roller 496 at the beginning of the sloped second end 494. Sloped second end 494 is also inclined upwardly toward the level center portion 492 to accommodate minor variations in the vertical position of the container 100 in the holding station 420 (i.e., if the bottom edge of skirt 130 of container 100 is initially below the level center portion 492). The roller 496 helps ensure a smooth transition as the container 100 passes onto the sloped second end 494 and prevents the container 100 from contacting the end of the container positioning ramp 486. As the storage carousel 418 continues to rotate, assuming the bottom edge of skirt 130 of container 100 is initially below the level center portion 492, the bottom edge of skirt 130 from the sloped second end 494 onto the level center portion 492, such that the bottom edge 134 of the skirt 130 of the container 100 contacts the level center portion 492, which provides a fixed and known vertical position of the container 100 for capacitive level sensing or for any other purpose for which it is necessary or desirable that the container 100 be positioned at a repeatable, vertical datum position. Thus, if the container 100 is in the holding station 420 such that the bottom edge of the container 100 is below the level of the level center portion 492, the sloped second end 494 will push the container 100 up within the holding station 420 until the bottom edge of the container 100 is at the level of the level center portion 492.

The shape of the container positioning ramp 486—i.e., the shape defined by the sloped first end 488, the level center portion 492, the sloped second end 494—may conform generally to the path traversed by a container 100 moved by the storage carousel 418. The shape of the container positioning ramp 486 may be curved so as to correspond to the curvature of the circumference of the container path, or each section 488, 492, and 494 may be straight, and the first end 488 and second end 494 may be angled (e.g., an obtuse angle) with respect to the center portion 492 so as to approximate the curvature of the circumference of the container path. The axes of rotation of rollers 490 and 496 may be arranged generally radially with respect to the axis of rotation of storage carousel 418.

Referring to FIGS. 20 and 24, in an embodiment, beneath the spur gear 462, multi-function motor 460 may include an output shaft that comprises a threaded rod 464. Rod 464 operatively engages a threaded follower block 466, such that rotation of rod 464 by the motor 460 raises or lowers the follower block 466.

In an embodiment, a bracket 468 may extend laterally away from the follower block 466. In one embodiment, as shown in FIG. 20, bracket 468 is a bracket attached by fasteners to follower block 466. In another embodiment, as shown in FIGS. 23 and 24, bracket 468 and follower block 466 comprise a single, integral component.

A moveable grounding element in the form of a conductive cap 470, which may be made of a conductive material, such as aluminum, is attached to a mounting rod 472, e.g., a threaded bolt or screw engaged with a threaded hole in the cap 470, extending through an oversized hole 469 formed in the bracket 468 so that the cap 470 is able to move vertically with respect to the bracket 468. A spring 474 surrounds the mounting rod 472 and is positioned between the bracket 468 and the conductive cap 470 to bias the cap 470 away from the bracket 468. Conductive cap 470 extends into a vertical through hole 493 formed in the level center portion 492 of the container positioning ramp 486 (see FIG. 24). A cylindrical conductive cap guide 498 extending beneath the container positioning ramp 486 may be provided to receive and guide the cap 470.

Before a container 100 is positioned beneath the container access opening 408, the shutter plate 412 is in the first position closing access to the container access opening 408. The follower block 466, the bracket 468, and the conductive cap 470 are in a lowered position so that the top end of the conductive cap 470 does not project above the top surface of the level center portion 492 of the container positioning ramp 486, so as not to interfere with movement of the container 100 with respect to the container positioning ramp 486. As shown in FIG. 24, when the container 100 is positioned beneath the container access opening 408 and on or above the level center portion 492 of the container positioning ramp 486, the multi-function motor 460 can be activated to both move the shutter plate 412 to the second position uncovering the access opening 408 and to raise the follower block 466 with the bracket 468 and the conductive cap 470 until the cap contacts, or is sufficiently close to, the bottom wall 116 of the vessel 110 of the container 100 such that the capacitance between the probe and the ground plane will measurably (detectably) increase when a conductive object contacts the fluid surface 602. In an embodiment, "sufficiently close" is about 1 millimeter or less. The top end of the conductive cap 470 may have a depression or recess that generally conforms to the shape of the bottom wall 116 of the vessel 110. Spring 474 allows some vertical play between the conductive cap 470 and the bracket 468 so that excessive upward force is not applied to the container 100 as the conductive cap 470 is lifted into contact with the vessel 110. The conductive cap 470 provides capacitive coupling with the pipettor to permit capacitive liquid level sensing.

Referring to FIGS. 18, 20, and 23, in an embodiment, the container positioner further includes a container hold down arm 478 that is pivotably mounted within a mounting yoke 480 attached to the top support panel 404. A spring 482 between one end of the hold down arm 478 and the top support panel 404 urges an opposite end of the hold down arm 478 against a stop element 484 to position the hold down arm 478 in a standby position so as not to interfere with movement of containers 100 below the hold down arm 478.

A second spring 467 is positioned between the follower block 466 and the hold down arm 478. As shown in FIG. 23, as the follower block 466 is raised to lift the conductive cap 470 into contact with bottom wall 116 of the vessel 110 of the container 100, follower block 466 also pushes up on the spring 467, which, in turn, presses against an end of the hold down arm 478, thereby pivoting the opposite end of the hold down arm 478 downwardly into contact with the top of the container 100. Thus, if the container 100 is positioned within the clips of the holding station 420 of the storage carousel 418 above the top surface of the level center portion 482 of the container positioning ramp 486, the pivoting hold down arm 478 will push container 100 down against the level center portion 492 while the conductive cap 470 is raised by the follower block 466 and the bracket 468 into contact with the bottom wall 116 of the vessel 110 to ensure that the container 100 is at the fixed vertical datum position for capacitive level sensing. As noted above, spring 474 allows some vertical play between the conductive cap 470 and the bracket 468 so that excessive upward force is not applied to the container 100, and also so that excessive upward force is not applied against the hold down arm 478. Similarly, spring 467 between follower block 466 and hold down arm 478 ensures that excessive downward force is not applied to the container 100.

In addition to positioning the container 100 in proper contact with the container positioning ramp 486 to ensure that the container 100 is at the fixed vertical datum position for capacitive level sensing, the container hold down arm 478 may also perform a hold down function by preventing the probe tip 600 from lifting the container 100 as the probe tip is raised due to friction between the probe tip 600 and the septum 126 of container 100.

In an alternate embodiment in which capacitive level sensing of the fluid within the container 100 is not performed in the container storage module, the container storage module may include only shutter plate 412 and container hold down arm 478, both coupled to the multi-function motor 460. In such an embodiment, the container hold down arm 478 performs only the hold down function described above to prevent the probe tip 600 from lifting the container 100 as the probe tip is raised due to friction between the probe tip 600 and the septum 126 of container 100.

In still another embodiment in which it is not necessary to cover an opening above the container, the container storage module may include only the container hold down arm 478 coupled to a motor 460, the only function of which is to control movement of the container hold down arm. In such an embodiment, the container hold down arm 478 performs only the hold down function described above to prevent the probe tip 600 from lifting the container 100 as the probe tip is raised due to friction between the probe tip 600 and the septum 126 of container 100.

Waste Disposal Module

After a container 100 held in the container storage module 400 is emptied or otherwise of no further use (e.g., the contents have expired or there are insufficient contents remaining in the container to conduct a further process) it will be necessary to remove the container 100 from the container storage module 400 and discard the container 100. The container 100 can be removed from the storage module 400 by opening the movable barrier 410 for the ingress/egress opening 406 by pushing on the pusher pin 411 of the barrier 410 with the actuator arm 308 of the distributor head 304 to align the cutout 413 formed in the barrier 410 with the opening 406 and then extending the gripper 320 into the storage module 400 to grasp a container 100—as described above—and remove it from the container storage transport 418.

Figure 25:
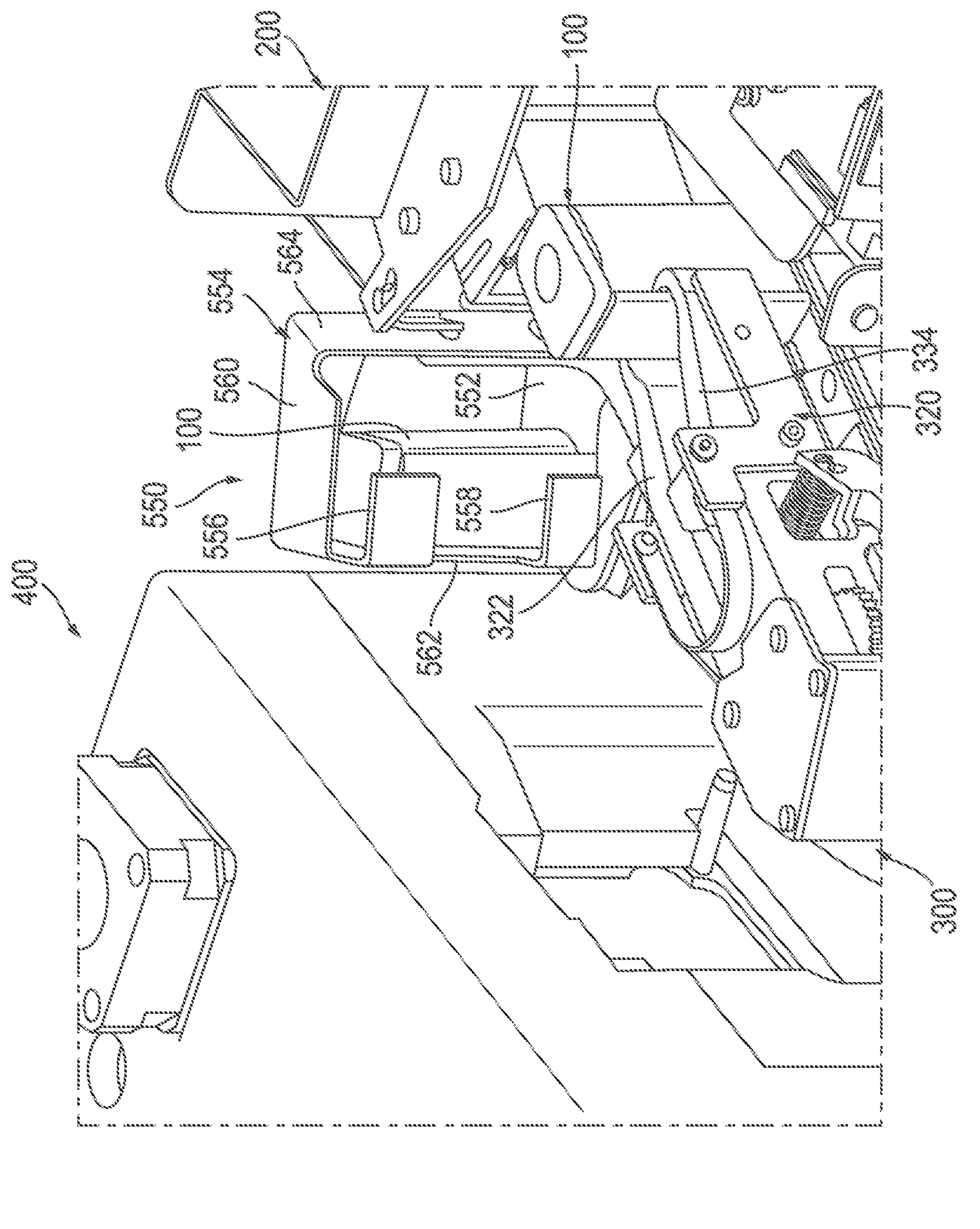
FIG. 25 as a top perspective view of the waste disposal module.

A waste disposal module 550 is provided for disposing of the container 100 after it is removed from the storage module 400. As shown in FIG. 25, waste disposal module 550 includes a retainer cage 554 disposed over an opening 552 below which may be provided an appropriate waste receptacle (not shown). Retainer cage 554 includes opposed sides 562, 564 and a top portion 560 extending therebetween. An upper retainer bar 556 and a lower retainer bar 558 extend from one of the sides 562 of the retainer cage 554. Retainer bars 556, 558 are vertically spaced from one another and extend horizontally across approximately half the width of the retainer cage 554 (i.e., approximately half the distance between sides 562 and 564), thereby leaving a gap or opening between the terminal ends of the retainer bars 556, 558 and the opposed side 564 of the retainer cage. A portion of a waste chute (not shown) that directs the discarded container 100 into a waste receptacle forms a back wall of the retainer cage 554 opposite the upper and lower retainer bars 556, 558.

To discard of the container 100 in the waste disposal module 550, the distributor head 304 of the distributor 300 is rotated to a position aligned with the open side of the retainer cage 554 (i.e., the side of the cage 554 lacking the upper retainer bar 556 and the lower retainer bar 558). The gripper 320 is then extended by advancing the gripper carriage 305 in the radial "R" direction to position the container 100 held thereby within the cage 554 and past the upper retainer bar 556 and lower retainer bar 558. The distributor head chassis 306 is then rotated (counter-clockwise in the illustrated embodiment) to place the container 100 behind the upper retainer bar 556 and lower retainer bar 558 with the gripper 320 extending the gap between the upper and lower retainer bars 556, 558. The gripper fingers 322, 334 are then opened to release the container 100 so that it falls through the opening 552 into the waste receptacle. The retainer cage 554 is configured to ensure that the container 100 does not tip sideways, forward, or backwards once the container 100 is released, but instead falls down through the opening 552, where it is directed by a waste chute into a waste receptacle. In FIG. 25, the container 100 is shown within the retainer cage 554 suspended above the opening 552. This is for purpose of illustration to show how the container 100 is positioned within the retainer cage 554 when released by the gripper 320. A container 100 disposed above the opening 552 that is not held by the gripper 320 would fall down through the opening 552 and would not remain suspended as shown in FIG. 25. After releasing the container 100, the gripper 320 can be withdrawn from between the retainer bars 556, 558 and then moved to another position.

Hardware and Software

Aspects of the subject matter disclosed herein may be implemented via control and computing hardware components, software (which may include firmware), data input components, and data output components. Hardware components include computing and control modules (e.g., system controller(s)), such as microprocessors, embedded controllers, application specific integrated circuits (ASICS), and computers, configured to effect computational and/or control steps by receiving one or more input values, executing one or more algorithms stored on non-transitory machine-readable media (e.g., software) that provide instruction for manipulating or otherwise acting on or in response to the input values, and output one or more output values. Such outputs may be displayed or otherwise indicated to a user for providing information to the user, for example information as to the status of the instrument or of a process being performed thereby, or such outputs may comprise inputs to other processes and/or control algorithms. Data input components comprise elements by which data is input for use by the control and computing hardware components. Such data inputs may comprise signals generated by sensors or scanners, such as, position sensors, speed sensors, accelerometers, environmental (e.g., temperature) sensors, motor encoders, barcode scanners, or RFID scanners, as well as manual input elements, such as keyboards, stylus-based input devices, touch screens, microphones, switches, manually-operated scanners, etc. Data inputs may further include data retrieved from memory. Data output components may comprise hard drives or other storage media, monitors, printers, indicator lights, or audible signal elements (e.g., chime, buzzer, horn, bell, etc.).

Embodiments

Embodiment 1. A system for transferring a container including grooves formed on opposed sides of the container, wherein the system comprises:

a container loading interface comprising:

a movable support platform that is movable between an accessible position and a non-accessible position; and a container loading transport supported on the movable support platform and including a plurality of container pockets, each container pocket being configured to receive a container inserted vertically into the container pocket when the moveable support platform is in the accessible position and to permit a container to be removed laterally from the container pocket, wherein the container loading transport is configured to sequentially transport the container pockets to a container transfer position with respect to a transfer opening formed in the movable support platform when the moveable support platform is in the non-accessible position;

a container storage module comprising:

a housing with a container ingress/egress opening formed in a side of the housing;

a movable barrier configured for movement between a first position blocking the container ingress/egress opening and a second position permitting a container to be moved laterally through the container ingress/egress opening; and a container storage transport disposed within the housing and including a plurality of container holding stations, each container holding station including spring tabs configured to resiliently engage the grooves of a container held in the container holding station to retain the container in the container holding station and to deflect outwardly to permit the container to be laterally inserted into or laterally removed from the container holding station; and a container distributor configured to transfer containers from the container loading interface to the container storage module and comprising:

a container gripper configured to grasp a container carried in one of the container pockets of the container loading transport located at the container transfer position by engaging the grooves of the container;

a gripper advance system configured to move the container gripper to laterally remove the container from the container pocket of the container loading transport in which the container is held; and a distributor moving system configured to move the container gripper and the container held thereby from the container transfer position to the ingress/egress opening of the container storage module;

wherein the gripper advance system is configured to move the container gripper to insert the container held thereby through the ingress/egress opening and into a container holding station of the container storage transport, and the gripper is configured to release the container in the container holding station by disengaging the grooves of the container.

Embodiment 2. The system of embodiment 1, wherein the movable support platform of the container loading interface comprises a drawer that is movable between the non-accessible position, in which the movable support platform is retracted into an instrument, and the accessible position, in which the movable support platform is extended from the instrument.

Embodiment 3. The system of embodiment 1 or 2, wherein the container loading transport comprises a loading carousel supported on the movable support platform for rotation about a loading carousel axis, and wherein the container pockets are arranged circumferentially around the loading carousel axis.

Embodiment 4. The system of embodiment 3, wherein the loading interface further includes a home sensor for detecting a home rotational position of the loading carousel.

Embodiment 5. The system of embodiment 3 or 4, wherein each container pocket includes retention clips configured to engage the grooves formed on the container for removably retaining the container within the container pocket.

Embodiment 6. The system of any one of embodiments 3 to 5, wherein the container pockets are disposed on the outer periphery of the loading carousel and are open at the outer periphery of the loading carousel to permit a container to be withdrawn from the pocket in a lateral direction with respect to the loading carousel axis.

Embodiment 7. The system of embodiment 6, wherein each container pocket includes a relief formed on opposed sides of the open peripheral end of the container pocket to provide clearance for a gripping mechanism to open to engage or disengage the grooves of a container held within the container pocket.

Embodiment 8. The system of any one of embodiments 1 to 7, wherein each container pocket includes a container positioning cleat configured to engage a notch formed in a container positioned within the container pocket.

Embodiment 9. The system of any one of embodiments 1 to 8, wherein the container loading interface further comprises a scanner configured to scan machine-readable information on each container carried on the container loading transport.

Embodiment 10. The system of embodiment 9, wherein the scanner comprises a barcode scanner.

Embodiment 11. The system of any one of embodiments 3 to 7, wherein the container loading interface further comprises a loading transport motor coupled to the loading carousel to effect powered rotation of the loading carousel about the loading carousel axis.

Embodiment 12. The system of embodiment 11, wherein the loading transport motor is coupled to the loading carousel by a drive belt.

Embodiment 13. The system of any one of embodiments 1 to 12, wherein the container storage module comprises a pusher pin extending from the movable barrier; and the container distributor comprises a door actuator arm configured to engage the pusher pin and wherein the door actuator arm is movable by the distributor moving system to move the movable barrier of the container storage module from the first position to the second position.

Embodiment 14. The system of any one of embodiments 1 to 13, wherein the container storage transport comprises a storage carousel supported within the housing for rotation about a storage carousel axis, and wherein the container holding stations are arranged circumferentially around the storage carousel axis.

Embodiment 15. The system of embodiment 14, wherein the container storage transport further includes a home sensor for detecting a home rotational position of the storage carousel.

Embodiment 16. The system of embodiment 14 or 15, wherein the storage carousel comprises an upper clip ring including multiple pairs of opposed, facing spring tabs and a lower clip ring including multiple pairs of opposed, facing spring tabs, wherein each pair of spring tabs of the upper clip ring is aligned with a corresponding pair of spring tabs of the lower clip ring to define each holding station.

Embodiment 17. The system of any one of embodiments 14 to 16, wherein each spring tab includes a knuckle bent inwardly into the corresponding holding station, and wherein each knuckle seats into one of the grooves of the container disposed in the holding station.

Embodiment 18. The system of embodiment 16, wherein the upper clip ring is spaced apart from the lower clip ring so that each pair of spring tabs of the upper clip ring is spaced apart from the corresponding pair of spring tabs of the lower clip ring.

Embodiment 19. The system of any one of embodiments 14 to 18, wherein the container storage module further comprises a storage transport motor coupled to the storage carousel to effect powered rotation of the storage carousel about the storage carousel axis.

Embodiment 20. The system of embodiment 19, wherein the storage transport motor is coupled to the storage carousel by a spur gear mounted to the carousel and engaged with a spur gear mounted on an output shaft of the storage transport motor.

Embodiment 21. The system of any one of embodiments 1 to 20, wherein the container gripper comprises:

a gripper element mounting bracket;

a first gripper element mounted to the gripper element mounting bracket for pivoting movement about a first gripper axis of rotation and including a first hook located at a radially-spaced position with respect to the first gripper axis of rotation and configured to seat in one of the grooves of the container; and a second gripper element mounted to the gripper element mounting bracket for pivoting movement about a second gripper axis of rotation that is parallel to the first gripper axis of rotation and including a second hook located at a radially-spaced position with respect to the second gripper axis of rotation and configured to seat in the opposite groove of the container, wherein the first hook and the second hook are bent toward each other, and wherein the first gripper element and the second gripper element are coupled to one another for coordinated pivoting movement toward each other or away from each other about the respective first and second gripper axes of rotation, and wherein the container gripper is configured to grasp a container by pivoting the first and second gripper elements toward each other until the respective first and second hooks are seated within one of the grooves of the container.

Embodiment 22. The system of embodiment 21, wherein the first gripper element and the second gripper element are coupled to one another for coordinated pivoting movement by:

a first gripper element coupling gear attached to the first gripper element and arranged coaxially with the first gripper axis of rotation; and a second gripper element coupling gear attached to the second gripper element and arranged coaxially with the second gripper axis of rotation;

wherein the first gripper element coupling gear and the second gripper element coupling gear are inter-engaged so that rotation of either the first gripper element or the second gripper element results in a corresponding, coordinated rotation of the other gripper element in an opposite rotational direction.

Embodiment 23. The system of embodiment 22, wherein the container gripper further comprises:

a gripper motor with a gripper actuator gear;

a gripper drive gear mounted coaxially with the first gripper axis of rotation and configured for rotation independently of the first gripper element, wherein the gripper actuator gear is engaged with the gripper drive gear; and a drive pin extending from the first gripper element at a position spaced from the first gripper axis of rotation, wherein the drive pin extends into an opening formed in the gripper drive gear.

Embodiment 24. The system of embodiment 23, wherein the container gripper further comprises a spring connected to at least one of the first gripper element and the second gripper element, and wherein the opening formed in the gripper drive gear comprises an arcuate slot Embodiment 25. The system of any one of embodiments 1 to 24, wherein the gripper advance system comprises:

a linear track;

a linear bearing coupled to the linear track, wherein the container gripper is supported on the linear bearing;

a gripper advance motor; and a drive belt coupled to the gripper advance motor and fixed to the linear bearing.

Embodiment 26. The system of any one of embodiments 1 to 25, wherein the distributor moving system comprises:

a distributor head frame mounted so as to be rotatable about a distributor axis of rotation, wherein the container gripper is supported on the distributor head frame;

a fixed sun gear arranged coaxially with the distributor axis; and a distributor motor fixed to the distributor head frame and including a drive gear that operatively engages the fixed sun gear.

Embodiment 27. The system of any one of embodiments 1 to 24, wherein:

the distributor moving system comprises:

a distributor head frame mounted so as to be rotatable about a distributor axis of rotation;

a fixed sun gear arranged coaxially with the distributor axis; and a distributor motor fixed to the distributor head frame and including a drive gear that operatively engages the fixed sun gear; and the gripper advance system comprises:

a linear track supported on the distributor head frame and oriented radially with respect to the distributor axis;

a linear bearing coupled to the linear track, wherein the container gripper is supported on the linear bearing;

a gripper advance motor mounted to the distributor head frame; and a drive belt operatively coupled to the gripper advance motor and attached to the linear bearing.

Embodiment 28. The system of any one of embodiments 1 to 27, wherein the container storage module further comprises at least one thermal control component for maintaining a desired temperature within the housing, where the at least one thermal component comprises one or more of:

a thermoelectric module;

a heat sink; and a fan.

Embodiment 29. A method for transferring a container including grooves formed on opposed sides of the container, wherein the method comprises:

moving a movable support platform from a non-accessible position to an accessible position to provide user access to a container loading transport supported on the movable support platform and including a plurality of container pockets;

vertically inserting a container into each of one or more of the container pockets;

moving the movable support platform from the accessible position to the non-accessible position;

sequentially transporting the container pockets with the container loading transport to a container transfer position at a transfer opening formed in the movable support platform;

grasping a container carried in one of the container pockets of the container loading transport located at the container transfer position by engaging the grooves of the container with a container gripper;

moving the container gripper with a gripper advance system to laterally remove the container from the container pocket of the container loading transport in which the container is held;

moving the container gripper and the container held thereby with a distributor moving system from the container transfer position to an ingress/egress opening of a housing of a container storage module;

engaging a pusher pin extending from a movable barrier of the container storage module with an actuator arm and moving the actuator arm with the distributor moving system to move the movable barrier of the container storage module from a first position blocking the container ingress/egress opening to a second position permitting a container to be moved laterally through the container ingress/egress opening;

moving the container gripper with the gripper advance system to insert the container held by the gripper through the ingress/egress opening and into one of a plurality of container holding stations of a container storage transport disposed within the housing, wherein each container holding station includes spring tabs configured to resiliently engage the grooves of a container held in the container holding station to retain the container in the container holding station and to deflect outwardly to permit the container to be laterally inserted into or laterally removed from the container holding station; and releasing the container in the container holding station by disengaging the gripper from grooves of the container.

Embodiment 30. The method of embodiment 29, wherein moving a movable support platform comprises moving a drawer that is movable between the non-accessible position, in which the movable support platform is retracted into an instrument, and the accessible position, in which the movable support platform is extended from the instrument.

Embodiment 31. The method of embodiment 29 or 30, wherein the container loading transport comprises a loading carousel supported on the movable support platform for rotation about a loading carousel axis, and wherein the container pockets are arranged circumferentially around the loading carousel axis and are open at their upper ends, and where sequentially transporting the container pockets comprises rotating the carousel about the carousel axis.

Embodiment 32. The method of embodiment 31, wherein the container pockets are disposed on the outer periphery of the loading carousel and are open at the outer periphery of the loading carousel, and wherein grasping the container carried in one of the container pockets comprises:

inserting the container gripper through the open outer periphery to engage the grooves of the container; and laterally removing the container from the container pocket comprises moving the container with the container gripper through the open outer periphery.

Embodiment 33. The method of any one of embodiments 29 to 32, further comprising scanning machine-readable information on each container carried on the container loading transport with a scanner.

Embodiment 34. The method of embodiment 33, wherein the scanner comprises a barcode scanner.

Embodiment 35. The method of any one of embodiments 29 to 34, further comprising monitoring a position of each container held in a pocket of the container loading transport with a home sensor for detecting a home position of the container loading transport.

Embodiment 36. The method of any one of embodiments 29 to 35, further comprising the automated steps of:

moving the container with the container storage transport to a level-sensing location within the housing;

moving a movable grounding element with respect to the container until the grounding element is in close proximity to or in contact with a portion of the container;

lowering a conductive probe, or a conductive tip removably attached to the probe, through a container access opening in the housing and into the container;

detecting a signal or a change of signal when the probe or conductive tip contacts the surface of a fluid within the container, wherein the signal or the change of signal is based on electrical capacitance between the probe or conductive tip and the movable grounding element that is in close proximity to or in contact with a portion of the container; and recording a vertical probe position at which the signal or the change of signal is detected.

Embodiment 37. The method of embodiment 36, further comprising the automated step of:

contacting the container at the level-sensing location with a container positioner to force the container into a repeatable, vertical level-sensing position.

Embodiment 38. The method of embodiment 37, wherein step f) comprises the automated steps of:

contacting a container positioning ramp located adjacent to the container storage transport with a lower portion of the container positioned at the level-sensing location; and contacting a top portion of the container positioned at the level-sensing location and pushing the container down so that the bottom portion of the container maintains contact with the container positioning ramp.

Embodiment 39. The method of embodiment 38, wherein steps b) and h) are performed simultaneously.

Embodiment 40. The method of any one of embodiments 36 to 39, further comprising the step of:

during step b), automatically moving a shutter plate attached to the housing from a first position covering the container access opening to a second position exposing the container access opening.

Embodiment 41. A mechanism for grasping and transferring a container, wherein the container includes parallel, vertically-oriented grooves formed on opposed sides of the container, and wherein the mechanism comprises:

a chassis configured for rotation about a vertically-oriented chassis axis of rotation; and a gripper carriage supported on the chassis for rotation therewith and configured for movement in a radial direction with respect to the chassis axis of rotation; wherein the gripper carriage comprises a container gripper comprising:

a first gripper element mounted to the gripper carriage for pivoting movement about a first gripper axis of rotation that is parallel to the chassis axis of rotation and including a first hook located at a radially-spaced position with respect to the first gripper axis of rotation; and a second gripper element mounted to the gripper carriage for pivoting movement about a second gripper axis of rotation that is parallel to the first gripper axis of rotation and including a second hook located at a radially-spaced position with respect to the second gripper axis of rotation; wherein the first hook and the second hook are bent toward each other, and wherein the first gripper element and the second gripper element are coupled to one another for coordinated pivoting movement toward each other or away from each other about the respective first and second gripper axes of rotation, and wherein the container gripper is configured to grasp a container by pivoting the first and second gripper elements toward each other until the respective first and second hooks each engage one of the vertically-oriented grooves of the container.

Embodiment 42. The mechanism of embodiment 41, wherein the first gripper element and the second gripper element are coupled to one another for coordinated pivoting movement by:

a first gripper element coupling gear attached to the first gripper element and arranged coaxially with the first gripper axis of rotation; and a second gripper element coupling gear attached to the second gripper element and arranged coaxially with the second gripper axis of rotation;

wherein the first gripper element coupling gear and the second gripper element coupling gear are interengaged so that rotation of either the first gripper element or the second gripper element results in a corresponding, coordinated rotation of the other gripper element in an opposite rotational direction.

Embodiment 43. The mechanism of embodiment 42, further comprising:

a gripper motor with a gripper actuator gear;

a gripper drive gear mounted coaxially with the first gripper axis of rotation and configured for rotation independently of the first gripper element, wherein the gripper actuator gear is engaged with the gripper drive gear; and a drive pin extending from the first gripper element at a position spaced from the first gripper axis of rotation, wherein the drive pin extends into an opening formed in the gripper drive gear.

Embodiment 44. The mechanism of embodiment 43, further comprising a spring connected to at least one of the first gripper element and the second gripper element, and wherein the opening formed in the gripper drive gear comprises an arcuate slot.

Embodiment 45. The mechanism of any one of embodiments 41 to 44, further comprising:
- a linear track;
- a linear bearing coupled to the linear track, wherein the gripper carriage is supported on the linear bearing;
- a gripper advance motor; and
- a drive belt coupled to the gripper advance motor and attached to the linear bearing so that movement of the drive belt by the gripper advance motor moves the gripper carriage in the radial direction.

Embodiment 46. The mechanism of any one of embodiments 41 to 45, further comprising:
- a fixed sun gear arranged coaxially with the chassis axis of rotation; and
- a motor fixed to the chassis and including a drive gear that operatively engages the fixed sun gear so that rotation of the drive gear by the motor causes rotation of the chassis about the chassis axis of rotation.

Embodiment 47. A mechanism for performing capacitive level sensing of fluid within a fluid container supported on a movable carrier, wherein the mechanism comprises:
- a conductive probe configured for capacitive level sensing by detecting a signal or change of signal when the probe, or a conductive tip removably attached to the probe, contacts the surface of the fluid within the container, wherein the signal or change of signal is based on electrical capacitance between the probe or conductive tip and a grounded, conductive structure adjacent to or contacting the container;
- a probe position sensor for monitoring a vertical position of the probe and recording the vertical probe position at which the signal or detectable change of signal is detected; and
- a movable grounding element, configured for selective movement relative to a container positioned by the movable carrier at a level-sensing location with respect to the probe until the grounding element is in close proximity to or in contact with a portion of the container.

Embodiment 48. The mechanism of embodiment 47, wherein a portion of the movable grounding element is shaped to conform with the portion of the container.

Embodiment 49. The mechanism of embodiment 47 or 48, further comprising:
- a motor;
- a threaded rod operatively coupled to the motor; and
- a bracket operatively coupled to the threaded rod, wherein the movable grounding element is attached to the bracket.

Embodiment 50. The mechanism of embodiment 49, wherein the movable carrier is contained within a housing having a top wall over the carrier, and wherein a container access opening is formed through the top wall above the level-sensing location and configured to permit the probe, or conductive tip removably attached to the probe, to enter a container located at the level-sensing location, and wherein the mechanism further comprises a shutter plate attached to the top wall and movable between a first position covering the container access opening and a second position exposing the container access opening, and wherein the shutter plate is operatively coupled to the motor to effect powered movement of the shutter plate from the first position to the second position as the motor moves the movable grounding element into close proximity to or in contact with the portion of the container.

Embodiment 51. The mechanism of embodiment 50, wherein the shutter plate comprises a sector gear that is pivotably mounted to the top wall and includes gear teeth along an arcuate edge thereof that engage a gear driven by the motor.

Embodiment 52. The mechanism of any one of embodiments 47 to 51, further comprising a container positioner configured to contact the container positioned at the level-sensing location and force the container into a repeatable, vertical level-sensing position.

Embodiment 53. The mechanism of embodiment 52, wherein the container positioner comprises:
- a container positioning ramp configured to be contacted by a bottom portion of the container positioned at the level-sensing location; and
- a container hold down arm configured to contact a top portion of the container positioned at the level-sensing location and push the container down so that the bottom portion of the container maintains contact with the container positioning ramp.

Embodiment 54. The mechanism of embodiment 53, wherein the movable carrier comprises a carousel that is rotatable about a vertically-oriented carousel axis of rotation and including a plurality of container holding stations disposed at angularly spaced positions about the carousel axis of rotation, wherein each container holding station includes spring tabs extending laterally with respect to the carousel axis of rotation and configured to resiliently engage the grooves of a container held in the container holding station to retain the container in the container holding station, and wherein the container is able to slide in a vertical direction between the spring tabs of the container holding station, and wherein
- the container positioning ramp is disposed beneath a portion of the carousel and is configured to be contacted by the bottom portion of the container held in a container holding station as the carousel moves the container into the level-sensing location,
- contact between the container and the container positioning ramp slides the container within the container holding station to a position with the bottom of the container contacting the container positioning ramp, and
- the container hold down arm is configured to contact the top portion of the container to slide the container within the container holding station down so that the bottom portion of the container maintains contact with the container positioning ramp.

Embodiment 55. The mechanism of embodiment 53 or 54, wherein the container hold down arm is coupled to the a movable grounding element so that when the movable grounding element moves into close proximity to or in contact with the portion of the container, the container hold down arm is moved into contact with the top portion of the container to push the container down so that the bottom portion of the container maintains contact with the container positioning ramp.

Embodiment 56. The mechanism of any one of embodiments 53 to 55, wherein the container positioning ramp comprises a sloped first end, a level center portion, and a sloped second end, and wherein the container is positioned on the level center portion when the container is positioned at the level-sensing location.

Embodiment 57. The mechanism of any one of embodiments 53 to 56, wherein the container positioning ramp is shaped to conform to a portion of a path traversed by a container moved by the movable carrier through the level-sensing location.

Embodiment 58. The mechanism of embodiment 56 or 57, further comprising a first roller at the beginning of the sloped first end to guide the bottom portion of a container onto the sloped first end.

Embodiment 59. The mechanism of embodiment 58, further comprising a second roller at the beginning of the sloped second end to guide the bottom portion of a container onto the sloped second end.

Embodiment 60. The mechanism of embodiment 47 or 48, wherein the movable carrier is contained within a housing having a top wall over the carrier, and wherein a container access opening is formed through the top wall above the level-sensing location and configured to permit the probe, or conductive tip removably attached to the probe, to enter a container located at the level-sensing location through the container access opening, and wherein the mechanism further comprises:

a motor;

a threaded rod operatively coupled to the motor;

a follower block threadably coupled to the threaded rod;

a bracket extending from the follower block, wherein the movable grounding element is attached to the bracket, such that rotation of the threaded rod by the motor in a first direction causes the grounding element to move into close proximity or contact with the portion of the container, and rotation of the threaded rod by the motor in a second direction causes the grounding element to move away from close proximity or contact with the portion of the container;

a shutter plate attached to the top wall and movable between a first position covering the container access opening and a second position exposing the container access opening, wherein the shutter plate is operatively coupled to the motor to effect powered movement of the shutter plate from the first position to the second position as the motor moves the movable grounding element into close proximity or contact with the portion of the container and to effect powered movement of the shutter plate from the second position to the first position as the motor moves the movable grounding element away from close proximity or contact with the portion of the container;

a container positioning ramp configured to be contacted by a bottom portion of the container positioned at the level-sensing location; and a container hold down arm configured for movement between a first position not contacting a container positioned at the level-sensing location and a second position contacting a top portion of the container positioned at the level-sensing location to push the container down so that the bottom portion of the container maintains contact with the container positioning ramp, wherein the follower block contacts the container hold down arm to move the container hold down arm from its first position to its second position as the motor moves the movable grounding element into close proximity or contact with the portion of the container and moves the shutter plate from its first position to its second position.

Embodiment 61. The mechanism of embodiment 60 wherein the shutter plate comprises a sector gear that is pivotably mounted to the top wall and includes gear teeth along an arcuate edge thereof that engage a gear driven by the motor coaxially with the threaded rod.

Embodiment 62. The mechanism of embodiment 60 or 61, wherein the container hold down arm is configured for pivoting movement between its first position and its second position, and wherein the mechanism further comprises a spring coupled to the container hold down arm to bias the container hold down arm in its first position.

Embodiment 63. A method for performing capacitive level sensing of fluid within a container supported on a movable carrier, wherein the method comprises the automated steps of:

moving the container with the movable carrier to a level-sensing location;

moving a movable grounding element with respect to the container until the grounding element is in close proximity to or in contact with a portion of the container;

lowering a conductive probe, or a conductive tip removably attached to the probe, into the container;

detecting a signal or a change of signal when the probe or conductive tip contacts the surface of a fluid within the container, wherein the signal or the change of signal is based on electrical capacitance between the probe or conductive tip and the movable grounding element that is in close proximity to or in contact with a portion of the container; and recording a vertical probe position at which the signal or the change of signal is detected.

Embodiment 64. The method of embodiment 63, further comprising the automated step of:

contacting the container at the level-sensing location with a container positioner to force the container into a repeatable, vertical level-sensing position.

Embodiment 65. The method of embodiment 64, wherein step f) comprises the automated steps of:

contacting a container positioning ramp located adjacent to the movable carrier with a bottom portion of the container positioned at the level-sensing location; and contacting a top portion of the container positioned at the level-sensing location and pushing the container down so that the bottom portion of the container maintains contact with the container positioning ramp.

Embodiment 66. The method of embodiment 65, wherein steps b) and h) are performed simultaneously.

Embodiment 67. The method of embodiment 65 or 66, wherein the container positioning ramp comprises a sloped first end, a level center portion, and a sloped second end, and wherein the container is positioned on the level center portion when the container is positioned at the level-sensing location.

Embodiment 68. The method of embodiment 67, further comprising a first roller at the beginning of the sloped first end to guide the bottom portion of a container onto the sloped first end.

Embodiment 69. The method of embodiment 68, further comprising a second roller at the beginning of the sloped second end to guide the bottom portion of a container onto the sloped second end.

Embodiment 70. The method of any one of embodiments 65 to 69, wherein the movable carrier comprises a carousel that is rotatable about a vertically-oriented carousel axis of rotation and including a plurality of container holding stations disposed at angularly spaced positions about the carousel axis of rotation, wherein each container holding station includes spring tabs extending laterally with respect to the carousel axis of rotation and configured to resiliently engage the grooves of a container held in the container holding station to retain the container in the container holding station, and wherein the container is able to slide in a vertical direction between the spring tabs of the container holding station, and wherein contacting the bottom portion of the container with the container positioning ramp slides the container within the container holding station to the repeatable, vertical level-sensing position, and contact of the top portion of the container with the container hold down arm slides the container within the container holding station down so that the bottom portion of the container maintains contact with the container positioning ramp.

Embodiment 71. The method of any one of embodiments 63 to 70, wherein the carrier is contained within a housing having a top wall over the carrier, and wherein a container access opening is formed through the top wall above the level-sensing location and configured to permit the probe, or conductive tip removably attached to the probe, to enter a container located at the level-sensing location, wherein the method further comprises performing the step of:

during step b), automatically moving a shutter plate attached to the top wall from a first position covering the container access opening to a second position exposing the container access opening.

Embodiment 72. The method of any one of embodiments 63 to 71, wherein a portion of the movable grounding element is shaped to conform with the portion of the container.

Embodiment 73. The method of any one of embodiments 65 to 72, wherein the container positioning ramp is shaped to conform to a portion of a path traversed by a container moved by the movable carrier through the level-sensing location.

Embodiment 74. A mechanism for providing selective access to one of a plurality of containers within a substantially enclosed housing, wherein the mechanism comprises:

a movable carrier within the housing and configured to hold and carry the plurality of containers;

a container access opening formed in a top wall of the housing at a position on a path traversed by the plurality of containers carried on the movable carrier so that movement of the carrier sequentially places each of the plurality of containers beneath the container access opening; and a shutter plate pivotably attached to the top wall of the housing and pivotable between a first position covering the container access opening to thereby prevent access through the container access opening to the container located beneath the container access opening and a second position exposing the container access opening to thereby allow access through the container access opening to the container located beneath the container access opening.

Embodiment 75. The mechanism of embodiment 74, further comprising a motor operatively coupled to the shutter plate to effect powered movement of the shutter plate from the first position to the second position.

Embodiment 76. The mechanism of embodiment 75, wherein the shutter plate comprises a sector gear mounted for pivoting movement between the first position and the second position and including gear teeth along an arcuate edge thereof that engage a gear driven by the motor.

Embodiment 77. The mechanism of embodiment 76, further comprising a container hold down arm configured for movement between a first position not contacting a container positioned beneath the container access opening and a second position contacting a top portion of a container positioned beneath the container access opening to hold the container in a fixed vertical position, wherein the motor is coupled to the container hold down arm to move the container hold down arm from its first position to its second position as the motor moves the shutter plate from its first position to its second position.

Embodiment 78. The mechanism of embodiment 77, further comprising:

a threaded rod operatively coupled to the motor, wherein the gear driven by the motor is coaxially arranged with the threaded rod; and a follower block threadably coupled to the threaded rod, wherein the container hold down arm is configured for pivoting movement between its first position and its second position, and wherein the container hold down arm contacts the follower block so that as the gear driven by the motor rotates the sector gear to move the shutter plate from its first position to its second position, the threaded rod moves the follower block to move the container hold down arm from its first position to its second position.

Embodiment 79. The mechanism of embodiment 78, further comprising a spring coupled to the container hold down arm to bias the container hold down arm in its first position.

Embodiment 80. A method for providing selective access to one of a plurality of containers within a substantially enclosed housing, wherein the method comprises the automated steps of:

a) carrying the plurality of containers within the housing on a movable carrier;

b) sequentially placing each of the plurality of containers carried on the movable carrier beneath a container access opening formed in a top wall of the housing; and c) automatically pivoting a shutter plate pivotably attached to the top wall of the housing from a first position covering the container access opening to a second position exposing the container access opening.

Embodiment 81. The method of embodiment 80, further comprising the step of:

d) during step c) automatically contacting a top portion of the container positioned beneath the container access opening to hold the container at a fixed, vertical position.

Embodiment 82. The method of embodiment 81, wherein step d) comprises contacting the top portion of the container positioned beneath the container access opening with a container hold down arm.

Embodiment 83. A system for disposing of spent containers comprising a retainer cage disposed over a waste opening, wherein the retainer cage comprises:

opposed, vertically-oriented first and second sides;

an upper retainer bar and a lower retainer bar extending laterally from the first side of the retainer cage toward the second side, wherein the upper and lower retainer bars are vertically spaced from one another and extend across a portion of the width of the retainer cage so as to leave a gap between the second side and terminal ends of the retainer bars, and wherein the gap between the upper and lower retainer bars and the second side is configured to permit a container to be inserted through the gap; and a container gripper configured to hold the container, insert the container through the gap to a position between the first and second sides and to move to a position whereby the gripper is positioned between the vertically-spaced upper and lower retainer bars and the container is located behind the upper and lower retainer bars.

Embodiment 84. The system of embodiment 83, wherein the container includes grooves formed on opposed sides of the container, and wherein the container gripper comprises:

a gripper element mounting bracket;

a first gripper element mounted to the gripper element mounting bracket for pivoting movement about a first gripper axis of rotation and including a first hook located at a radially-spaced position with respect to the first gripper axis of rotation and configured to seat in a first one of the grooves of the container; and a second gripper element mounted to the gripper element mounting bracket for pivoting movement about a second gripper axis of rotation that is parallel to the first gripper axis of rotation and including a second hook located at a radially-spaced position with respect to the second gripper axis of rotation and configured to seat in a second one of the grooves, the second one of the grooves being opposite the first one of the grooves of the container, wherein the first hook and the second hook are bent toward each other, and wherein the first gripper element and the second gripper element are coupled to one another for coordinated pivoting movement toward each other or away from each other about the respective first and second gripper axes of rotation, wherein the container gripper is configured to grasp a container by pivoting the first and second gripper elements toward each other until the respective first and second hooks are seated within one of the grooves of the container, and wherein the first and second gripper elements fit between the vertically-spaced upper and lower retainer bars when grasping the container.

Embodiment 85. The system of embodiment 84, wherein the first gripper element and the second gripper element are coupled to one another for coordinated pivoting movement by:

a first gripper element coupling gear attached to the first gripper element and arranged coaxially with the first gripper axis of rotation; and a second gripper element coupling gear attached to the second gripper element and arranged coaxially with the second gripper axis of rotation;

wherein the first gripper element coupling gear and the second gripper element coupling gear are inter-engaged so that rotation of either the first gripper element or the second gripper element results in a corresponding, coordinated rotation of the other gripper element in an opposite rotational direction.

Embodiment 86. The system of embodiment 84, wherein the container gripper further comprises:

a gripper motor with a gripper actuator gear;

a gripper drive gear mounted coaxially with the first gripper axis of rotation and configured for rotation independently of the first gripper element, wherein the gripper actuator gear is engaged with the gripper drive gear; and a drive pin extending from the first gripper element at a position spaced from the first gripper axis of rotation, wherein the drive pin extends into an opening formed in the gripper drive gear.

Embodiment 87. The system of embodiment 86, wherein the container gripper further comprises a spring connected to at least one of the first gripper element and the second gripper element, and wherein the opening formed in the gripper drive gear comprises an arcuate slot Embodiment 88. The system of any one of embodiments 83 to 87, further comprising a gripper advance system comprising:

a linear track;

a linear bearing coupled to the linear track, wherein the container gripper is supported on the linear bearing;

a gripper advance motor; and a drive belt coupled to the gripper advance motor and fixed to the linear bearing.

Embodiment 89. The system of embodiment 84, wherein the gripper further comprises a chassis configured for rotation about a vertically-oriented chassis axis of rotation, wherein the gripper mounting bracket is supported on the chassis for rotation therewith, the first gripper axis of rotation is parallel to the chassis axis of rotation, and the second gripper axis of rotation is parallel to chassis axis of rotation.

Embodiment 90. A method for disposing of spent containers, wherein the method comprises:

moving a spent container horizontally into a retainer cage disposed over a waste opening with a container gripper holding the spent container, the retainer cage comprising opposed, vertically-oriented first and second sides and upper and lower retainer bars extending laterally from the first side of the retainer cage toward the second side, wherein the upper and lower retainer bars are vertically spaced from one another and extend across a portion of the width of the retainer cage so as to leave a gap between terminal ends of the upper and lower retainer bars and the second side through which the container gripper moves the spent container horizontally into the retainer cage;

moving the container gripper and the spent container held thereby horizontally within the retainer cage until the container gripper extends through a gap between the vertically-spaced upper and lower retainer bars and the spent container is disposed behind the upper and lower retainer bars; and releasing the spent container from the container gripper so that the spent container falls through the waste opening over which the retainer cage is disposed.

Embodiment 91. The method of embodiment 90, further comprising the step of moving the container gripper horizontally from the gap between the vertically-spaced upper and lower retainer bars.

Embodiment 92. The method of embodiment 90 or 91, wherein the container includes grooves formed on opposed sides of the container, and wherein the container gripper comprises:

a gripper element mounting bracket;

a first gripper element mounted to the gripper element mounting bracket for pivoting movement about a first gripper axis of rotation and including a first hook located at a radially-spaced position with respect to the first gripper axis of rotation and configured to seat in one of the grooves of the container; and a second gripper element mounted to the gripper element mounting bracket for pivoting movement about a second gripper axis of rotation that is parallel to the first gripper axis of rotation and including a second hook located at a radially-spaced position with respect to the second gripper axis of rotation and configured to seat in the opposite groove of the container, wherein the first hook and the second hook are bent toward each other, and wherein the first gripper element and the second gripper element are coupled to one another for coordinated pivoting movement toward each other or away from each other about the respective first and second gripper axes of rotation, wherein the container gripper is configured to grasp a container by pivoting the first and second gripper elements toward each other until each of the respective first and second hooks is seated within one of the grooves of the container, and wherein each of the first and second gripper elements fits between the vertically-spaced upper and lower retainer bars when grasping the container.

Embodiment 93. The method of embodiment 92, wherein the first gripper element and the second gripper element are coupled to one another for coordinated pivoting movement by:

a first gripper element coupling gear attached to the first gripper element and arranged coaxially with the first gripper axis of rotation; and a second gripper element coupling gear attached to the second gripper element and arranged coaxially with the second gripper axis of rotation;

wherein the first gripper element coupling gear and the second gripper element coupling gear are inter-engaged so that rotation of either the first gripper element or the second gripper element results in a corresponding, coordinated rotation of the other gripper element in an opposite rotational direction.

Embodiment 94. The method of embodiment 93, wherein the container gripper is actuated to hold the spent container or release the spent container by:

a gripper motor with a gripper actuator gear;

a gripper drive gear mounted coaxially with the first gripper axis of rotation and configured for rotation independently of the first gripper element, wherein the gripper actuator gear is engaged with the gripper drive gear; and a drive pin extending from the first gripper element at a position spaced from the first gripper axis of rotation, wherein the drive pin extends into an opening formed in the gripper drive gear.

Embodiment 95. The method of embodiment 94, wherein the container gripper further comprises a spring connected to at least one of the first gripper element and the second gripper element, and wherein the opening formed in the gripper drive gear comprises an arcuate slot Embodiment 96. The method of any one of embodiments 90 to 95, wherein the spent container is moved horizontally into the retainer cage with a gripper advance system comprising:

a linear track;

a linear bearing coupled to the linear track, wherein the container gripper is supported on the linear bearing;

a gripper advance motor; and a drive belt coupled to the gripper advance motor and fixed to the linear bearing.

Embodiment 97. The method of embodiment 91, wherein the gripper and the spent container held thereby are moved horizontally within the retainer cage by a chassis configured for rotation about a vertically-oriented chassis axis of rotation, wherein the gripper mounting bracket is supported on the chassis for rotation therewith, the first gripper axis of rotation is parallel to the chassis axis of rotation, and the second gripper axis of rotation is parallel to chassis axis of rotation.

Embodiment 98. A mechanism for positioning a fluid container supported on a movable carrier at a predetermined location, wherein the mechanism comprises:

a container positioning ramp located adjacent to a portion of the moveable carrier and configured to be contacted by a bottom portion of a container supported on the movable carrier when the movable carrier moves the container to the predetermined location; and a container hold down arm configured for selective movement relative to the container positioned at the predetermined location, wherein the container hold down arm is configured to contact a top portion of the container positioned at the predetermined location and push the container down so that the bottom portion of the container maintains contact with the container positioning ramp.

Embodiment 99. The mechanism of embodiment 98, wherein the container positioning ramp comprises a sloped first end, a level center portion, and a sloped second end, and wherein the container is positioned on the level center portion when the container is positioned at the level-sensing location.

Embodiment 100. The mechanism of embodiment 99, further comprising a roller at the beginning of the sloped first end to guide the bottom portion of a container onto the sloped first end.

Embodiment 101. The mechanism of any one of embodiments 98 to 100, further comprising:

a motor;

a threaded rod operatively coupled to the motor; and a follower block threadably coupled to the threaded rod;

wherein the follower block contacts the container hold down arm to move the container hold down arm from its first position to its second position as the motor moves the follower block.

Embodiment 102. The mechanism of embodiment 101, wherein the movable carrier is contained within a housing having a top wall over the carrier, and wherein a container access opening is formed through the top wall above the predetermined location and configured to permit a fluid transfer probe, or tip removably attached to the fluid transfer probe, to enter a container located beneath the container access opening, and wherein the mechanism further comprises:

a shutter plate attached to the top wall and movable between a first position covering the container access opening and a second position exposing the container access opening, wherein the shutter plate is operatively coupled to the motor to effect powered movement of the shutter plate from the first position to the second position as the motor moves the follower block to move the container hold down arm from its first position to its second position.

Embodiment 103. The mechanism of any one of embodiments 98 to 102, wherein the movable carrier comprises a carousel that is rotatable about a vertically-oriented carousel axis of rotation and including a plurality of container holding stations disposed at angularly spaced positions about the carousel axis of rotation, wherein each container holding station includes spring tabs extending laterally with respect to the carousel axis of rotation and configured to resiliently engage the grooves of a container held in the container holding station to retain the container in the container holding station, and wherein the container is able to slide in a vertical direction between the spring tabs of the container holding station, and wherein the container positioning ramp is disposed beneath a portion of the carousel and is configured to be contacted by the bottom portion of the container held in a container holding station as the carousel moves the container into the predetermined location, contact between the container and the container positioning ramp slides the container within the container holding station to a position with the bottom of the container contacting the container positioning ramp, and the container hold down arm is configured to contact the top portion of the container to slide the container within the container holding station down so that the bottom portion of the container maintains contact with the container positioning ramp.

Embodiment 104. A mechanism for holding and moving a plurality of containers, wherein each container includes vertically-oriented grooves formed on opposed sides of the container, wherein the mechanism comprises a carousel configured to be rotatable about a vertical-oriented axis of rotation and the carousel includes a plurality of container-holding pockets arranged circumferentially around an outer periphery of the carousel, wherein each container-holding pocket is open at the outer periphery of the carousel to permit a container to be withdrawn out of the pocket in a radial direction with respect to the axis of rotation, and wherein each container-holding pocket includes retention clips configured to engage the grooves formed on the container to removably retain the container within the container pocket.

Embodiment 105. The mechanism of embodiment 104, wherein each container-holding pocket includes a relief formed on opposed sides of the open peripheral end of the container pocket to provide clearance for a gripping mechanism to open to engage or disengage the grooves of a container held within the container-holding pocket.

Embodiment 106. The mechanism of embodiment 104 or 105, further comprising a scanner configured to scan machine-readable information on each container carried in a container-holding pocket on the carousel.

Embodiment 107. The mechanism of embodiment 106, wherein the scanner comprises a barcode scanner.

Embodiment 108. The mechanism of embodiment 106 or 107, further comprising a machine-readable tag disposed on a wall of each container pocket, wherein the scanner is configured to detect the machine-readable tag when the container pocket is empty.

Embodiment 109. The mechanism of any one of embodiments 104 to 108, further comprising a motor coupled to the carousel to effect powered rotation of the carousel about the carousel axis.

Embodiment 110. The mechanism of any one of embodiments 104 to 109, wherein each container-holding pocket includes a container positioning cleat configured to engage a notch formed in a container positioned within the container holding pocket.

Embodiment 111. The mechanism of any one of embodiments 104 to 110, further comprising a home sensor for detecting a home rotational position of the carousel.

Embodiment 112. A method for holding and transporting a plurality of containers, wherein each container includes vertically-oriented grooves formed on opposed sides of the container, wherein the method comprises:

transporting the containers in container-holding pockets formed about the periphery of a carousel that is configured to be rotatable about a vertical-oriented axis of rotation;

removably retaining each container in an associated container-holding pocket with retention clips engaged with the grooves formed on the container; and laterally removing each container from its associated container-holding pocket through an open outer peripheral side of the container-holding pocket.

Embodiment 113. The method of embodiment 112, wherein each container-holding pocket includes a relief formed on opposed sides of the open outer peripheral side of the container pocket, and wherein laterally removing each container from its associated container-holding pocket comprises engaging the grooves of the container with a container gripper that accesses the grooves of the container through the reliefs.

Embodiment 114. The method of embodiment 112 or 113, further comprising scanning machine-readable information on each container carried in a container-holding pocket on the carousel with a scanner.

Embodiment 115. The method of embodiment 114, wherein the scanner comprises a barcode scanner.

Embodiment 116. The method of embodiment 114 or 115, further comprising scanning a machine-readable tag disposed on a wall of a container pocket with the scanner when the container pocket is empty.

Embodiment 117. The method of any one of embodiments 112 to 116 further comprising a motor coupled to the carousel to effect powered rotation of the carousel about the carousel axis.

Embodiment 118. The method of any one of embodiments 112 to 117, further comprising engaging a notch formed in each container with a container positioning cleat that extends into the container-holding pocket.

Embodiment 119. A carrier for a plurality of containers, wherein each container includes grooves formed on opposed sides of the container, wherein the carrier comprises:

a carousel rotatable about a vertically-oriented carousel axis of rotation and including a plurality of container holding stations disposed at angularly spaced positions about the carousel axis of rotation, wherein each container holding station includes spring tabs extending laterally with respect to the carousel axis of rotation and configured to resiliently engage the grooves of a container held in the container holding station to retain the container in the container holding station, wherein the container is able to slide in a vertical direction between the spring tabs of the container holding station;

a container positioning ramp disposed beneath a portion of the carousel and configured to be contacted by a bottom portion of a container held in a container holding station as the carousel moves the container holding station over the container positioning ramp, wherein contact between the container and the container positioning ramp slides the container within the container holding station to a position with the bottom of the container contacting the container positioning ramp; and a container hold down arm configured for selective movement relative to the container contacting the container positioning ramp, wherein the container hold down arm is configured to contact a top portion of the container to slide the container within the container holding station down so that the bottom portion of the container maintains contact with the container positioning ramp.

Embodiment 120. The carrier of embodiment 119, wherein the carousel comprises an upper clip ring including multiple pairs of opposed, facing spring tabs and a lower clip ring including multiple pairs of opposed, facing spring tabs, wherein each pair of spring tabs of the upper clip ring is aligned with a corresponding pair of spring tabs of the lower clip ring to define each container holding station.

Embodiment 121. The carrier of embodiment 120, wherein the upper clip ring is spaced apart from the lower clip ring so that each pair of spring tabs of the upper clip ring is spaced apart from the corresponding pair of spring tabs of the lower clip ring.

Embodiment 122. The carrier of any one of embodiments 119 to 121, wherein each spring tab includes a knuckle bent inwardly toward the opposed, facing spring tab of each pair of spring tabs, and wherein each knuckle seats into one of the grooves of the container disposed in the holding station.

Embodiment 123. The carrier of any one of embodiments 119 to 122, further comprising:

a motor;

a threaded rod operatively coupled to the motor; and a follower block threadably coupled to the threaded rod;

wherein the follower block contacts the container hold down arm to move the container hold down arm from a first position not contacting the top of the container to a second position contacting the top of the container as the motor moves the follower block.

Embodiment 124. The carrier of embodiment 123, wherein the container hold down arm is pivotably mounted within a mounting yoke, and wherein a first end of the hold down arm is contacted by the follower block, and a second end of the hold down arm contacts the container when the first end is contacted by the follower block to pivot the hold down arm.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

What is claimed:

1. A system for transferring a container including grooves formed on opposed sides of the container, wherein the system comprises:

(A) a container loading interface comprising:

(1) A movable support platform that is movable between an accessible position and a non-accessible position; and (2) A container loading transport supported on the movable support platform and including a plurality of container pockets, each container pocket being configured to receive a container inserted vertically into the container pocket when the moveable support platform is in the accessible position and to permit a container to be removed laterally from the container pocket, wherein the container loading transport is configured to sequentially transport the container pockets to a container transfer position with respect to a transfer opening formed in the movable support platform when the moveable support platform is in the non-accessible position;

(B) a container storage module comprising:

(1) A housing with a container ingress/egress opening formed in a side of the housing;

(2) a movable barrier configured for movement between a first position blocking the container ingress/egress opening and a second position permitting a container to be moved laterally through the container ingress/egress opening; and (3) a container storage transport disposed within the housing and including a plurality of container holding stations, each container holding station including spring tabs configured to resiliently engage the grooves of a container held in the container holding station to retain the container in the container holding station and to deflect outwardly to permit the container to be laterally inserted into or laterally removed from the container holding station; and (C) a container distributor configured to transfer containers from the container loading interface to the container storage module and comprising:

(1) A container gripper configured to grasp a container carried in one of the container pockets of the container loading transport located at the container transfer position by engaging the grooves of the container, wherein the container gripper comprises:

(a) a gripper element mounting bracket;

(b) a first gripper element mounted to the gripper element mounting bracket for pivoting movement about a first gripper axis of rotation and including a first hook located at a radially-spaced position with respect to the first gripper axis of rotation and configured to seat in one of the grooves of the container; and (c) a second gripper element mounted to the gripper element mounting bracket for pivoting movement about a second gripper axis of rotation that is parallel to the first gripper axis of rotation and including a second hook located at a radially-spaced position with respect to the second gripper axis of rotation and configured to seat in the opposite groove of the container, wherein the first hook and the second hook are bent toward each other, and wherein the first gripper element and the second gripper element are coupled to one another for coordinated pivoting movement toward each other or away from each other about the respective first and second gripper axes of rotation, wherein the container gripper is configured to grasp a container by pivoting the first and second gripper elements toward each other until the respective first and second hooks are seated within one of the grooves of the container; and wherein the first gripper element and the second gripper element are coupled to one another for coordinated pivoting movement by:

(i) a first gripper element coupling gear attached to the first gripper element and arranged coaxially with the first gripper axis of rotation; and (ii) a second gripper element coupling gear attached to the second gripper element and arranged coaxially with the second gripper axis of rotation; wherein the first gripper element coupling gear and the second gripper element coupling gear are inter-engaged so that rotation of either the first gripper element or the second gripper element results in a corresponding, coordinated rotation of the other gripper element in an opposite rotational direction;

(d) a gripper motor with a gripper actuator gear;

(e) a gripper drive gear mounted coaxially with the first gripper axis of rotation and configured for rotation independently of the first gripper element, wherein the gripper actuator gear is engaged with the gripper drive gear; and (f) a drive pin extending from the first gripper element at a position spaced from the first gripper axis of rotation, wherein the drive pin extends into an opening formed in the gripper drive gear;

(2) a gripper advance system configured to move the container gripper to laterally remove the container from the container pocket of the container loading transport in which the container is held, wherein the gripper advance system is configured to move the container gripper to insert the container held thereby through the ingress/egress opening and into a container holding station of the container storage transport, and the container gripper is configured to release the container in the container holding station by disengaging the grooves of the container; and (3) a distributor moving system configured to move the container gripper and the container held thereby from the container transfer position to the ingress/egress opening of the container storage module.

2. The system of claim 1, wherein the movable support platform of the container loading interface comprises a drawer that is movable between the non-accessible position, in which the movable support platform is retracted into an instrument, and the accessible position, in which the movable support platform is extended from the instrument.

3. The system of claim 1, wherein the container loading transport comprises a loading carousel supported on the movable support platform for rotation about a loading carousel axis, and wherein the container pockets are arranged circumferentially around the loading carousel axis.

4. The system of claim 3, wherein each container pocket includes retention clips configured to engage the grooves formed on the container for removably retaining the container within the container pocket.

5. The system of claim 3, wherein the container pockets are disposed on the outer periphery of the loading carousel and are open at the outer periphery of the loading carousel to permit a container to be withdrawn from the pocket in a lateral direction with respect to the loading carousel axis.

6. The system of claim 5, wherein each container pocket includes a relief formed on opposed sides of the open peripheral end of the container pocket to provide clearance for the container gripper to open to engage or disengage the grooves of a container held within the container pocket.

7. The system of claim 1, wherein each container pocket includes a container positioning cleat configured to engage a notch formed in a container positioned within the container pocket.

8. The system of claim 1, wherein the container loading interface further comprises a scanner configured to scan machine-readable information on each container carried on the container loading transport.

9. The system of claim 1, wherein the container storage module comprises a pusher pin extending from the movable barrier, wherein the container distributor comprises a door actuator arm configured to engage the pusher pin and wherein the door actuator arm is movable by the distributor moving system to move the movable barrier of the container storage module from the first position to the second position.

10. The system of claim 1, wherein the container storage transport comprises a storage carousel supported within the housing for rotation about a storage carousel axis, and wherein the container holding stations are arranged circumferentially around the storage carousel axis.

11. The system of claim 10, wherein the storage carousel comprises an upper clip ring including multiple pairs of opposed, facing spring tabs and a lower clip ring including multiple pairs of opposed, facing spring tabs, and wherein each pair of spring tabs of the upper clip ring is aligned with a corresponding pair of spring tabs of the lower clip ring to define each holding station.

12. The system of claim 10, wherein each spring tab includes a knuckle bent inwardly into the corresponding holding station, and wherein each knuckle seats into one of the grooves of the container disposed in the holding station.

13. The system of claim 11, wherein the upper clip ring is spaced apart from the lower clip ring so that each pair of spring tabs of the upper clip ring is spaced apart from the corresponding pair of spring tabs of the lower clip ring.

14. The system of claim 1, wherein the container gripper further comprises a spring connected to at least one of the first gripper element and the second gripper element, and wherein the opening formed in the gripper drive gear comprises an arcuate slot.

15. The system of claim 1, wherein the gripper advance system comprises:

a linear track;

a linear bearing coupled to the linear track, wherein the container gripper is supported on the linear bearing;

a gripper advance motor; and a drive belt coupled to the gripper advance motor and fixed to the linear bearing.

16. The system of claim 1, wherein the distributor moving system comprises:

a distributor head frame mounted so as to be rotatable about a distributor axis of rotation, wherein the container gripper is supported on the distributor head frame;

a fixed sun gear arranged coaxially with the distributor axis; and a distributor motor fixed to the distributor head frame and including a drive gear that operatively engages the fixed sun gear.

17. The system of claim 1, wherein:

the distributor moving system comprises:

a distributor head frame mounted so as to be rotatable about a distributor axis of rotation;

a fixed sun gear arranged coaxially with the distributor axis; and a distributor motor fixed to the distributor head frame and including a drive gear that operatively engages the fixed sun gear; and the gripper advance system comprises:

a linear track supported on the distributor head frame and oriented radially with respect to the distributor axis;

a linear bearing coupled to the linear track, wherein the container gripper is supported on the linear bearing;

a gripper advance motor mounted to the distributor head frame; and a drive belt operatively coupled to the gripper advance motor and attached to the linear bearing.

18. The system of claim 1, wherein the container storage module further comprises at least one thermal control component for maintaining a desired temperature within the housing, and wherein the at least one thermal component comprises one or more of:

a thermoelectric module;

a heat sink; and
a fan.

19. A method for transferring a container including grooves formed on opposed sides of the container, wherein the method comprises:

moving a movable support platform from a non-accessible position to an accessible position to provide user access to a container loading transport supported on the movable support platform and including a plurality of container pockets;

vertically inserting a container into each of one or more of the container pockets;

moving the movable support platform from the accessible position to the non-accessible position;

sequentially transporting the container pockets with the container loading transport to a container transfer position at a transfer opening formed in the movable support platform;

grasping a container carried in one of the container pockets of the container loading transport located at the container transfer position by engaging the grooves of the container with a container gripper;

moving the container gripper with a gripper advance system to laterally remove the container from the container pocket of the container loading transport in which the container is held;

moving the container gripper and the container held thereby with a distributor moving system from the container transfer position to an ingress/egress opening of a housing of a container storage module;

engaging a pusher pin extending from a movable barrier of the container storage module with an actuator arm and moving the actuator arm with the distributor moving system to move the movable barrier of the container storage module from a first position blocking the container ingress/egress opening to a second position permitting a container to be moved laterally through the container ingress/egress opening;

moving the container gripper with the gripper advance system to insert the container held by the gripper through the ingress/egress opening and into one of a plurality of container holding stations of a container storage transport disposed within the housing, wherein each container holding station includes spring tabs configured to resiliently engage the grooves of a container held in the container holding station to retain the container in the container holding station and to deflect outwardly to permit the container to be laterally inserted into or laterally removed from the container holding station; and releasing the container in the container holding station by disengaging the gripper from grooves of the container.

20. The method of claim 19, wherein moving a movable support platform comprises moving a drawer that is movable between the non-accessible position, in which the movable support platform is retracted into an instrument, and the accessible position, in which the movable support platform is extended from the instrument.

21. The method of claim 19, wherein the container loading transport comprises a loading carousel supported on the movable support platform for rotation about a loading carousel axis, wherein the container pockets are arranged circumferentially around the loading carousel axis and are open at their upper ends, and wherein sequentially transporting the container pockets comprises rotating the carousel about the carousel axis.

22. The method of claim 21, wherein the container pockets are disposed on the outer periphery of the loading carousel and are open at the outer periphery of the loading carousel, and wherein grasping the container carried in one of the container pockets comprises:

inserting the container gripper through the open outer periphery to engage the grooves of the container; and laterally removing the container from the container pocket comprises moving the container with the container gripper through the open outer periphery.

23. The method of claim 19, further comprising scanning machine-readable information on each container carried on the container loading transport with a scanner.

24. The method of claim 19, further comprising the automated steps of:

a) moving the container with the container storage transport to a level-sensing location within the housing;

b) moving a movable grounding element with respect to the container until the grounding element is in close proximity to or in contact with a portion of the container;

c) lowering a conductive probe, or a conductive tip removably attached to the probe, through a container access opening in the housing and into the container;

d) detecting a signal or a change of signal when the probe or conductive tip contacts the surface of a fluid within the container, wherein the signal or the change of signal is based on electrical capacitance between the probe or conductive tip and the movable grounding element that is in close proximity to or in contact with a portion of the container; and e) recording a vertical probe position at which the signal or the change of signal is detected.

25. The method of claim 24, further comprising the automated step of:

f) contacting the container at the level-sensing location with a container positioner to force the container into a repeatable, vertical level-sensing position.

26. The method of claim 25, wherein step f) comprises the automated steps of:

g) contacting a container positioning ramp located adjacent to the container storage transport with a lower portion of the container positioned at the level-sensing location; and h) contacting a top portion of the container positioned at the level-sensing location and pushing the container down so that the bottom portion of the container maintains contact with the container positioning ramp.

27. The method of claim 26, wherein steps b) and h) are performed simultaneously.

28. The method of claim 24, further comprising the step of:

during step b), automatically moving a shutter plate attached to the housing from a first position covering the container access opening to a second position exposing the container access opening.

* * * * *